United States Patent
Andrade et al.

(10) Patent No.: US 10,673,968 B2
(45) Date of Patent: *Jun. 2, 2020

(54) ENHANCED DATA COLLECTION AND ANALYSIS FACILITY

(71) Applicant: SAP SE, Walldorf (DE)

(72) Inventors: Paulo Mario Andrade, Cuiaba (BR); Fernando Nakano, Reston, VA (US); Khalid Abdullah, Ashburn, VA (US); Kimmo Vuori, Espoo (FI); Steven Garcia, South Riding, VA (US); Vaibhav Vohra, Mountain View, CA (US); Arturo Buzzalino, Haymarket, VA (US); Elias Junior Moreira, Rio de Janeiro (BR); Bhomik Pande, Bangalore (IN); Prakash Shelokar, Pune (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,125

(22) Filed: Jul. 3, 2019

(65) Prior Publication Data
US 2019/0327318 A1    Oct. 24, 2019

Related U.S. Application Data

(63) Continuation of application No. 15/581,556, filed on Apr. 28, 2017, now Pat. No. 10,389,828.

(51) Int. Cl.
*H04L 29/08* (2006.01)
*G06Q 10/06* (2012.01)
(Continued)

(52) U.S. Cl.
CPC ......... *H04L 67/22* (2013.01); *G06Q 10/0633* (2013.01); *G06Q 10/06398* (2013.01);
(Continued)

(58) Field of Classification Search
CPC ............... H04L 67/22; G06Q 10/0633; G06Q 30/0201; G06F 3/0484
See application file for complete search history.

(56) References Cited

U.S. PATENT DOCUMENTS

2007/0043608 A1    2/2007   May
2015/0319263 A1   11/2015   Koch

OTHER PUBLICATIONS

Ahas, Rein, et al., "Using Mobile Positioning Data to Model Locations Meaningful to Users of Mobile Phones", Journal of Urban Technology, vol. 17, No. 1, Apr. 2010, 24 pages.
(Continued)

*Primary Examiner* — Kyung H Shin
(74) *Attorney, Agent, or Firm* — Fish & Richardson P.C.

(57) ABSTRACT

In one general aspect, a system and method are described for generating a classification model to determine predictive user behavior. The method may include obtaining data from a mobile network provider. The data including a plurality of utilization metrics pertaining to a plurality of mobile devices carrying out a plurality of network interactions, the plurality of mobile devices being associated with a plurality of users. The method may also include categorizing the data into a plurality of Internet domains associated with the data and determining a plurality of patterns in the data. The method may further include determining an additional pattern in the data, and generating a plurality of rules based on the plurality of patterns and the additional pattern.

20 Claims, 38 Drawing Sheets

(51) Int. Cl.
   *G06Q 10/10*   (2012.01)
   *G06Q 30/02*   (2012.01)
   *G06F 3/0484*  (2013.01)
(52) U.S. Cl.
   CPC ....... *G06Q 10/101* (2013.01); *H04L 67/1095* (2013.01); *G06F 3/0484* (2013.01); *G06Q 10/10* (2013.01); *G06Q 30/02* (2013.01); *G06Q 30/0201* (2013.01)

(56) References Cited

OTHER PUBLICATIONS

Altshuler, Yaniv, et al., "Trade-Offs in Social and Behavioral Modeling in Mobile Networks", Social Computing Behavioral-Cultural Modeling and Prediction, vol. 7812 of the series Lecture Notes in Computer Science, Apr. 2, 2013, 11 pages.
Arai, Ayumi, et al. "Estimation of Human Mobility Patterns and Attributes Analyzing Anonymized Mobile Phone CDR: Developing Real-time Census from Crowds of Greater Dhaka", In AGILE PhD School, 2013, 6 pages.
Blumenstock, Joshua, et al., "Mobile Divides: Gender, Socioeconomic Status, and Mobile Phone Use in Rwanda", Proceedings of the 4th ACM/IEEE International Conference on Information and Communication Technologies and Development, ACM, Dec. 13, 2010, 13 pages.
Blumenstock, Joshua, et al., "Who's Calling? Demographics of Mobile Phone Use in Rwanda", Transportation, 32, 2010, 2 pages.
Brea, Jorge, et al., "Harnessing Mobile Phone Social Network Topology to Infer Users Demographic Attributes", Jroceeding SNAKDD 2014, Proceedings of the 8th Workshop on Social Network Mining and Analysis, Article No. 1, Aug. 24-27, 2014, 9 pages.
Cho, Eunjoon, et al., "Friendship and mobility: user movement in location-based social networks", In Proceedings Jf the 17th ACM SIGKDD international conference on Knowledge discovery and data mining, Aug. 21-24, 2011, 9 pages.
Dash, Manoranjan, et al., "Home and Work Place Prediction for Urban Planning Using Mobile Network Data",Jroceeding—DM '14 Proceedings of the 2014 IEEE 15th International Conference on Mobile Data Management vol. 02; Jul. 14, 2014, 5 pages.
De Mulder, Yoni, et al., "Identification via Location-Profiling in GSM Networks", WPES '08 Proceedings of the $7^{th}$ 4CM workshop on Privacy in the electronic society, Oct. 27, 2008, 9 pages.
Eagle, Nathan, et al., "Inferring friendship network structure by using mobile phone data", Proceedings of the Vational Academy of Sciences, 2009, 106(36), 4 pages.
Frias-Martinez, Vanessa, et al., "A Gender-Centric Analysis of Calling Behavior in a Developing Economy Using all Detail Records", AAAI Spring Symposium: Artificial Intelligence for Development, Mar. 16, 2010, 5 pages.
Jiang, Shan , et al., "A Review of Urban Computing for Mobile Phone Traces: Current Methods, Challenges and Opportunities", in Proceedings of the 2nd ACM SIGKDD International Workshop on Urban Computing. ACM, Aug. 11-14, 2013, 9 pages.
Phithakkitnukoon, Sant!, et al., Activity-Aware Map: Identifying Human Daily Activity Pattern Using Mobile Phone Data, Human Behavior Understanding, vol. 6219 of the series Lecture Notes in Computer Science; 2010, 11 pages.
Yan, Zhixian, et al., "SeMiTri: A Framework for Semantic Annotation of Heterogeneous Trajectories", in Proceedings 3f the 14th international conference on extending database technology. ACM, Mar. 22-24, 2011, 21 pages.

| Top Handsets | OS | Handset Share▾ |
|---|---|---|
| LG Tribute 2 | Android | 7.66% |
| Apple iPhone 6 | iOS8 | 7.4% |
| LG Stylo | Android | 7.16% |
| Apple iPhone 6S | iOS9 | 5.96% |
| Samsung Galaxy S5 | Android | 5.94% |
| Motorola G | Android | 3.46% |
| Apple iPhone 5S | iOS7 | 2.96% |
| LG Volt | Android | 2.95% |
| Alcatel Elevate | Android | 2.76% |

FIG. 5F

Output 1: Summary of dwells for all nodes

| | NODE_ID | DISTINCT_DWELLERS | DWELLS_COUNT | DWELLS_PERCENTAGE | AVG_DWELL_TIME |
|---|---|---|---|---|---|
| 1 | CHILDREN_NODE-MGM | 10,317 | 23,461 | 46.56 | 77.53 |
| 2 | CHILDREN_NODE-BELLAGIO | 6,930 | 12,175 | 24.16 | 81.33 |
| 3 | MOTHER_NODE_BELLAGIO | 6,923 | 12,167 | 24.15 | 81.02 |
| 4 | MOTHER_NODE_AIRPORT | 1,511 | 2,588 | 5.14 | 80.78 |

FIG. 11A

Output 2: Statistics of the children nodes visited BEFORE mother nodes — 1102

| | CHILD_NODE | RESUT_TYPE | MOTHER_NODE | DISTINCT_DWELLERS | DWELLS_COUNT | DWELLS_PERCEN. | AVG_DWE_TIME | AVG_COMM_TIME |
|---|---|---|---|---|---|---|---|---|
| 1 | CHILDREN_NODE-MGM | BEFORE | MOTHER_NODE_AIRPORT | 7 | 7 | 70 | 23.43 | 86.23 |
| 2 | CHILDREN_NODE-BELLAGIO | BEFORE | MOTHER_NODE_AIRPORT | 3 | 3 | 30 | 31.33 | 152.4 |
| 3 | MOTHER_NODE_BELLAGIO | BEFORE | MOTHER_NODE_BELLAGIO | 4,107 | 6,516 | 99.76 | 78.29 | ? |
| 4 | MOTHER_NODE_MGM | BEFORE | MOTHER_NODE_BELLAGIO | 16 | 16 | 0.24 | 153.44 | 41.89 |

FIG. 11B

Output 3: Statistics of the children nodes visited AFTER mother nodes — 1104

| | CHILD_NODE | RESUT_TYPE | MOTHER_NODE | DISTINCT_DWELLERS | DWELLS_COUNT | DWELLS_PERCEN. | AVG_DWE_TIME | AVG_COMM_TIME |
|---|---|---|---|---|---|---|---|---|
| 1 | CHILDREN_NODE-MGM | AFTER | MOTHER_NODE_AIRPORT | 5 | 5 | 71.43 | 92 | 152.5 |
| 2 | CHILDREN_NODE-BELLAGIO | AFTER | MOTHER_NODE_AIRPORT | 2 | 2 | 28.57 | 39 | 138.85 |
| 3 | MOTHER_NODE_BELLAGIO | AFTER | MOTHER_NODE_BELLAGIO | 4,312 | 6,809 | 99.81 | 80.75 | ? |
| 4 | MOTHER_NODE_MGM | AFTER | MOTHER_NODE_BELLAGIO | 13 | 13 | 0.19 | 35.77 | 135.88 |

FIG. 11C

| | CELL_POST_CODE | TREND | TOTAL_SUBSC_IN_POSTCODE | SUBSC. | P_SUBS_IN_POSTCODE | P_SUBSC_IN_ALL_POSTCODE | RATE_OF_RETURN | LOC_PLAN_INDEX |
|---|---|---|---|---|---|---|---|---|
| 1 | 11590 | 42.84 | 160,680 | 37,428 | 23.29 | 6.85 | 42.34 | 3.9427 |
| 2 | 11100 | 48.43 | 156,910 | 36,752 | 23.42 | 6.72 | 40.28 | 3.9363 |
| 3 | 11000 | 37.59 | 144,959 | 33,840 | 23.34 | 6.19 | 52.02 | 3.831 |
| 4 | 11570 | 36.03 | 114,968 | 27,657 | 24.06 | 5.06 | 45.78 | 3.654 |
| 5 | 11550 | 41.69 | 101,988 | 25,493 | 25 | 4.66 | 43.69 | 3.6287 |
| 6 | 11870 | 62.45 | 169,632 | 35,689 | 21.04 | 6.53 | 41.07 | 3.6163 |
| 7 | 11560 | 45.23 | 104,097 | 25,097 | 24.11 | 4.59 | 44.78 | 3.5282 |
| 8 | 11850 | 51.23 | 118,691 | 27,090 | 22.82 | 4.96 | 39.08 | 3.5067 |
| 9 | 11800 | 41.61 | 96,004 | 23,614 | 24.6 | 4.32 | 40.41 | 3.4872 |
| 10 | 11510 | 37.12 | 114,406 | 26,174 | 22.88 | 4.79 | 46.46 | 3.4691 |
| 11 | 11840 | 64.07 | 107,837 | 24,397 | 22.62 | 4.46 | 33.57 | 3.3546 |
| 12 | 11200 | 43.17 | 84,149 | 17,613 | 20.93 | 3.22 | 40.29 | 2.8067 |
| 13 | 11930 | 41.01 | 69,722 | 15,528 | 22.27 | 2.84 | 50.15 | 2.7339 |
| 14 | 11320 | 47.37 | 71,587 | 15,528 | 21.69 | 2.84 | 46.92 | 2.7025 |
| 15 | 11910 | 49.77 | 76,085 | 15,988 | 21.01 | 2.93 | 42.13 | 2.6962 |
| 16 | 11010 | 38.84 | 67,477 | 14,669 | 21.74 | 2.68 | 50.96 | 2.631 |
| 17 | 11500 | 48.7 | 51,799 | 12,871 | 24.85 | 2.36 | 35.45 | 2.6235 |
| 18 | 11580 | 43.6 | 51,827 | 12,337 | 23.8 | 2.26 | 34 | 2.5125 |
| 19 | 11529 | 44.3 | 57,009 | 12,871 | 22.59 | 2.36 | 38.01 | 2.5119 |
| 20 | 11300 | 49.77 | 52,845 | 12.285 | 23.25 | 2.25 | 34.57 | 2.4803 |

FIG. 12A

| | LATITUDE | LONGITUDE | SUBSCRIBERS | TOTAL_SUBSC. | P_SUBSC_IN_POINT | P_SUBSC_IN_ALL_POINTS | LOC_PLAN_INDEX |
|---|---|---|---|---|---|---|---|
| 1 | 19.39 | -99.25 | 6,205 | 28,238 | 21.97 | 1.93 | 2.0902 |
| 2 | 19.39 | -99.24 | 4,314 | 19,258 | 22.4 | 1.34 | 1.6999 |
| 3 | 19.4 | -99.24 | 2,623 | 11,494 | 22.82 | 0.81 | 1.207 |
| 4 | 19.41 | -99.24 | 5,291 | 23,695 | 22.33 | 1.64 | 1.9205 |
| 5 | 19.4 | -99.23 | 3,215 | 14,006 | 22.95 | 1 | 1.4085 |
| 6 | 19.41 | -99.23 | 9,802 | 41,492 | 23.62 | 3.05 | 2.7176 |
| 7 | 19.42 | -99.23 | 139 | 522 | 26.63 | 0.04 | 0.0789 |
| 8 | 19.41 | -99.22 | 4,746 | 20,179 | 23.52 | 1.47 | 1.8347 |
| 9 | 19.42 | -99.22 | 6,370 | 26,707 | 23.85 | 1.98 | 2.1998 |
| 10 | 19.43 | -99.22 | 9,402 | 39,886 | 23.57 | 2.92 | 2.6617 |
| 11 | 19.44 | -99.22 | 6,042 | 27,359 | 22.08 | 1.88 | 2.0652 |
| 12 | 19.45 | -99.22 | 9,419 | 43,483 | 21.66 | 2.93 | 2.5436 |
| 13 | 19.42 | -99.21 | 8,153 | 32,165 | 25.35 | 2.53 | 2.5791 |
| 14 | 19.43 | -99.21 | 11,084 | 44,872 | 24.7 | 3.44 | 2.9372 |
| 15 | 19.44 | -99.21 | 17,303 | 68,121 | 25.4 | 5.38 | 3.5377 |
| 16 | 19.45 | -99.21 | 401 | 3,416 | 11.74 | 0.12 | 0.2185 |
| 17 | 19.46 | -99.21 | 3,366 | 19,423 | 17.33 | 1.05 | 1.3258 |
| 18 | 19.4 | -99.2 | 2,296 | 9,220 | 24.9 | 0.71 | 1.1139 |
| 19 | 19.41 | -99.2 | 6,174 | 26,823 | 23.02 | 1.92 | 2.1287 |
| 20 | 19.42 | -99.2 | 11,266 | 43,273 | 26.03 | 3.5 | 3.488 |
| 21 | 19.43 | -99.2 | 18,055 | 70,790 | 25.51 | 5.61 | 3.5966 |
| 22 | 19.44 | -99.2 | 114,576 | 56,645 | 25.73 | 4.53 | 3.3594 |

FIG. 12B

| | Event Date | Appname | Domain | Normalized Domain | Rollup | Representative Domain | Category |
|---|---|---|---|---|---|---|---|
| 1 | | | | | | | |
| 2 | 10/26/2015 6:36:22 | youtube | s.youtube.com | youtube.com | keep | youtube.com | Streaming&downloadable Video |
| 3 | 10/26/2015 6:36:22 | youtube | s.youtube.com | youtube.com | remove | | Streaming&downloadable Video |
| 4 | 10/26/2015 6:36:22 | youtube | r9---sn-ab516ne7.googlevideo.com | googlevideo.com | keep | googlevideo.com | Streaming&downloadable Video |
| 5 | 10/26/2015 6:36:23 | youtube | r3---sn-n2gpou-jx4e.googlevideo.com | googlevideo.com | remove | | Streaming&downloadable Video |
| 6 | 10/26/2015 6:38:54 | youtube | r3---sn-n2gpou-jx4e.googlevideo.com | googlevideo.com | keep | googlevideo.com | Streaming&downloadable Video |
| 7 | 10/26/2015 6:38:54 | youtube | r3---sn-n2gpou-jx4e.googlevideo.com | googlevideo.com | remove | | Streaming&downloadable Video |
| 8 | 10/26/2015 6:38:55 | youtube | r16---sn-ab516ned.googlevideo.com | googlevideo.com | remove | | Streaming&downloadable Video |
| 9 | 10/26/2015 6:38:55 | youtube | r16---sn-ab516ned.googlevideo.com | googlevideo.com | remove | | Streaming&downloadable Video |
| 10 | 10/26/2015 6:38:56 | youtube | r3---sn-p5qlsu7r.googlevideo.com | googlevideo.com | remove | | Streaming&downloadable Video |
| 11 | 10/26/2015 6:38:57 | youtube | r3---sn-p5qlsu7r.googlevideo.com | googlevideo.com | remove | | Streaming&downloadable Video |

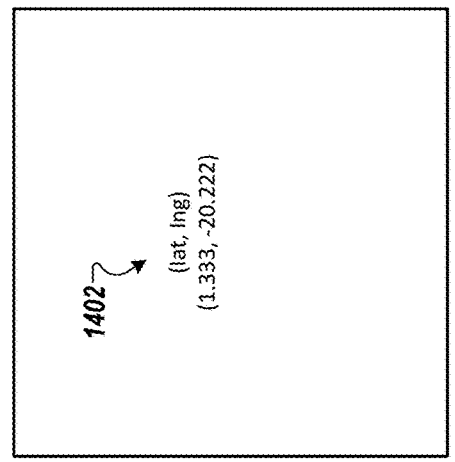

FIG. 14

| ID | LATITUDE | LONGITUDE | TOP_LEFT_LAT | TOP_LEFT_LONG | BOTTOM_RIGHT_LAT | BOTTOM_RIGHT_LNG | SQUARE_SIDE | LAYER |
|---|---|---|---|---|---|---|---|---|
| 2,053 | 36.1125 | -115.18088 | 36.11385 | -115.18255 | 36.11115 | -115.17921 | 300 | 2 |
| 1,388 | 36.15162 | -115.12908 | 36.15297 | -115.13075 | 36.15027 | -115.12741 | 300 | 1 |
| 242 | 36.15747 | -115.22209 | 36.16197 | -115.22766 | 36.15297 | -115.21652 | 1,000 | 1 |
| 153 | 36.07653 | -115.21096 | 36.08103 | -115.21652 | 36.07203 | -115.20539 | 1,000 | 1 |
| 152 | 36.07653 | -115.22209 | 36.08103 | -115.22766 | 36.07203 | -115.21652 | 1,000 | 1 |

FIG. 22

| DCA_ID | MSISDN | DWELL_START_TIME | DWELL_END_TIME | FULL_MINUTES_ELAPSED |
|---|---|---|---|---|
| 312 | 100,143,802 | Aug 12, 2014 6:55:29.0 PM | Aug 12, 2014 7:05:36.0 PM | 10 |
| 231 | 100,587,250 | Aug 4, 2014 5:31:28.0 PM | Aug 4, 2014 6:02:01.0 PM | 30 |
| 230 | 100,003,516 | Aug 7, 2014 9:18:02.0 PM | Aug 7, 2014 9:29:42.0 PM | 11 |
| 230 | 100,388,815 | Aug 7, 2014 4:45:17.0 PM | Aug 7, 2014 5:22:17.0 PM | 37 |
| 1,228 | 100,026,645 | Aug 24, 2014 9:30:44.0 PM | Aug 24, 2014 9:45:40.0 PM | 14 |

| TESTS WITH DCA SIZE = 1000M x 1000M | | | TESTS WITH DCA SIZE = 300M x 300M | | |
|---|---|---|---|---|---|
| Data | LAYER 1 | LAYER 2 | Data | LAYER 1 | LAYER 2 |
| min lat | 36.07653 | 36.08103 | min lat | 36.07203102 | 36.07338102 |
| max lat | 36.15747 | 36.15297 | max lat | 36.16106898 | 36.16241898 |
| min lng | -115.22209 | -115.228 | min lng | -115.2276599 | -115.2293299 |
| max lng | -115.12184 | -115.127 | max lng | -115.1173901 | -115.1157201 |
| Total DCAs | 100 | 90 | Total DCAs | 1088 | 1122 |
| Total dwells | 5030352 | 4642631 | Total dwells | 3370993 | 3364647 |
| Total activities | 123249190 | 115764363 | Total activities | 122031539 | 123875438 |
| Dwells/activities (%) | 4.081448324 | 4.010415 | Dwells/activities (%) | 2.762394892 | 2.716153464 |
| Total dwellers | 321897 | 314892 | Total dwellers | 283725 | 285618 |
| Total subscribers | 420799 | 414368 | Total subscribers | 420081 | 421024 |
| Dwellers/Subscribers (%) | 76.49661715 | 75.99332 | Dwellers/Subscribers (%) | 67.54054575 | 67.83888804 |

2300

$$C_i = \frac{c_i}{\sum_{i=1}^{n} c_i} \times 100 \quad \text{and} \quad S_i = \frac{s_i}{\sum_{i=1}^{n} s_i} \times 100$$

n = number of competitors in the market
$C_i$ = Percent clicks of competitor i
$c_i$ = clicks of competitor i
$S_i$ = Percent subscribers of competitor i
$s_i$ = subscribers of competitor i $$BVI_i = \frac{C_i + S_i}{2}$$

$BVI_i$ = average of $C_i$ and $S_i$

2502

FIG. 25A $$C_i = \frac{c_i}{\sum_{i=1}^{n} c_i} \times 100 \quad \text{and} \quad DS_i = \frac{ds_i}{\sum_{i=1}^{n} ds_i} \times 100$$

2504 n = number of competitors in the market
$C_i$ = Percent clicks of competitor i
$c_i$ = clicks of competitor i
$DS_i$ = Percent digital subscribers of competitor i
$ds_i$ = Digital subscribers of competitor i

FIG. 25B $$DD_i = \frac{dd_i}{\sum_{i=1}^{n} dd_i} \times 100 \quad \text{and} \quad PD_i = \frac{pd_i}{\sum_{i=1}^{n} pd_i} \times 100$$

2506 n = number of competitors in the market
$DD_i$ = Percent average digital dwell time for competitor i
$PD_i$ = Percent average physical dwell time for competitor i
$dd_i$ = Average digital dwell for competitor i
$pd_i$ = Average Physical dwell for competitor i

FIG. 25C

2508
$$AC_i = \frac{ac_i}{\sum_{i=1}^{n} ac_i} \times 100$$

n = number of competitors in the market
$AC_i$ = Percent average clicks per session for competitor i
$ac_i$ = Average click per session for competitor i

FIG. 25D

2510
$$PS_i = \frac{ps_i}{\sum_{i=1}^{n} ps_i} \times 100$$

n = number of competitors in the market
$PS_i$ = Percent physical subscribers for competitor i
$ps_i$ = physical subscribers for competitor i

FIG. 25E

2512
$$PDS_i = \frac{pds_i}{\sum_{i=1}^{n} pds_i} \times 100$$

n = number of competitors in the market
$PDS_i$ = Percent physical + digital subscribers for competitor i
$pds_i$ = Physical + digital subscribers for competitor i

FIG. 25F

$$DBR_i = \frac{dbr_i}{\sum_{i=1}^{n} dbr_i} \times 100 \quad PBR_i = \frac{pbr_i}{\sum_{i=1}^{n} pbr_i} \times 100$$

2514 n = number of competitors in the market
$DBR_i$ = Percent digital bounce rate for competitor i
$PBR_i$ = Percent physical bounce rate for for competitor i
$dbr_i$ = Count of digital subscribers that viewed 1 page, over total entries to page for competitor i
$pbr_i$ = Count of physical subscribers that stayed on the POI for only 10min over, all subs for competitor i

FIG. 25G

$$DRR_i = \frac{drr_i}{\sum_{i=1}^{n} drr_i} \times 100 \quad PRR_i = \frac{prr_i}{\sum_{i=1}^{n} prr_i} \times 100 \quad \Big\} 2516$$

n = number of competitors in the market
$DRR_i$ = Percent digital return rate for competitor i
$PRR_i$ = Percent physical return rate for for competitor i
$drr_i$ = Count of digital subscribers that returned to the page within a week, over all subs for competitor i
$prr_i$ = Count of physical subscribers returned, over all subscribers for competitor i

FIG. 25H

ENHANCED DATA COLLECTION AND ANALYSIS FACILITY

CLAIM OF PRIORITY

This application claims priority under 35 USC § 120, and claims priority to U.S. patent application Ser. No. 15/581,556, filed on Apr. 28, 2017, the entire contents of which are hereby incorporated by reference.

TECHNICAL FIELD

This description generally relates to collecting and analyzing data to provide presentation paradigms for such data.

BACKGROUND

There are more mobile devices in the world today than ever before in history. The proliferation of mobile devices has changed the ways in which people communicate, live, and engage with others for both personal and business reasons. As more consumers become connected around the world through mobile devices, smartphones, the Internet, etc., these interactions between consumers may generate large quantities of data. In addition, the continuing evolution of Internet of Things (IoT) technology and Machine-to-Machine (M2M) initiatives generate additional quantities of data. The volume, scale, and velocity of data usage and storage can make effective data analysis difficult.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. A first general aspect includes a computer-implemented method for generating a classification model to determine predictive user behavior. The method may include obtaining data from a mobile network provider where the data includes a plurality of utilization metrics pertaining to a plurality of mobile devices carrying out a plurality of network interactions. The plurality of mobile devices may be associated with a plurality of users. The method may also include categorizing the data into a plurality of internet domains associated with the data. The method may also include determining a plurality of patterns in the data where the plurality of patterns are used to correlate a first category represented in the data with at least a portion of the plurality of internet domains. The method may also include determining an additional pattern in the data where the additional pattern correlating a second category represented in the data with at least a portion of the plurality of internet domains. The method may further include generating a plurality of rules based on the plurality of patterns and the additional pattern. Other embodiments of this aspect include corresponding computer systems, apparatus, and computer programs recorded on one or more computer storage devices, each configured to perform the actions of the methods.

Implementations may include one or more of the following features. The method as described above and further including obtaining additional data from one or more mobile network providers, applying the plurality of rules to the additional data to classify the data according to one or more of the plurality of patterns, and generating a plurality of age bands, each of which correlate to at least one of the plurality of patterns represented in the data. The method may also include generating at least two gender groups, one of which correlates to the additional pattern represented in the data and generating, for presentation in a graphical user interface, a plurality of graphical reports indicating behavior for mobile device users represented in the additional data. The behavior may be indicated in the plurality of patterns and graphed according to age band and gender. In response to receiving a request to view analysis of the additional data, the method may include presenting, in the graphical user interface, at least one of the plurality of graphical reports. The method may further include grouping the plurality of internet domains into a plurality of content topics representing the data, determining browsing patterns in the data according to the plurality of content topics, the behavior being identified and processed according to a plurality of predefined age bands and gender groups, and generating a plurality of updated rules based on the determined browsing patterns. The method may further include determining that a portion of the plurality of utilization metrics include automated mobile device network activities and before categorizing the data into the plurality of internet domains, filtering the portion from the data. The filtering being based at least in part on a plurality of mobile call rules. The method where the mobile call rules pertain to call time, call duration, gap duration consistency, devices called, and device location.

The method may further include the plurality of internet domains being defined using a browsing profile associated with one or more of the plurality of mobile devices. The method where the plurality of utilization metrics are associated with one or more voice transaction, short message service transaction, http access transaction, and location transaction. The method may further include filtering the data by selecting and removing a portion of the internet domains from the data in response to determining that the data represents less than a predefined threshold time for visiting the internet domains. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In another general aspect includes, the method may include filtering the data by selecting and removing a portion of the internet domains from the data, in response to determining that the data represents less than a predefined threshold time for visiting the internet domains.

A computer program product is described for generating a classification model to determine predictive user behavior, the computer program product being tangibly embodied on a non-transitory computer-readable storage medium and including instructions that, when executed by at least one computing device, are configured to cause the at least one computing device to obtain data from a mobile network provider, the data including a plurality of utilization metrics pertaining to a plurality of mobile devices carrying out a plurality of network interactions, the plurality of mobile devices being associated with a plurality of users, categorize the data into a plurality of internet domains associated with the data; determine a plurality of patterns in the data, the plurality of patterns being used to correlate a first category represented in the data with at least a portion of the plurality of internet domains, determine an additional pattern in the data, the additional pattern correlating a second category represented in the data with at least a portion of the plurality of internet domains, and generate a plurality of rules based on the plurality of patterns and the additional pattern. The computer program product may also include instructions that are further configured to cause the at least one computing device to obtain additional data from one or more mobile network providers, apply the plurality of rules to the additional data to classify the data according to one or more of the plurality of patterns, generate a plurality of age bands each of which correlate to at least one of the plurality of patterns represented in the data, generate at least two gender groups, one of which correlates to the additional pattern represented in the data, and generate, for presentation in a graphical user interface, a plurality of graphical reports indicating behavior for mobile device users represented in the additional data, the behavior indicated in the plurality of patterns and graphed according to age band and gender. The computer program product may also include instructions that are further configured to present, in the graphical user interface, at least one of the plurality of graphical reports, in response to receiving a request to view analysis of the additional data. Other embodiments of this aspect include corresponding computer systems, apparatus, and computer programs recorded on one or more computer storage devices, each configured to perform the actions of the methods. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

FIGS. 5A-5H depict example screenshots of user interfaces for assessing consumer insight information.

FIGS. 11A-11C are example output results of implementing an algorithm for predicting a physical journey of a user.

FIGS. 12A-12B are example reports generated when implementing the location planning algorithm described herein.

FIG. 13 is an example clickstream generated when implementing the HTTP noise filtration algorithm described herein.

FIG. 14 is an example representation of a virtual cell.

FIG. 22 is an example of sample data for pre-processed dwell data.

FIG. 23 is an example of overall test results for dwell generation with different sizes of dwell calculation areas.

FIG. 25A-25H depict example equations usable to predict consumer behavior.

Like reference symbols in the various drawings indicate like elements.

DETAILED DESCRIPTION

Figure 1A:
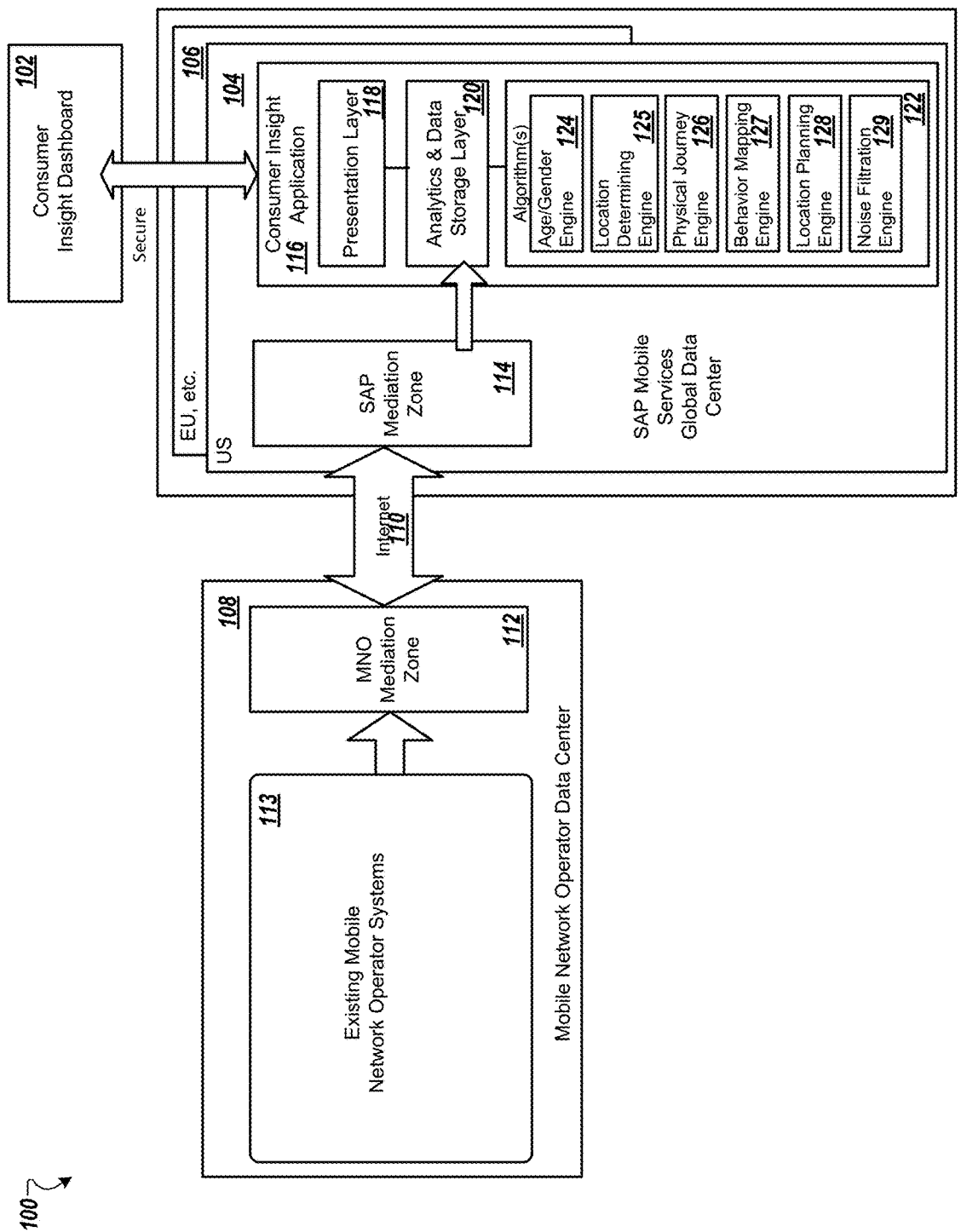
FIGS. 1A-1D represent diagrams of example architecture that can implement the user interfaces and algorithms described herein.

The proliferation of mobile (e.g., smart) devices has significantly changed the behavior of mobile enabled consumers and how such consumers interact with the brands and the physical world. The interactions may be monitored and measured to determine changes in behavior, out of home consumption and sharing of information, consumer to brand interactions and rich media content interaction. The systems and methods described herein can use the interactions (represented as data) to predict future behavior. In some implementations, the interactions can be provided as data points from a mobile provider (e.g., mobile network service provider). The interaction data can be used to determine sociodemographics of mobile device users at different levels of detail. However, the lowest level of detail with consumer identification information is not obtained or used by the systems described herein to ensure that consumers cannot be personally identified. This also ensures that the algorithms used in such systems adhere and comply with consumer data and privacy laws and regulations.

Mobile network data can be used to increase knowledge about mobility profiles of users in a number of locations around the world. Such knowledge can be used in many applications to provide services to consumers. A useful feature of any mobility profile is the knowledge of home and work place locations for mobile device users. Home and work place distribution of a city also helps in making urban development decisions. However, such data would typically be collected via surveys and thus be limited in size. The systems and methods described herein can use large mobile network data to predict and validate home and work place locations for mobile device users.

In order to function and route calls, a service provider for mobile device operation is typically aware of a cell in which each mobile device is present. The cells are of varying size, from a few kilometers in low-density areas, to a few meters within cities. This can enable service providers a record of the movement of each device. The movement and location can be used to predict future user (i.e., mobile device) behavior.

The systems and methods described herein can be used to analyze the behavior patterns of user location visits by employing a number of algorithms and mobile network data to predict, age and gender of users accessing mobile devices, probable home and work locations, physical journey routes and dwell times, and to predict social demographics. The mobile network data may pertain to a mobile service provider data captured over one or more months of mobile device usage. Mobile network data may pertain to the service log when a mobile device is connected to a mobile network. The service log may contain anonymized identification data (ID), latitude, longitude, time stamp and service type information (e.g., voice, SMS, and data records). Models may be built using the algorithms described herein to analyze and predict behavior patterns of mobile device users.

In some implementations, the systems and methods described herein can provide web-based services for analyzing and reporting on consumer behavior based on anonymized mobile operator (e.g., consumer mobile device) records. A number of algorithms can be executed to generate searchable and intuitive user interfaces for accessing insightful reports including, but not limited to actual and predictive heat maps, charts, graphs, and related data. The algorithms can provide the advantage of determining who, what, where, and when of consumer behavior, as the behavior pertains to variables detectable with mobile devices. The algorithms can be used to measure and improve marketer/retailer websites, mobile apps, advertising, and marketing effectiveness.

In some implementations, the systems and methods described herein can provide interaction data through a smart searchable portal. The portal can acquire mobile consumer data and provide an empirical source of consumer behavior, insights and market intelligence, population scale as well as high definition detail for such populations. The portal can also provide rapid access to data without any apps to install, customer panels, or surveys. In some implementations, the portal can enable mobile device operators to monetize consumer data by using fully anonymized and aggregated interaction data containing no personal information.

In general, the portal provides a cloud-based analytics service that can utilize SAP HANA repositories and technologies. The portal may be provided as part of such a service (e.g., consumer insight services) to enable an open environment allowing operational analytics and reporting on mobile network acquired consumer data. Based on analytical views, business users may gain new ways to analyze operational data to build customized reports and documents.

The services described herein can may provide the advantage of enabling brand advertisers/owners to answer several seminal questions about particular customers—who they are, what they are doing, where are they coming from, what web sites they are searching. Such information can provide an enhanced attribution of ad campaigns, cohort segmentation for targeted marketing, improvement of advertising ROI by understanding mobile web behavior and physical activities.

In some implementations, the services described herein can enable a span of use cases, including physical footfall and catchment capabilities, and enablement attribution of ad campaigns. For example, if an ad campaign were to be initiated, enterprises can be made aware of whether the ads brought in the intended uplift in physical traffic into a given store using the service. Capturing such data can be difficult and brands generally rely on panel data. The services can also provide competitive benchmarking (e.g., who went through Target), ad strategy (e.g., where should I send circulars, hole in the basket analysis (e.g., where did my consumers go before and after). The services can solve these challenges by one or more of performing advanced demographic segmentation about real-time behavior, for any given place of interest, identifying top home locations where customers are coming from at a given point in time, and tracking consumer activities, including web-browsing history all based on the single source of truth—anonymized mobile data.

In some implementations, the services described herein can implement algorithms for determining particular demographics of people are coming through (a store). In some implementations, the services described herein can also compute dwell time, input rate, and exit rate over time and across multiple locations. In some implementations, the services described herein can compare competitors and location over time, and determine value (e.g., enables brands and/or ad agencies to understand ad effectiveness, demographics).

In some implementations, the services described herein can determine where the users are traveling from (e.g., determine home location of consumers, to drive circular advertising campaigns, display origin of home location for a given retail store or location, list top ten locations of origin Value to enables brands/advertising agencies to understand where they should spend advertising dollars.

In some implementations, the services described herein can also determine what the consumers are doing and can optimize digital advertising return on investment (ROI) by understanding consumer digital click through behavior. In some implementations, the services described herein can determine what are people are searching for in a particular location. In some implementations, the services described herein can also determine the digital advertisement ROI (e.g., where did it break in the conversion chain).

In order to effectively utilize massive amounts of data associated with mobile devices and user activities, the systems and methods described herein can facilitate data analysis by leveraging mobile services and large scale database structures (e.g., SAP HANA) to process data and generate user interface content providing an insight into the data. Such insight can pertain to user behavior patterns associated with movement and/or visits surrounding particular locations (e.g., points or interest (POI) or areas of interest (AOI).

The systems and methods described herein can analyze the behavior patterns and utilize prediction algorithms for determining a probable home location and a probable work location. The prediction algorithms can use mobile network data pertaining to a mobile service provider for particular users. The mobile network data may access and/or generate a service log when a particular mobile phone is connected to a mobile network. The service log includes, for example, anonymized identifiers, latitude, longitude, time stamp and service type (e.g., voice, SMS, data records, MMS, etc.).

FIG. 1A is a block diagram of an example architecture 100 for generating and accessing consumer insight data. In particular, the architecture 100 includes infrastructure to generate a consumer insight dashboard 102 that can access mobile services data center(s) 104, 106 (and others not shown). The data centers 104, 106 can access one or more mobile network operator data center 108 via the Internet 110. The mobile network operator data center 108 includes a mobile network operator (MNO) mediation zone 112 that can communicate over the Internet 110 to SAP mediation zone 114. The MNO mediation zone 112 extracts data from existing mobile network operators and their operational systems 113. In some implementations, the MNO mediation zone 112 anonymizes data before providing content to zone 114. In some implementations, the MNO mediation zone 112 can provide batches of data to global data centers such as 104 and 106 via their respective SAP mediation zones (e.g., zone 114).

The mediation zone 112 collects and processes data from MNO systems (e.g., MNO system 113) and then sends such data to SAP mediation zone 114. The SAP mediation zone 114 can check and load data into a consumer insight application 116. The consumer insight application 116 can retrieve and process such data and provide maps, reports, insight, and/or output to a user in the consumer insight dashboard 102. The consumer insight application 116 can provide security for user data. The security features may include strong encryption of sensitive fields (e.g., MSIN, IMEI and Account Numbers). The application 116 can provide further security by using truncated zip/postal codes for home locations, minimum sizes of result sets, no response if the response is too small, dashboard only access, and no direct access to data (i.e., SQL-API possible in future with same result set restriction, each MNO's data stored separately at SAP Data Center, secure data transmissions and S/FTP over (VPN), IPX options, user ID and password required for access, and HTTP/S browser communications).

In operation, the data collector can gather data from mobile network operator data centers 108. The data can then be preprocessed (e.g., decoded, de-duplicated, validated, reformatted, filters, etc.) and processed (e.g., split, anonymized, aggregated, session identified, correlated, joined, etc.). The data processing can also include using the received data with any of the algorithms described herein. The processed data can be forwarded to zone 114, for example. The processed data can then be provided at consumer insight application 116 for presentation on dashboard 102.

The consumer insight application 116 can provide location planning, cohort analysis, mobile handset analysis, catchment analysis, footfall analysis, clickstream analysis and/or custom insight analysis configured by a user. The consumer insight application includes a presentation layer 118, an analytics and data storage layer 120, and algorithms 122. The presentation layer 118 enables a number of user interfaces for providing insight reports to users. Insight reports include analysis and packaging of consumer mobile device user(s) behavior for a selected location or point/area of interest.

The algorithms 122 include an age and gender modeling algorithm, a home location prediction algorithm, a work location prediction algorithm, a physical journey using dwell time algorithm, a location planning algorithm, a noise filtration algorithm, a mapping human behavior algorithm, a social demographic algorithm, and a mobile brand value algorithm. An age/gender engine 124 can be programed as described below to carry out the age and gender modeling algorithm.

Figure 1B:
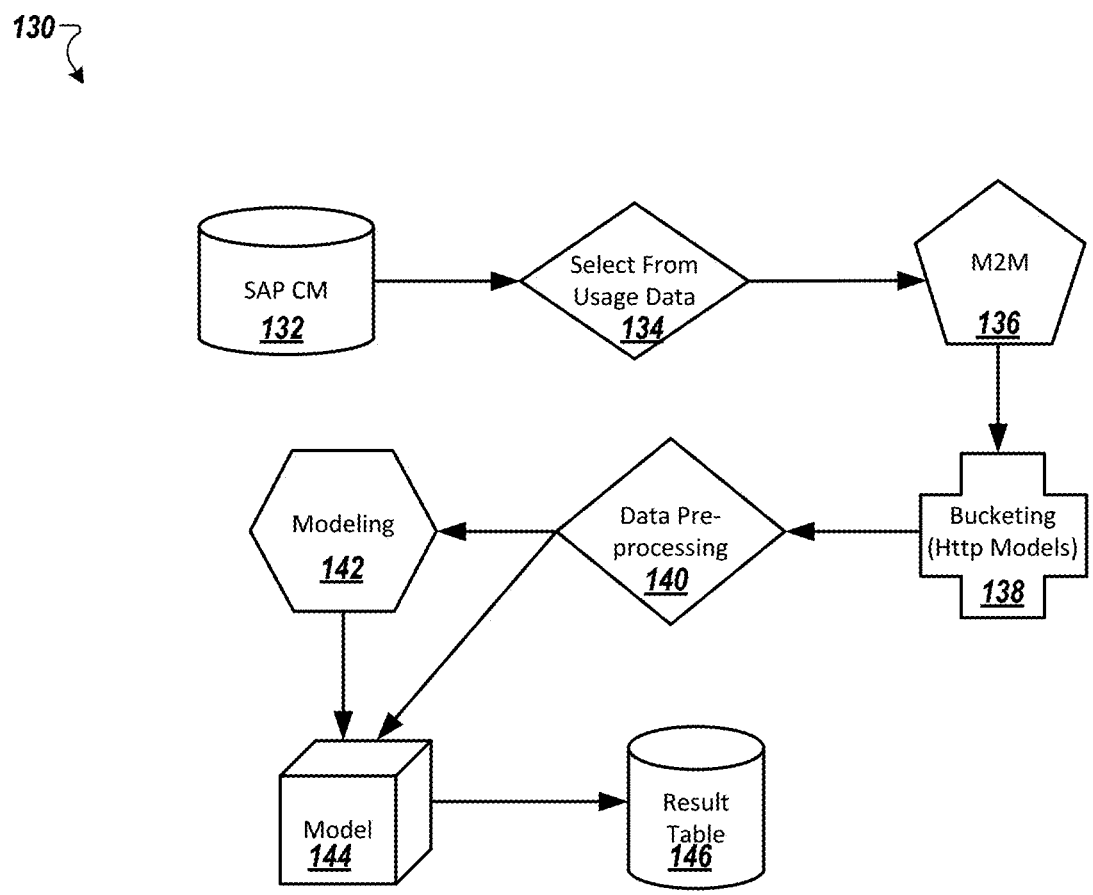

FIG. 1B is a flow diagram depicting an example process 130 of a model prediction stream. The process 130 includes obtaining 132 data from a customer management database and determining 134 which usage data to utilize. The machine to machine (M2M) data (e.g., calls/actions) can be determined 136 and grouped (e.g., bucketed) 138 in HTTP models according to whether a machine initiated the action or a user. Data that is not M2M data (e.g., not initiated by a machine) is selected and preprocessed 140. The pre-processed data can be modeled 142 according to one or more models 144. The models can output any number of result tables 146 within consumer insight dashboard 102, for example.

Figure 1C:
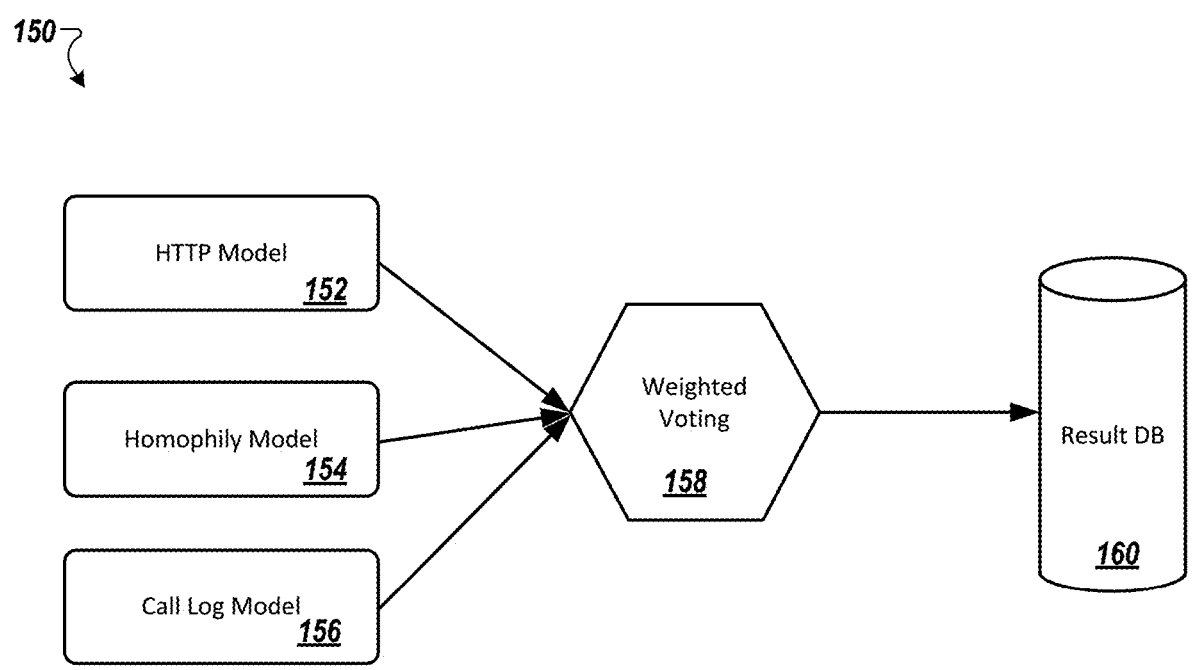

FIG. 1C is a flow diagram depicting an example process 150 of modeling approaches usable with the architecture described herein. As model accuracy varies based on different approaches, three modeling approaches are used with the architectures described in FIGS. 1A and 1B. An HTTP model 152, an homophily model 154, and a call log model 156 have been employed and weighted 158. The weighted results are provided to a result data repository 160. Additional detail about such models is described with respect to the age and gender modeling algorithms below.

The HTTP model 152 may be based on the HTTP categories. In these models, Internet domains may be categorized into standard categories including, but not limited to new, sports, entertainment, contain server, technology, etc. The model can be configured to reduce a large number of categories into 20 or so major categories. The categories may, for example, include Technology, Education and Career, Health, Family, Lifestyle, Banking, Travel, Service and Profession, Geography, Information, Religion, Food, Miscellaneous, Households, Leisure and Hobby, Automobiles, Sports, Kids, Social, News, and Pornography. Models based on grouped categories may outperform the models based on simple category models and so only category grouped modeling results are used in the age and gender algorithms.

The homophily model 154 is based on the assumption that similar age peoples interacts more. In this process, model inputs include connections of subscribers with other subscribers on different age bands. A classification model may be trained to learn the homophily patterns from the data. Homophily plots can be obtained to determine numbers for call volume or call connections across caller and called users age. An age band of 18 years old to 72 years old may be selected. Age band and gender classification models may be constructed to consider such homophily data. Thus every user communication volume or connection strength can be used as input attributes and then these can be modeled against and age band and gender. A decision tree algorithm and a SVM classification algorithm can be used here.

The call log model 156 may extract the calling behavior of different age and gender peoples. This model can consider both voice call and SMS based communications data. Example input attributes considered for these models may include the following rules.

Based on Weekly calls: Average of Weekly incoming/outgoing SMS calls ("WEEKLY_IN_S"/"WEEKLY_OUT_S"), Average of Weekly incoming/outgoing voice calls ("WEEKLY_IN_V"/"WEEKLY_OUT_V"), Minimum of Weekly incoming/outgoing SMS calls ("WKLY_MIN_I_S"/"WKLY_MIN_O_S"), Maximum of Weekly incoming/outgoing SMS calls ("WKLY_MAX_I_S"/"WK- LY_MAX_O_S"), Minimum of Weekly incoming/outgoing voice calls ("WKLY_MIN_I_V"/"WKLY_MIN_O_V"). Maximum of Weekly incoming/outgoing voice calls ("WKLY_MAX_I_V"/"WKLY_MAX_O_V")

Based on Weekday calls: (Monday To Friday): Average of Weekday incoming/outgoing SMS calls ("WEEKDAY_IN_S"/"WEEKDAY_OUT_S"), Average of Weekday incoming/outgoing voice calls ("WEEKDAY_IN_V"/"WEEKDAY_OUT_V")

Based on Weekday call duration: (Monday to Friday): Average of Weekday incoming/outgoing voice call duration ("WKDAY_DUR_IN_V"/"WKDAY_DUR_DUR_V")

Based on Weekend calls: (Saturday and Sunday): Average of Weekend incoming/outgoing SMS calls ("WEEKEND_IN_S"/"WEEKEND_OUT_S"), Average of Weekend incoming/outgoing voice calls ("WEEKEND_IN_V"/"WEEKEND_OUT_V")

Based on Weekend call duration: (Saturday and Sunday): Average of Weekend incoming/outgoing voice call duration ("WKEND_DUR_IN_V"/"WKEND_DUR_DUR_V")

Based on Number of calls from/to most top 10 contacts: Number of incoming/outgoing SMS calls to/from most top 10 contacts ("S_I_CALL"/"S_O_CALL"), Number of incoming/outgoing voice calls to/from most top 10 contacts, ("V_I_CALL"/"V_O_CALL")

Based ON Fortnightly calls: Average of Fortnightly incoming/outgoing SMS calls ("FN_IN_S"/"FN_OUT_S"), Average of Fortnightly incoming/outgoing voice calls ("FN_ IN_V"/"FN_OUT_V")

Based on Monthly Calls: Total incoming/outgoing SMS calls ("SI"/"SO"), Total incoming/outgoing voice calls ("VI"/"VO"), Total call duration of incoming/outgoing voice calls ("VID"/"VOD")

Based on Different Time slots: Total Incoming/outgoing SMS calls for 6 AM to 1 PM ("MSI"/"MSO"), Total Incoming/outgoing voice calls for 6 AM to 1 PM ("MVI"/"MVO"), Total Incoming/outgoing SMS calls for 1 PM to 6 PM ("ASI"/"ASO"), Total Incoming/outgoing voice calls for 1 PM to 6 PM ("AVP"/"AVO"), Total Incoming/outgoing SMS calls for 6 PM to 10 PM ("ESI"/"ESO"), Total Incoming/outgoing voice calls for 6 PM to 10 PM ("EVI"/"EVO"), Total Incoming/outgoing SMS calls for 10 PM to 12 AM ("NSI"/"NSO"), Total Incoming/outgoing voice calls for 10 PM to 12 AM ("NVI"/"NVO"), Total Incoming/outgoing SMS calls for 12 AM to 6 AM ("LNSI"/"LNSO"), Total Incoming/outgoing voice calls for 12 AM to 6 AM ("LNVI"/"LNVO")

Based on Tower Usage: Total Distinct Towers used on weekdays ("TOWER WE"), Total Distinct Towers used on weekends ("TOWER_WD")

Based on Distance Travelled: Average of Weekly Distance Travelled ("WEEKLY_DIST"), Average of Weekday Distance Travelled ("WEEKDAY_DIST"), Average of Weekend Distance Travelled ("WEEKEND_DIST")

The weighted voting model 158 may be used to combine the results of all three modeling algorithms. This model may give more weight to HTTP and homophily based modeling process, as they are more accurate. One example of weighting the models is to apply a weight of 0.3 to HTTP models, a weight of 0.1 to call log models, and 0.6 to homophily models.

Figure 1D:
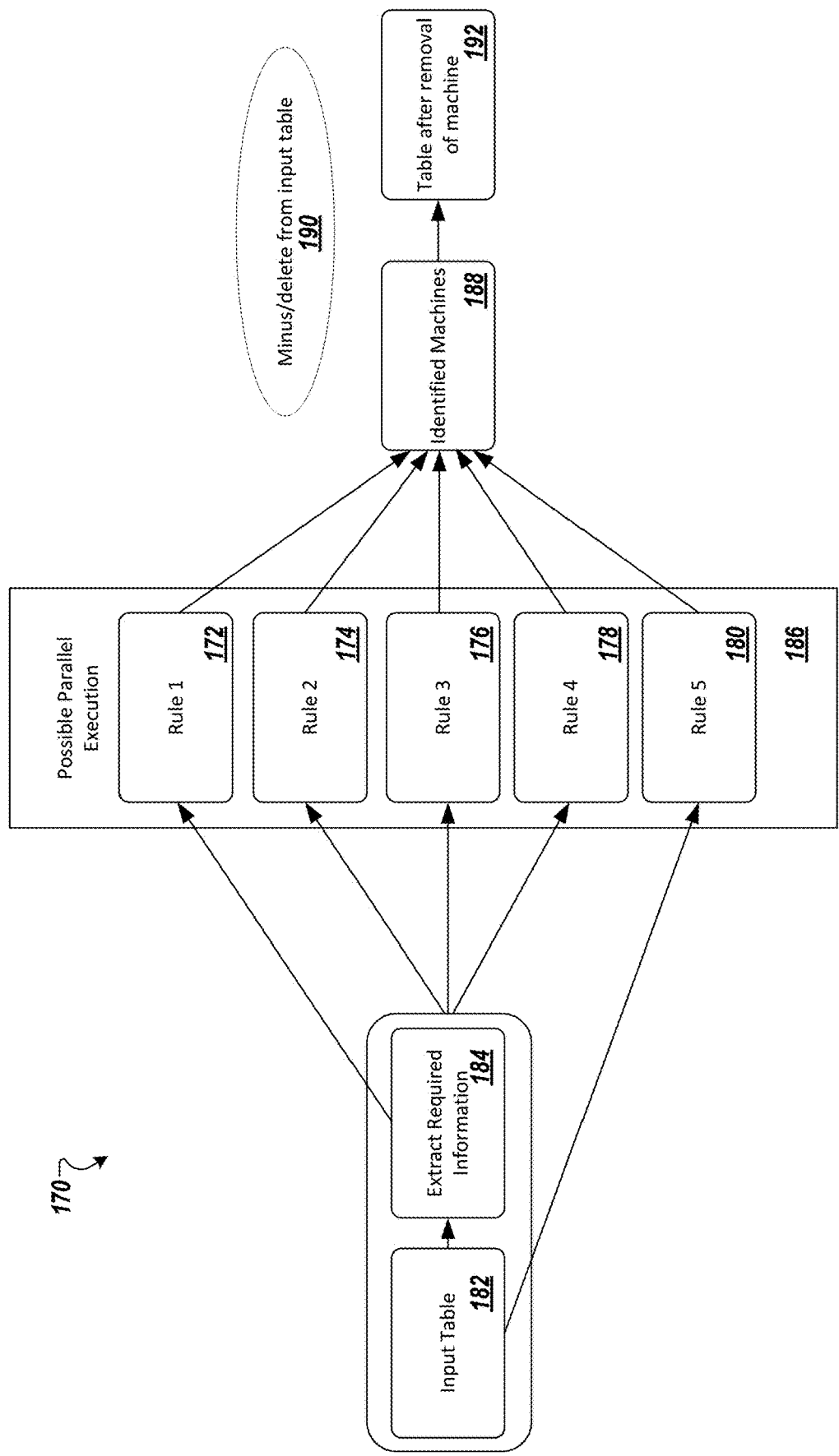

FIG. 1D is an example flow diagram 800 for using rules for removing machine-based action data usable with the systems and methods described herein. Any number of rules may be used alone or in combination. The rules may also be applied in parallel or in sequential order. Rule 172 may pertain to large call volumes. For example, users that make more than 2000 SMS calls and/or 1500 voice call in a monthly time period may satisfy rule 172.

Rule 174 may pertain to users that have call duration consistency. For example, if a user is making 100 calls in a month and out of 100 calls, more than 50 calls have the same call duration and such behavior occurs for more than twenty days, then the systems described herein can determine that the "user" is a machine (e.g., the call activity is machine initiated).

Rule 176 pertains to gap duration consistency. Users that exhibit gap duration consistency in voice call and SMS calls may satisfy rule 176. For example, if a user is making 100 calls in a month and out of 100 calls, more than 50 have the same gap duration (i.e., duration between two consecutive calls), and such behavior occurs for more than twenty days, then the systems described herein can determine that the "user" is a machine (e.g., the call activity is machine initiated).

Rule 178 pertains to communication with a single device. Users that use a single cellular tower for more than 90 percent of the calls may satisfy rule 178. For example, if a user is making 100 calls and out of 100 calls, more than 90 calls have been made/received using/from a single cellular tower (for more than 20 days in a month), then the systems described herein can determine that the "user" is a machine (e.g., the call activity is machine initiated).

Rule 180 pertains to a stationary device. Users that use a single tower in an entire month may satisfy rule 180. For example, if a user is making 100 calls in a month and all are made/received from a single cellular tower, then the systems described herein can determine that the "user" is a machine (e.g., the call activity is machine initiated).

In operation, the architecture 100 can receive or retrieve 182 one or more input tables, extract 184 information and execute 186 one or more rules on the extracted information. The rules can identify 188 which devices are being utilized and call-initiated by users that are human and which devices are call-initiated by machine users. The list of devices initiating calls by human users can be appended to or modified 190 according to one or more algorithms described herein. A table of devices initiating calls by human users can be output 192 for further analysis.

Figure 2:
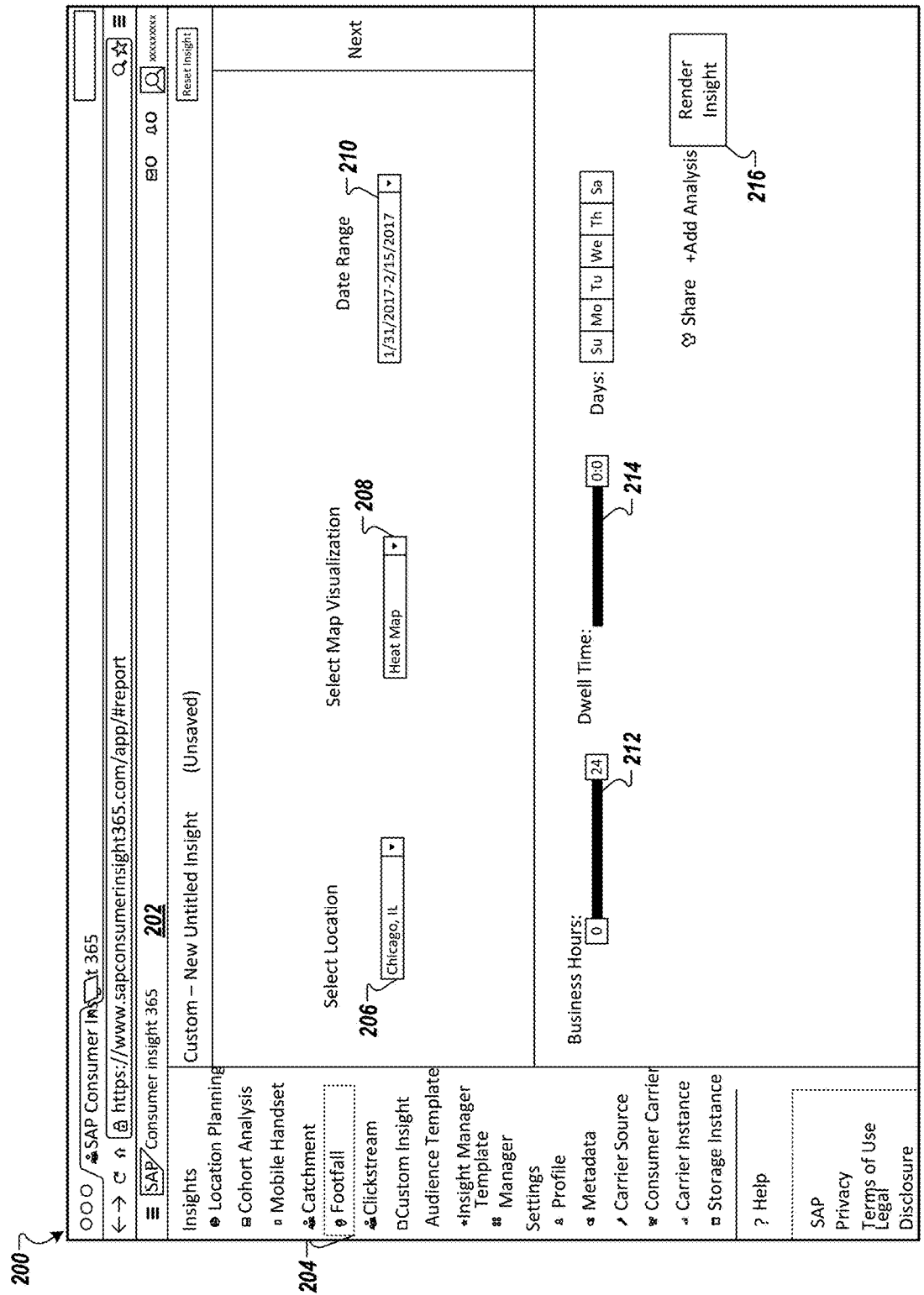
FIG. 2 depicts an example screenshot of a user interface for entering data to retrieve consumer insight information.

Referring to FIG. 2, an example screenshot 200 of the consumer insight application 116 depicts a dashboard 202 in which a user can gain insight about consumer behavior. In this example, a user has selected to analyze a particular footfall of a set of consumers. For example, the user has selected a footfall insight 204. The user is prompted to select a location for the footfall analysis and has selected Chicago, Ill. using control 206. The user is prompted to select a map visualization and has selected a heat map visualization using control 208. The user is also prompted to select a date range and has selected Jan. 31, 2017-Feb. 15, 2017 at control 210.

Next, the user may be prompted to select, at control 212, business hours for analysis as well as days of the week to analyze. The user may also be prompted to select a dwell time tolerance at control 214 to indicate a length of time that a user has visited a particular selected location. The user can then select a render insight control 216 to begin analysis with the configuration settings selected in controls 204-214.

Figure 3:
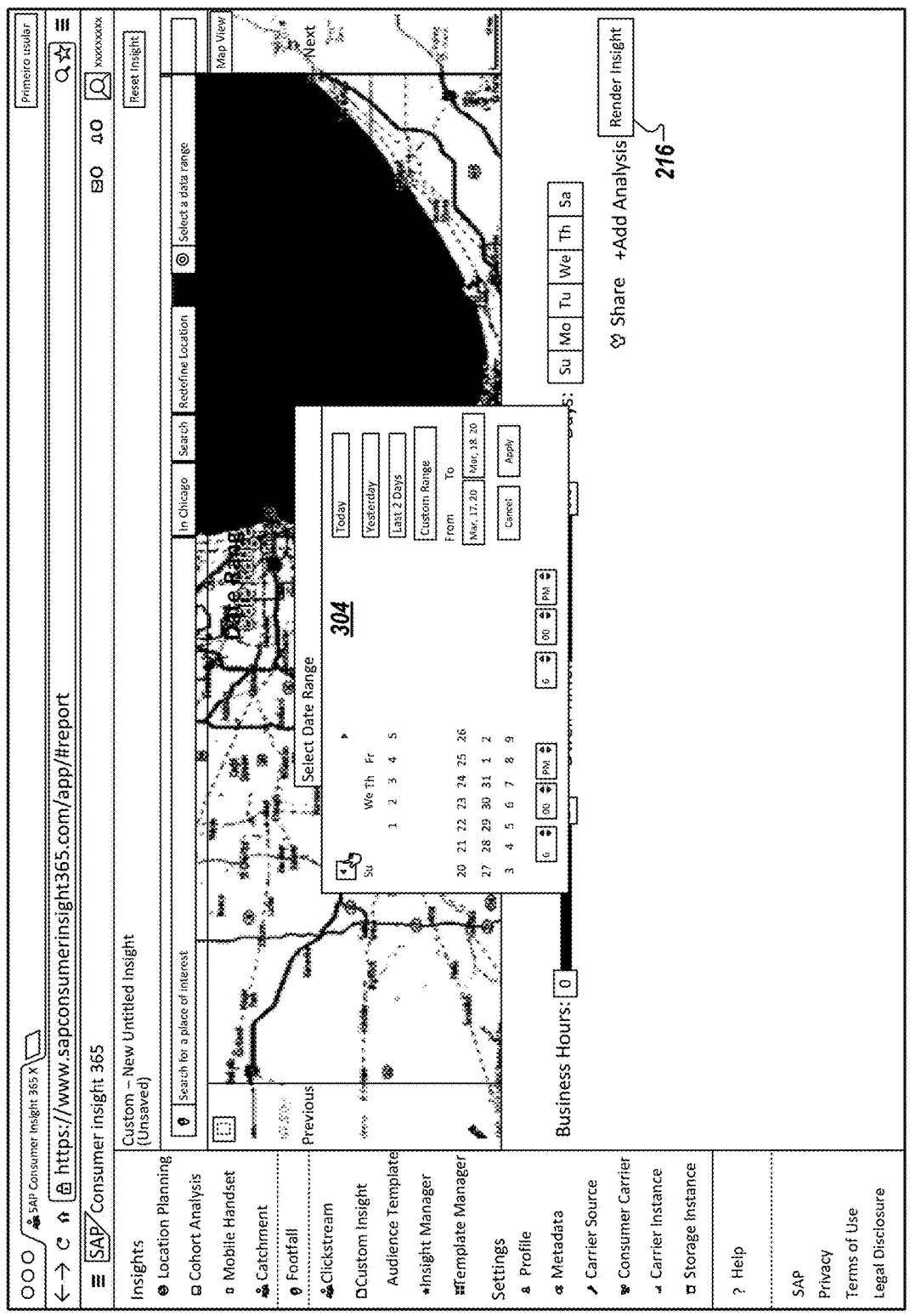
FIG. 3 depicts an example screenshot of a user interface for entering additional data to retrieve consumer insight information for a specific location and time.

In some implementations, a number of controls 204-214 may include additional selectable settings. For example, FIG. 3 illustrates an example screenshot 300 that may be provided for a user to select a date range with a number of additional selectable items. Here, the locational map has been populated since the user already selected the location with control 206. The data range options can be modified using options in popup 304. In particular, the user can select particular day ranges (e.g., today, yesterday, last two days, etc.) or may specify the custom range and time of day. These controls can provide granular data analysis down to the minute, should the user wish to analyze footfall or other metric at a small level of granularity. Upon completing the date range specifics, the user can render insight again using control 216.

Figure 4:
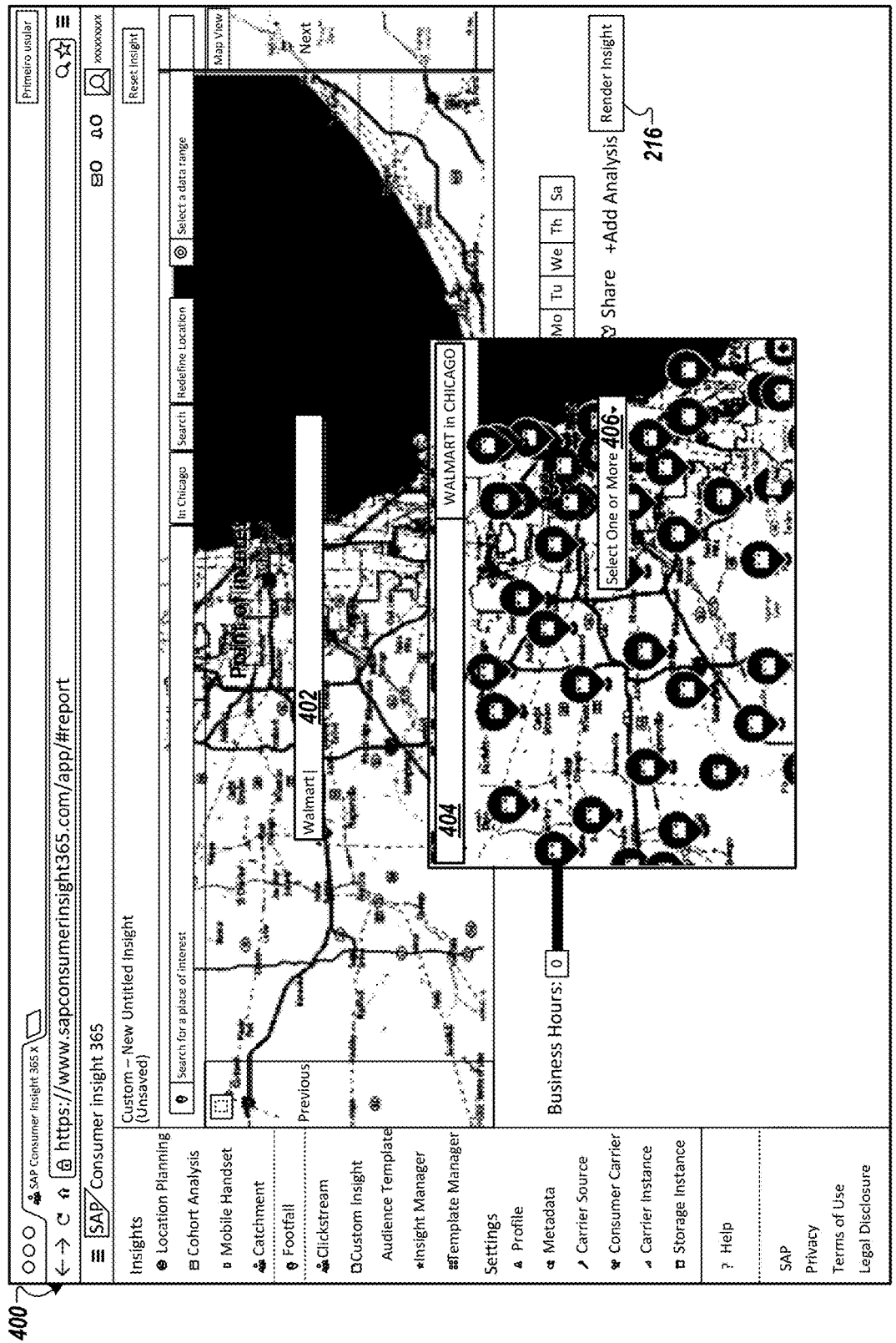
FIG. 4 depicts an example screenshot of a user interface for entering additional data to retrieve consumer insight information.

FIG. 4 illustrates an example screenshot 400 that may be provided for a user to select a specific point or area of interest. In the depicted example, the user typed in "Walmart" at box 402 to be provided with a number of Walmart stores in the Chicago area, as shown by map 404. The user can then be prompted with additional menu items or controls. For example, the popup map 404 includes a control 406 to select one or more of the mapped locations for Walmart. Upon completing a selection (or clearing control 406), the user can then select the render insight control 216 to view consumer insight data for a Chicago location, particular business hours and/or days of the week, during the dates of Jan. 31, 2017-Feb. 15, 2017, and for selected Walmart stores.

Figure 5A:
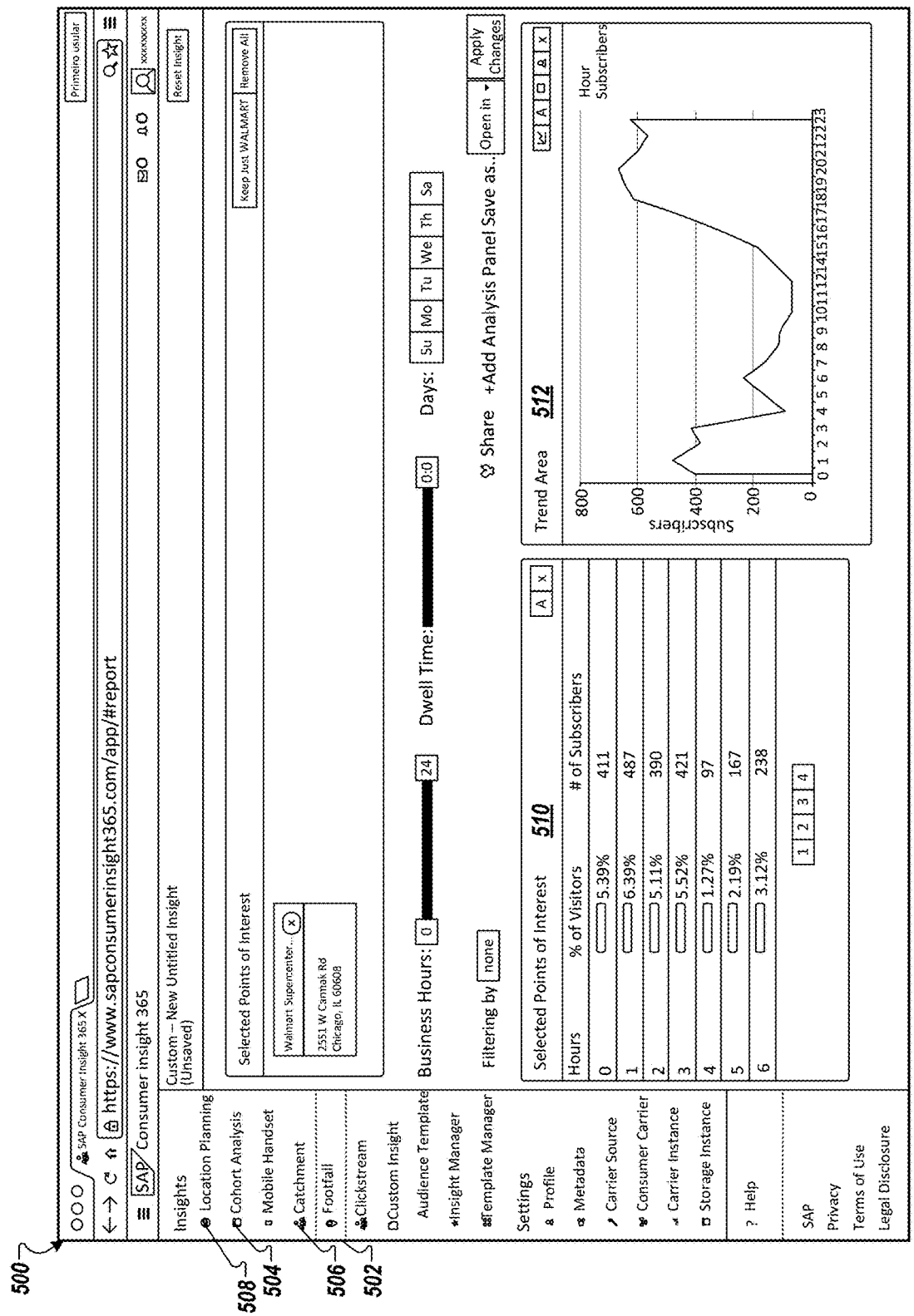

FIGS. 5A-5H depict example screenshots of user interfaces for assessing consumer insight information. Upon selecting render insight (e.g., 216 in FIG. 4, a user can be provided a report regarding insight of mobile device user behaviors associated with an indicated location. For example, the user in FIG. 4 selected to view footfall traffic (by selecting control 502) associated with a Walmart Supercenter in Chicago, Ill. FIG. 5A provides insight, in a user interface 500, into how foot traffic in and around an area (e.g., the Walmart Supercenter in Chicago) changes over time. In addition, a user can use UI 500 determine average dwell time of consumers in a particular location and determine demographic information for users with mobile devices in or near the location.

In another example, the user can select a cohort analysis control 504 to add multiple points of interest from a brand or multiple (e.g., competitor) brands to run competitive benchmarking. The user can use the UI and algorithms described herein to determine a number of consumers in and around the selected points of interest, comparing them by age, gender, top searched domains, top used handsets and more (custom panels).

In yet another example, the user can open in catchment using control 506 to determine the home location of the consumers hitting the selected point of interest and drill down to the demographics of each zip code. In another example, the user can select a clickstream control 508 to access the top ten categories and domains searched for a given location and top before and after click paths to add a whole new method to measure consumer behavior. The user can drill down into map views/satellite views/street views, etc.

The user can select polygons, squares, rectangles, and/or circles to better define desired area for analysis. Users can also filter by domains or categories to determine the number of consumers browsing in that area, as well as their demographic profiles. Domain controls can be used to select domains and compare number clicks between competitors domains and drill down for the before and after paths. Location planning control 508 can be selected to execute location planning insight to find the locations/post codes which are most suitable for target set of subscribers that a user has specified. As shown in FIG. 5A, the user can be presented with metrics/reports on selected points of interest 510 and/or trend areas 512, or other selectable report metric.

Figure 5B:
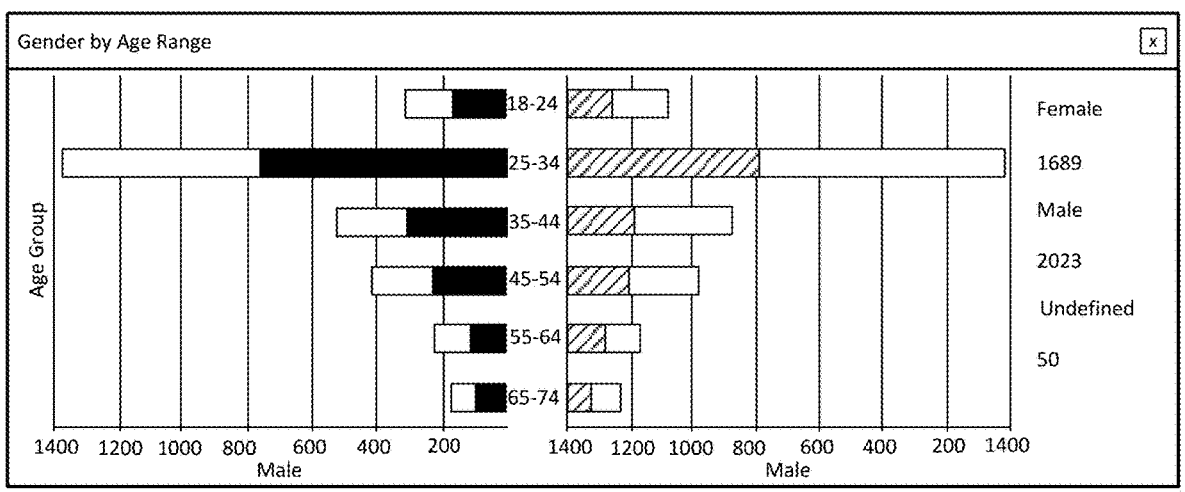

Referring to FIG. 5B, a user interface 520 includes a gender by age range of mobile subscriber for a selected area. The gender and age can be retrieved from mobile network operator data center 108 and analyzed by consumer insight application 116 and age/gender engine 124 to determine gender and age ranges for a user-selected location or area (e.g., area of interest).

Figure 5C:
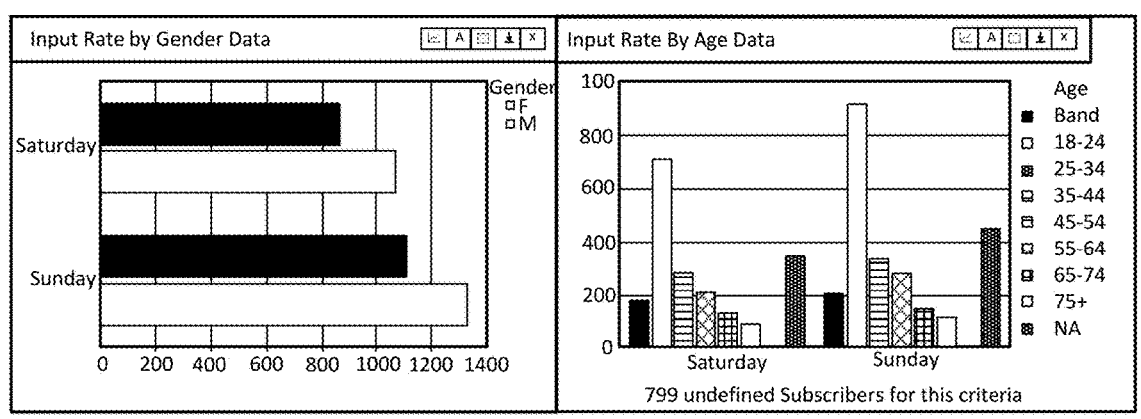

Referring to FIG. 5C, a user interface 526 includes an input rate by gender and age data for mobile subscribers for a selected area. The input rate may pertain to mobile device operator data retrieved from mobile network operator data center 108 and analyzed by consumer insight application 116 and age/gender engine 124. The interface 526 includes input rates by gender and age range for a user-selected location or area (e.g., area of interest).

Figure 5D:
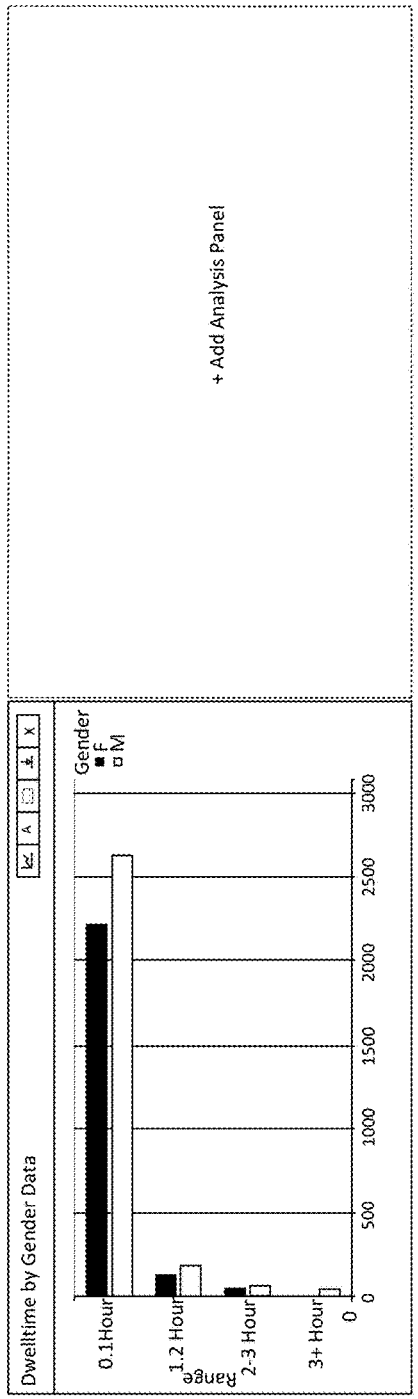
Figure 5E:
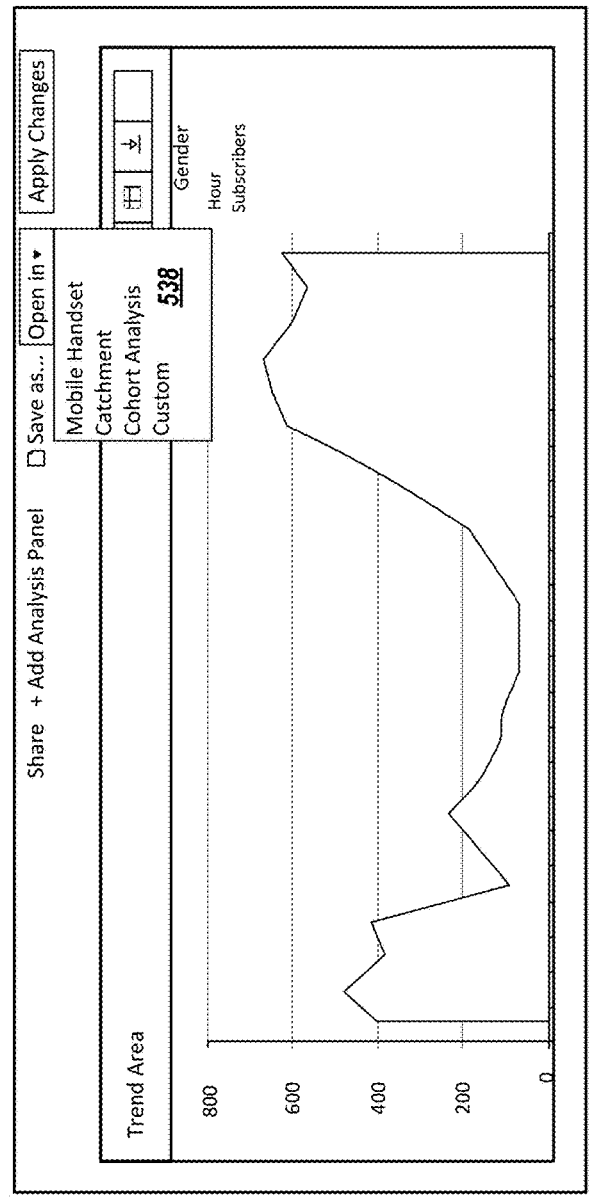

Referring to FIG. 5D, a user interface 530 includes dwell time by gender data for mobile subscribers for a selected area. The dwell time is measured over partial and full hours. The user can select panel 532 to add additional reports, graphs, and content. Referring to FIG. 5E, a user interface 536 includes a trend area report with selectable menu 538. Menu 538 can be used to switch the graphic/report to a different analysis (e.g., catchment, cohort, custom) and/or to switch devices in which the report is available (e.g., mobile handset).

Referring to FIG. 5F, a user interface 546 is shown that allows a user to filter by which particular handset (or operating system) each available mobile device is using. The selectable handset filter can gauge which users use particular devices in particular populations/locations, etc.

Figure 5G:
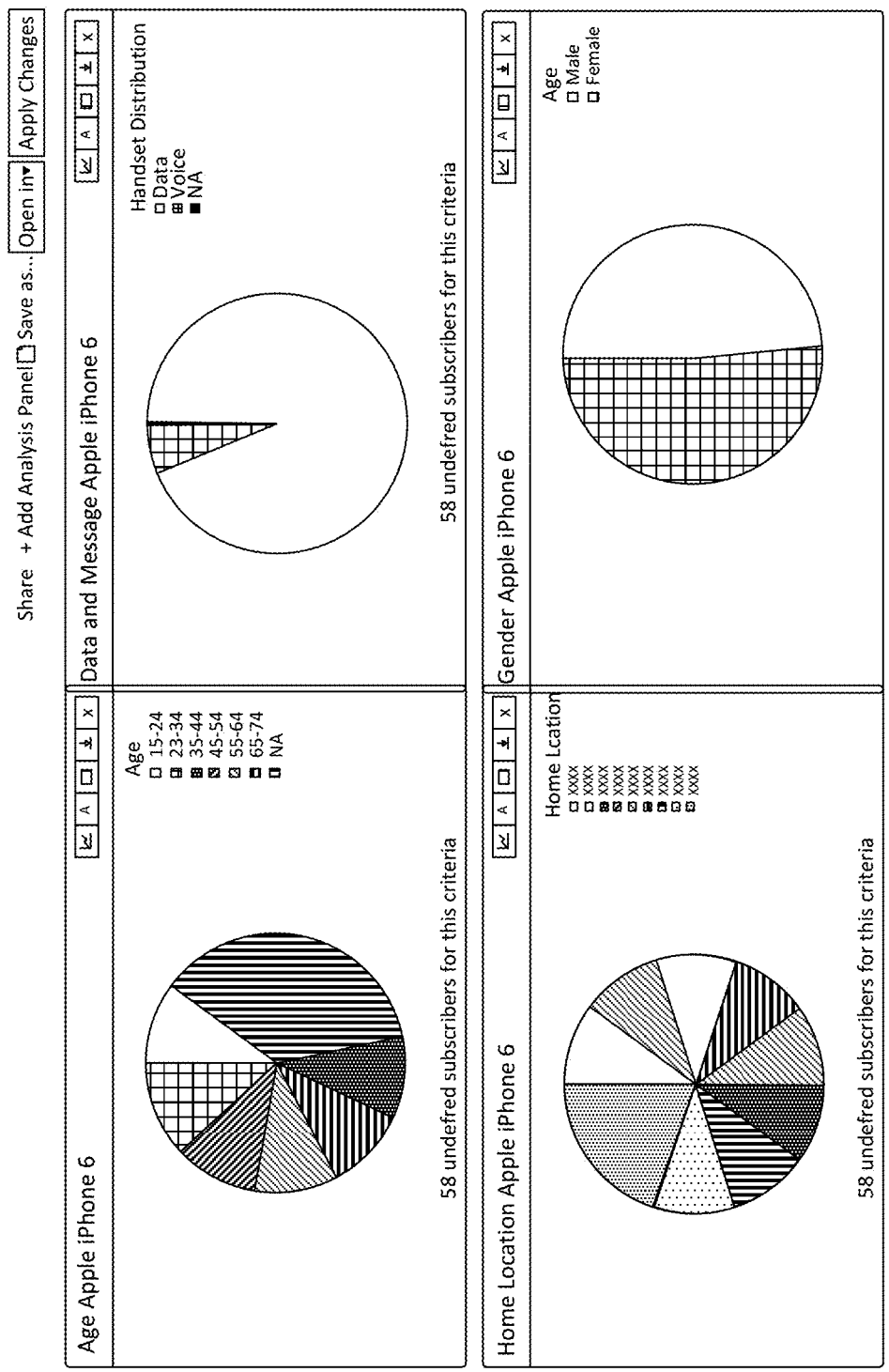

Referring to FIG. 5G, a user interface 550 depicts reports (e.g., insight) into an APPLE IPHONE and what types of users (e.g., mobile subscribers) are operating the device. In particular, an age report, a data and message report, a home location report, and a gender report are shown for users of one particular mobile device hardware type (e.g., IPHONE model 6).

Figure 5H:
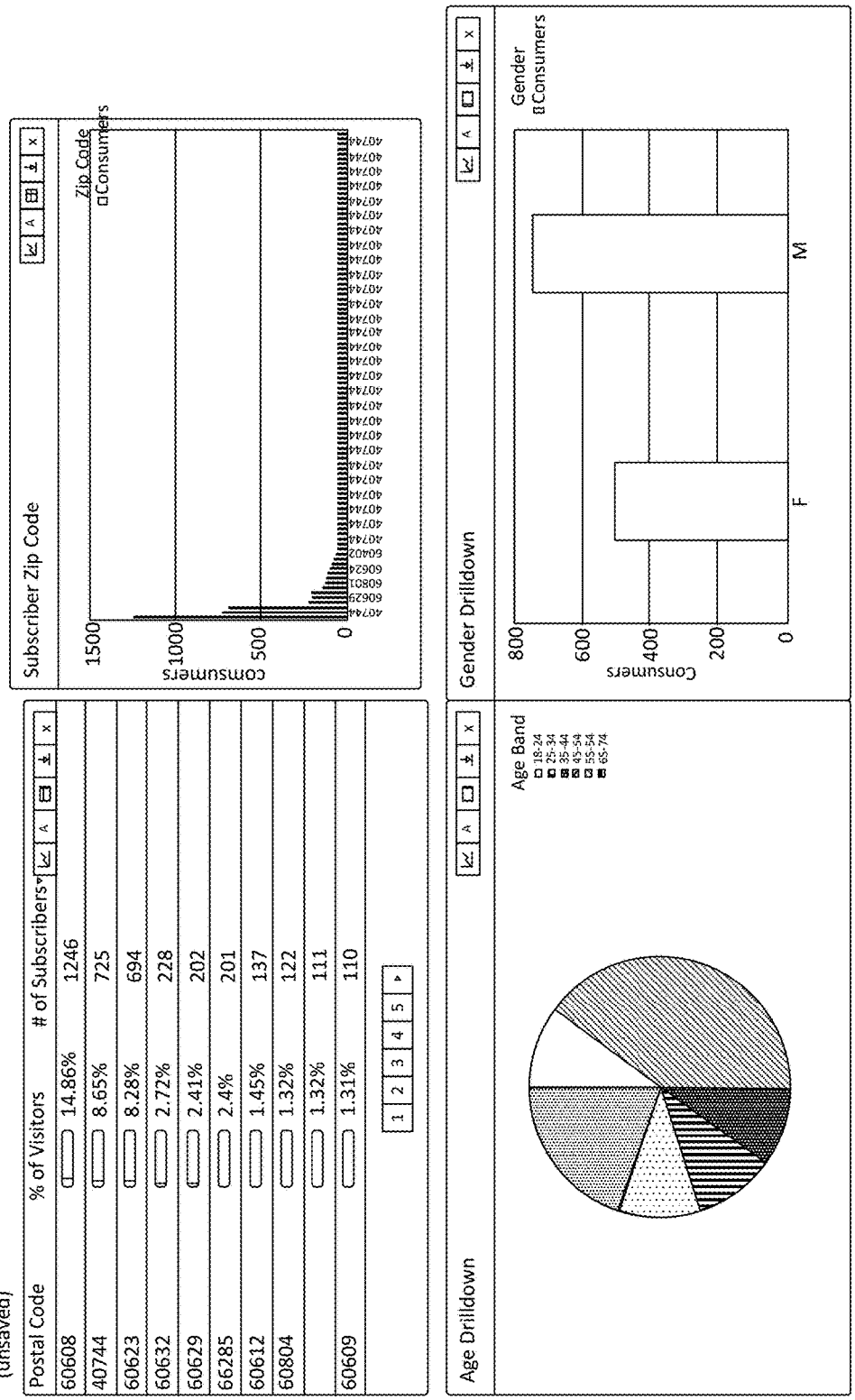

Referring to FIG. 5H, a user interface 560 includes a catchment report that provides subscriber data by postal code in two reports (e.g., a spreadsheet and a graph), an age drilldown, and a gender drilldown. Any number of graphics can be generated to be depicted in a report. The systems and algorithms described herein can select comparisons of data and provide such comparisons to the user in response to determining another comparison was requested. The metrics can be displayed to indicate a related metric with another report.

Figure 6A:
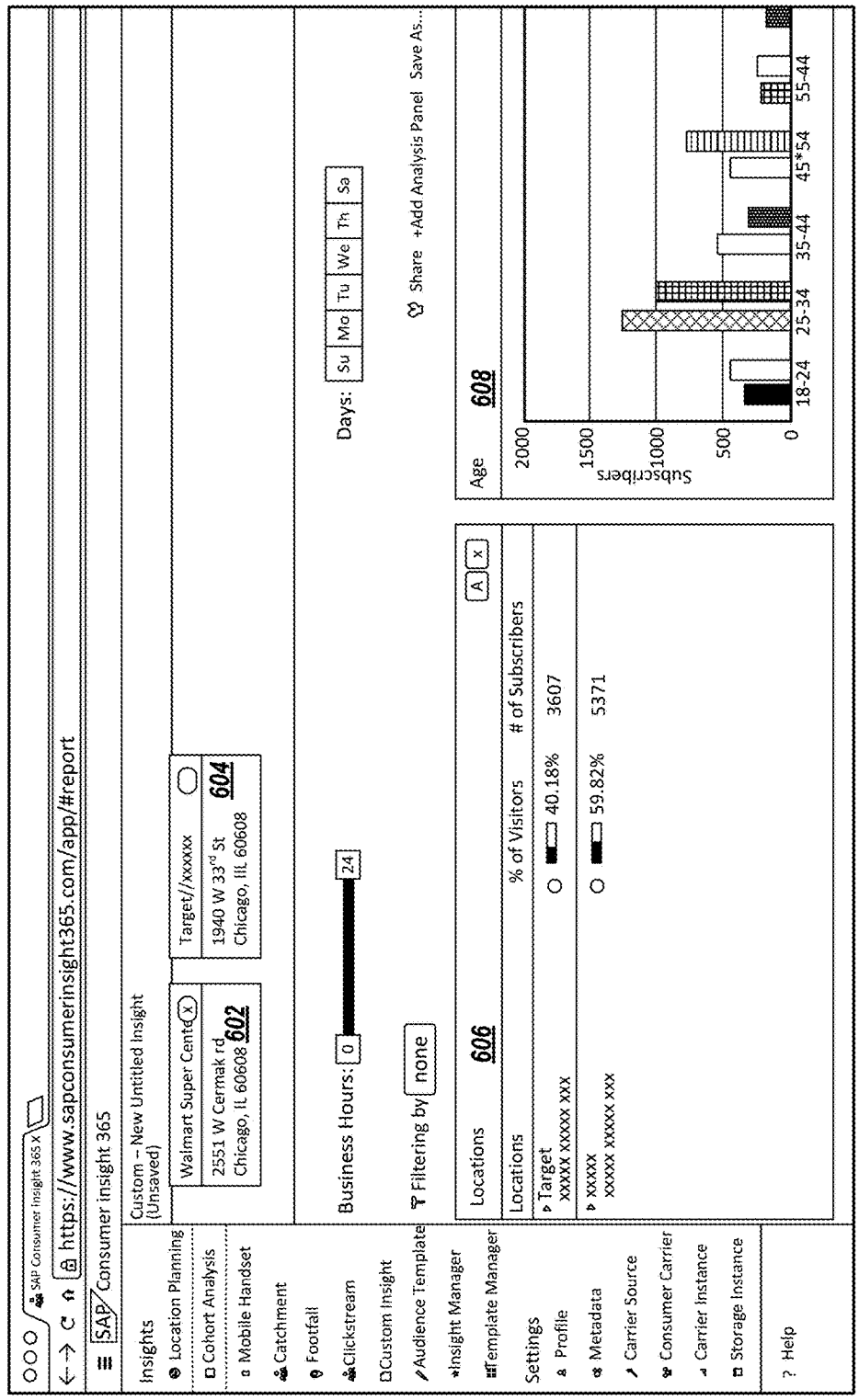
FIGS. 6A-6B depict example screenshots showing predictive insight for analyzed consumer behavior.
Figure 6B:
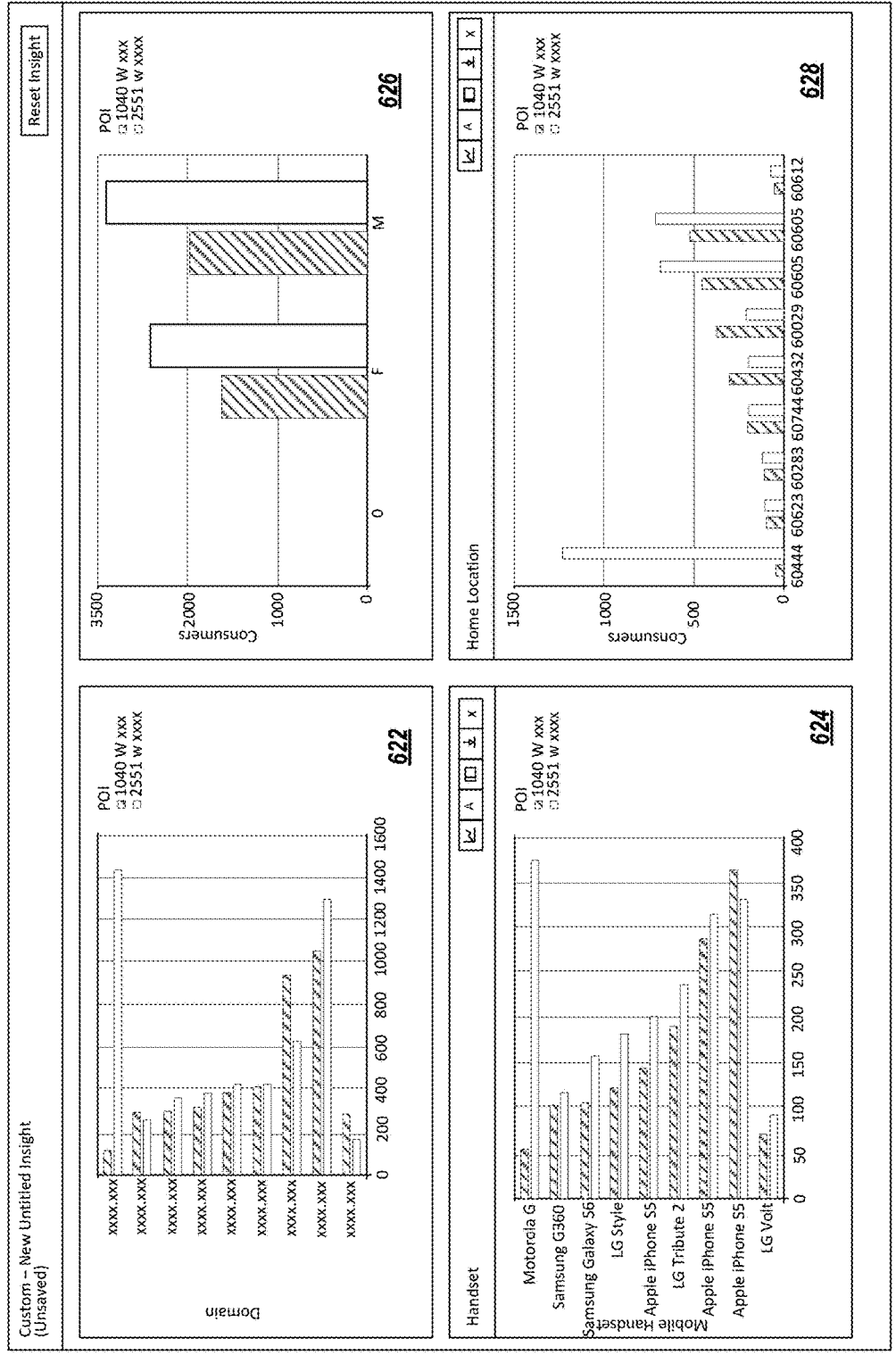

FIGS. 6A-6B depict example screenshots showing predictive insight for analyzed consumer behavior. In particular, FIG. 6A includes a screenshot 600 of a user interface in which a user has previously selected a location of Chicago, Ill. and two retail locations 602 and 604. The user is requesting via the user interface to compare the two retail locations with respect to mobile users in or near each distinct location. The systems described herein have provided a location with percentage of visitors and subscribers at report 606. A report 608 is shown detailing a graph of the ages of subscribers in each location and a comparison of both locations with respect to age.

FIG. 6B includes a screenshot 620 depicting several additional reports providing consumer insight for the two preselected locations. In particular, a report 622 for which domain each consumer is accessing in both locations. For example, if the first location is a Walmart store and the second location is a Target store, the insight report 622 can provide information for advertisers or retailers about what the consumers shopping in their stores are searching for online. In one example, a Target shopper (associated with a mobile device) may be searching for a price from a Walmart store online to determine which location offers the lower price for items in the stores.

Similar reports include a handset report 624 detailing which hardware mobile device each subscriber in or near the stores is using. Reports detailing points of interest 626 and home location 628 for subscribers is also shown.

Figure 7A:
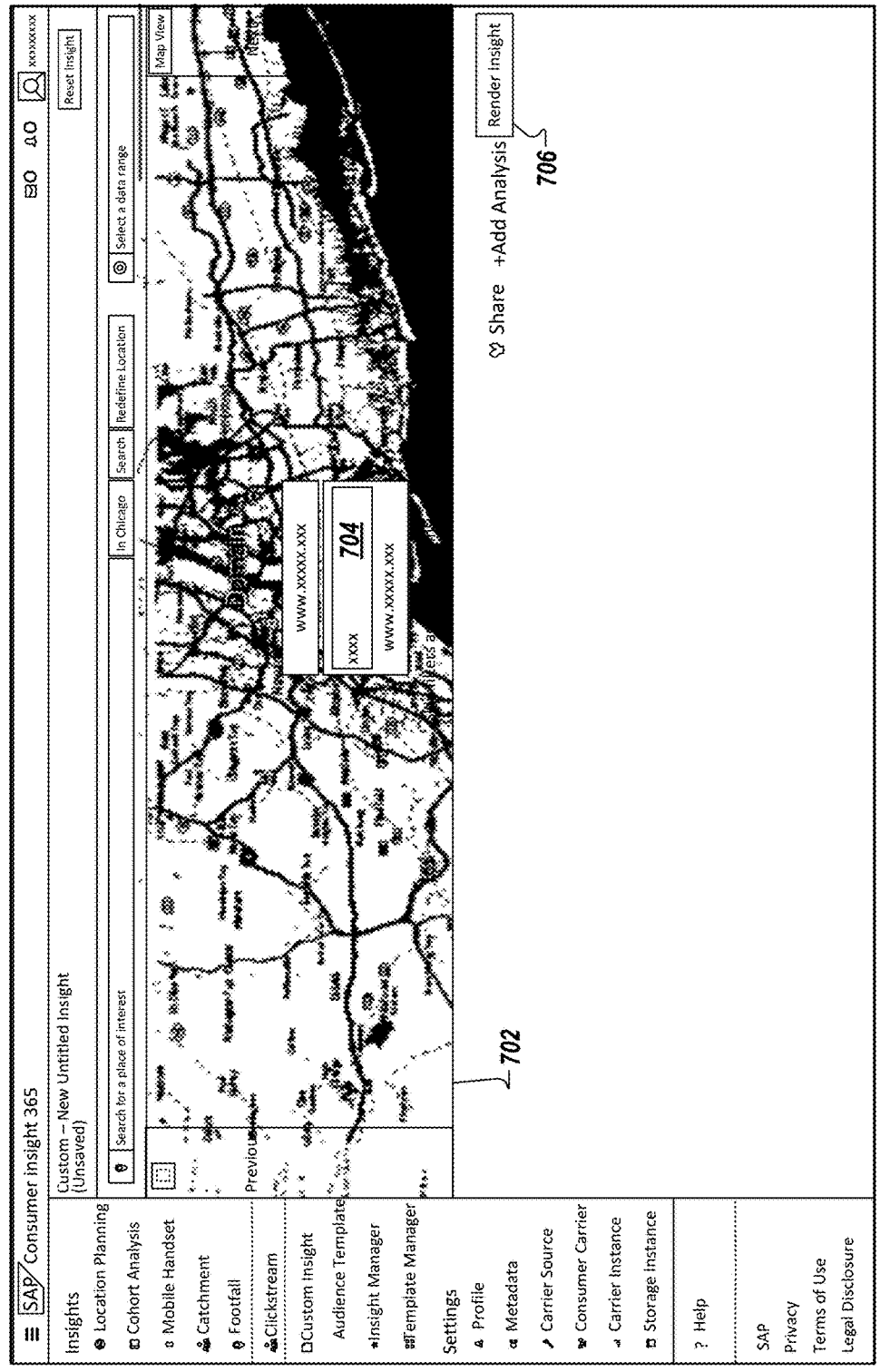
FIGS. 7A-7C depict additional examples of predictive insight for analyzed consumer behavior.
Figure 7B:
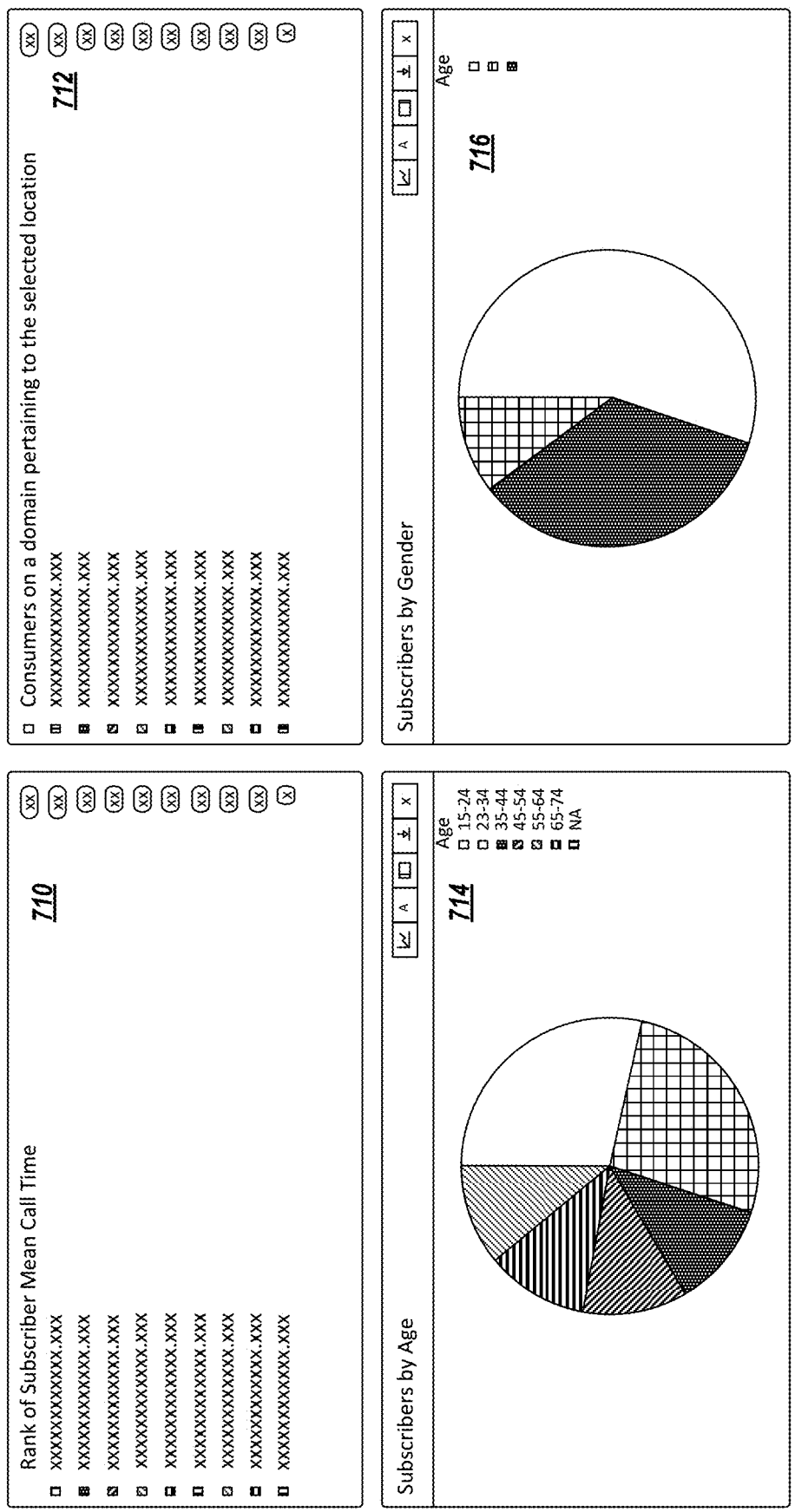
Figure 7C:
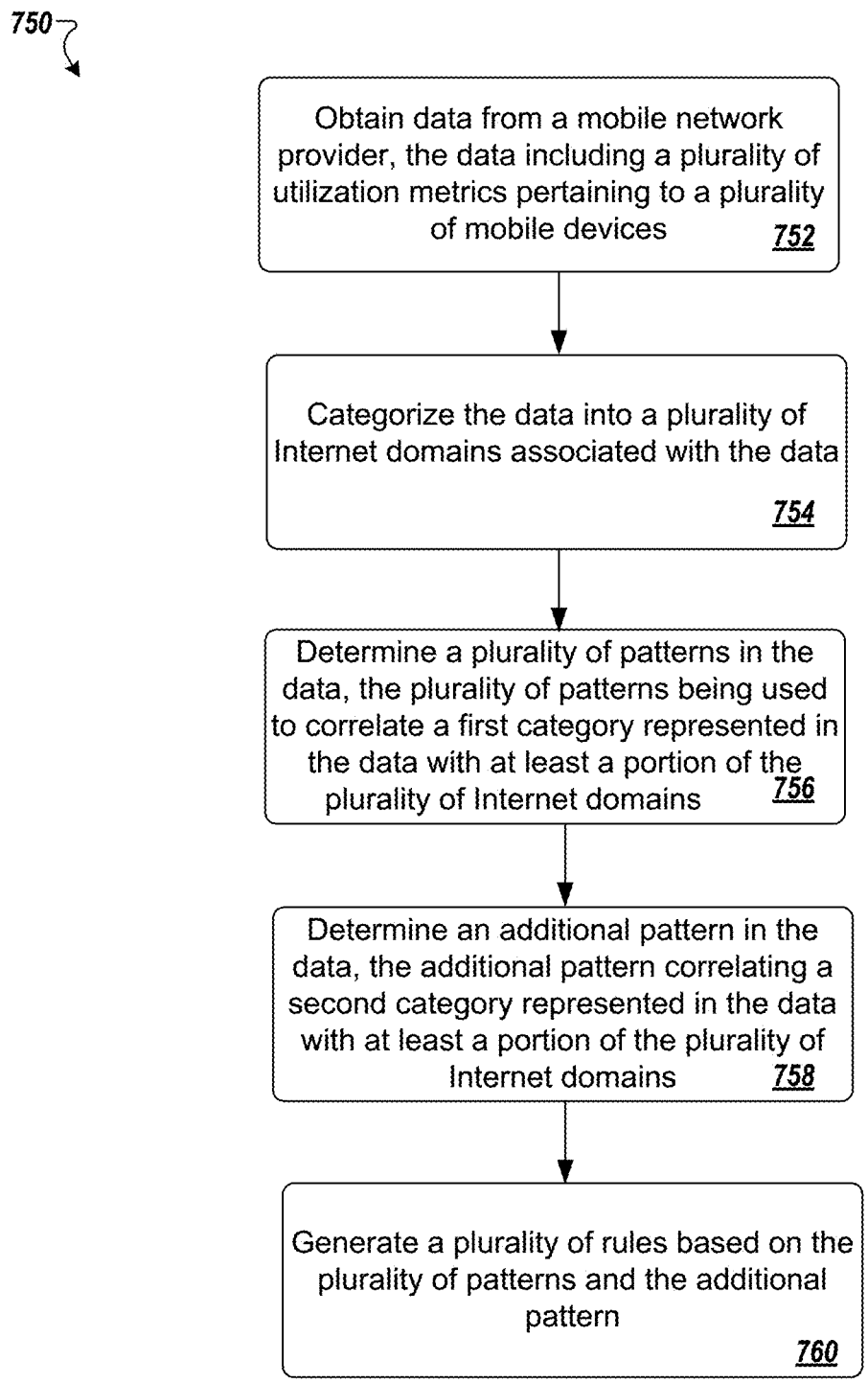

FIGS. 7A-7C depict additional examples of predictive insight for analyzed consumer behavior. In FIG. 7A, a screenshot 700 depicts a map 702 in which a user has selected a location and continues to select a place of interest 704. The user can select render insight control 706 after entering the place of interest 704. Any or all of the reports 710, 712, 714, or 716 in FIG. 7B can be provided in or around the map 702 in FIG. 7A.

A number of algorithms will be described in detail below. The architecture described herein can use any or all of the algorithms alone or together to provide information about predictive behavior associated with consumers (e.g., users). The algorithms may be used to generate the content shown in the screenshots above as well as data content stored for use in determining consumer behavior patterns.

Age and Gender Modeling

Age and gender determining algorithms may be carried out by the age/gender engine 124 to determine and provide consumer insight information. In general, users may carry at least one mobile device (e.g., laptop, tablet, smartphone, smartwatch, mobile phone, etc.) and may use such devices to perform day-to-day communication and activities. The pervasiveness of mobile devices has enabled the devices to become popular scientific data collection tools, as social and behavioral sensors of location, proximity, communications, and context.

An age and gender modeling algorithm can be applied to mobile device data collected from mobile device use. The age and gender modeling algorithm can be used to analyze usage of voice calls, short message service (SMS) usage (e.g., calls), and Internet data usage by different mobile user across a month having different age and gender. Since direct parameters typically do not exist for scientifically determining the age and gender of a mobile device user, the algorithm described herein uses machine learning based predictive modeling to differentiate users into multiple age bands and genders. The age and gender modeling algorithm can use predictive modeling process to learn complex patterns in mobile device usage. For classification modeling of gender, the algorithm may implement a support vector machine (SVM) learning model. The algorithm may implement a decision tree to classify gender and age bands.

In general, a number of machine learning models can be used to determine age and gender of a group of mobile users. Examples include decision tress, random forest, gradient boosting machine, and extreme gradient boosting (XG-Boost). The Gradient Boosting Machine (GBM) model was used as $(y \sim f1x+f2x+ \ldots +fnx=i=1nfi(x))$. GBM allows efficient building of an ensemble of decision trees that can boost model performance. A combination of feature engineering with features were used including, but not limited to bytes in, bytes out, average session time, noise removal, association rules and feature selection using to identify variables for prediction.

In one example, to investigate voice and SMS calls, two different algorithms may be used to determine age based similarity and calling behavior amongst users. For Internet data, a number of categories of Internet domains have been derived and correlated with age and gender.

In general, a batch of mobile device data can be selected for training and the training data can be applied to other mobile device data. In one example, data can be retrieved or obtained from one or more mobile service provider. A data time period can be selected (e.g., one to six months of data) for a subset of users associated with the mobile service provider services. In one example, four million call transactions were obtained that used either voice, SMS, http and location events per month. In such data, approximately 700,000 user transactions were available in the obtained data. This data was further cleaned and separated based on type of transactions and months.

The strategy of modeling the above example data may include building a model on data aggregated on a month and then testing or validating the application of data on the remaining six months. Based on active days, the data was further divided into multiple sets (e.g., buckets) to keep users with similar usage in one particular bucket and other similar users in other respective buckets. This bucketing can provide an advantage for modeling the data as the data will be divided into smaller portions enabling tuning of the models for each particular data set. This can reduce modeling complexity and reduce the time that the models may use to compute data.

In one example, buckets may be generated based on a daily average call for users. In particular, a first bucket may include HTTP average calls of greater than or equal to 155. A second bucket may include HTTP average calls of less than 155 and greater than or equal to 81.92. A third bucket may include HTTP average calls of less than 81.92 and greater than or equal to 44. A fourth bucket may include HTTP average calls of less than 44 and greater than or equal to 18.36. A fifth bucket may include HTTP average calls of less than 18.36.

Continuing with the above example, before using raw data for modeling, outliers from the data are removed. In general, the age and gender modeling algorithm may assume that the outliers (e.g., extreme utilization scenarios) are typically not manual but driven by machine which uses model networks for some business purpose. This process may be referred to herein as machine identification. A rule based algorithm can be generated and executed by the architecture described herein to identify such machine-like users and then further remove them from modeling.

The process can be used to learn the behavior of consumers (e.g., mobile device users) in terms of age and gender based on the Internet data usage pattern. This process uses at least one month of historical data of HTTP usage by different users belonging to different age and gender. A classification model is trained to learn the pattern of HTTP usage per age band and gender. Once a model is trained, it can be further used to predict the age band and gender for consumers having one month of historical HTTP data. The coverage of these models may be around forty to forty-five percent.

An example of gender and age band prediction for each model is shown in Tables 1-8 below. It can be observed that consistently more than 70 percent accuracy is achieved on test data sets for gender modeling while the age band accuracy varies from 44 percent to 60 percent.

TABLE 1

Gender Prediction using HTTP Model

| HTTP Models | # Http Usage per Active Days | Coverage on Prepaid (%) | Train Accuracy | Test data Accuracy |
|---|---|---|---|---|
| Model-1 for Lowest Usage | 2 > data > 18 | 26.33 | 93.23 | 72.65 |
| Model-2 | 18 => data > 44 | 7.72 | 92.23 | 74.38 |
| Model-3 | 44 => data > 81 | 4.35 | 91.43 | 75.38 |
| Model-4 | 81 => data > 155 | 3.18 | 99.91 | 76.76 |
| Model-5 | 155 => data | 3.17 | 92.17 | 72.03 |

TABLE 2

Age Band Prediction using HTTP Model

| HTTP Models | # Http Usage per Active Days | Coverage on Prepaid (%) | Train Accuracy | Test data Accuracy |
|---|---|---|---|---|
| Model-1 for Lowest Usage | 2 > data > 18 | 26.33 | 69.34 | 44.03 |
| Model-2 | 18 => data > 44 | 7.72 | 93.34 | 56.93 |
| Model-3 | 44 => data > 81 | 4.35 | 96.97 | 59.33 |
| Model-4 | 81 => data > 155 | 3.18 | 96.35 | 60.31 |
| Model-5 | 155 => data | 3.17 | 97.11 | 60.78 |

Overall, 67 percent accuracy may be observed for gender classification and 64 percent accuracy may be observed for age band classification using homophily data.

TABLE 3

Gender Prediction using Homophily for Call Log Model

| Call Log Models | # Call Usage per Active Days | Coverage on Prepaid (%) | Train Accuracy | Test data Accuracy |
|---|---|---|---|---|
| Model-1 | | 5.8 | 66.9 | 67.32 |

TABLE 4

Age band Prediction using Homophily for Call Log Model

| Call Log Models | # Call Usage per Active Days | Coverage on Prepaid (%) | Train Accuracy | Test data Accuracy |
|---|---|---|---|---|
| Model-1 | | 5.8 | 63.92 | 64.45 |

The following tables shows the accuracy of models build on training and test data sets using call log data. It is observed that accuracy for test data is increasing with usage and maximum accuracy achieved is around 60 percent for both age band and gender classification.

TABLE 5

Gender Prediction for Call Log Model

| Call Log Models | # Call Usage per Active Days | Coverage on Prepaid (%) | Train Accuracy | Test data Accuracy |
|---|---|---|---|---|
| Model-1 for Lowest Usage | 2 > data > 4 | 45.8 | 58.04 | 54.76 |
| Model-2 | 4 => data > 6 | 12.54 | 60.87 | 57.88 |
| Model-3 | 6 => data > 8 | 7.33 | 61.34 | 58.97 |
| Model-4 | 8 => data > 12 | 5.06 | 63.23 | 60.21 |
| Model-5 | 12 => data | 3.91 | 66.9 | 60.87 |

TABLE 6

Age band Prediction for Call Log Model

| Call Log Models | # Call Usage per Active Days | Coverage on Prepaid (%) | Train Accuracy | Test data Accuracy |
|---|---|---|---|---|
| Model-1 for Lowest Usage | 2 > data > 4 | 45.8 | 54.32 | 54.12 |
| Model-2 | 4 => data > 6 | 12.54 | 58.63 | 59.37 |
| Model-3 | 6 => data > 8 | 7.33 | 61.28 | 59.84 |
| Model-4 | 8 => data > 12 | 5.06 | 61.76 | 60.44 |
| Model-5 | 12 => data | 3.91 | 61.98 | 60.36 |

The following tables show the overall accuracy of models build on training and test data sets using weighted voting method to combine the results obtained from call log, HTTP, and homophily models. It is observed that accuracy for test data is increasing with usage and overall accuracy of 68.5 percent is obtained for gender and 61.4 percent for age band predictions.

TABLE 7

Gender Prediction using Homophily for Weighted Model

| Weighted Models | Train Accuracy | Test data Accuracy |
|---|---|---|
| Model-1 for Lowest Usage | 74.799 | 68.274 |
| Model-2 | 74.132 | 68.727 |
| Model-3 | 73.703 | 68.903 |
| Model-4 | 76.2 | 69.208 |
| Model-5 | 73.595 | 67.477 |
| Overall Accuracy | 74.4858 | 68.5178 |

TABLE 8

Age band Prediction using Homophily for Weighted Model

| Weighted Models | Train Accuracy | Test data Accuracy |
|---|---|---|
| Model-1 for Lowest Usage | 64.586 | 57.291 |
| Model-2 | 72.217 | 61.686 |
| Model-3 | 73.571 | 62.453 |
| Model-4 | 73.433 | 62.807 |
| Model-5 | 73.683 | 62.94 |
| Overall Accuracy | 71.498 | 61.4354 |

The examples described herein highlight the investigations on the properties of learning and inferences of real world data collected via mobile phones for the prediction of user's age bands and gender based on their mobile usage. In particular, the learning process is implemented where mobile usage details like, usage for voice, SMS calls usage of internet data is used to understand the difference in the behaviors users with different age and gender.

A single modeling process may not be sufficient to cover all the users with accurate prediction accuracy. To overcome this problem a multi-model concept in which multiple models are built for similar sets of users but with different types of mobile usage are generated and the multiple models are combined to get a proper prediction for every user.

In some implementations, the combined model above can be improved upon by removing particular noise in the data as well as tuning categorization of the data. For example, data noise (e.g., outliers, errors, corruptions, etc.). For example, noise can be removed from lists of selected categories and domains. The domain and category selection process may be based on a binomial test to pick only the domains or categories which are relevant to some specific AGE_BAND or GENDER, with a statistical significance of 95 percent. However, in this process all domains and categories are used which can show at least some discriminatory importance, some of which may be caused by random noise. In order to remove that noise, a threshold minimum of five subscribers per domain/category are used to remove noise in these features. Therefore, the list of selected domains/categories can be changed, as well as the final features after applying row normalization. First, the filter may be applied to the domain category (e.g., DOMAIN_CATEGORY) set of features. This filter can improve performance, especially for a GENDER model (around 1 percent more).

Removing noise may allow the systems described herein to obtain and present relevant information subject to a given target (e.g., gender/age band) that may be unintentionally obscured by redundancy and noise in the data. Removing noise can be performed in two parts: noise removal on lists of selected domain categories and noise removal applying threshold value.

In one example, a top 218 domain categories for both AGE_BAND and GENDER can be selected based on users events. To ensure to only include categories which are important for our target variables (AGE_BAND and GENDER), two filters may be applied. The first filter is a binomial test (with a confidence level of 90 percent), per each age band and gender. This will pick only domain categories which are specific to a given age band or gender value. Thus, selected Domain Category will impart some discriminatory weight or importance during building a predictive model as against a domain category which has uniform weight across different age band or gender values. In one example, this selection process reduced the size of the lists to the following: AGE_BAND of 170 domain categories and GENDER of 94 domain categories The second filter is based on building a user's usual profile. Often a user does usual things in web browsing sessions, e.g. browsing through certain set of Domain Categories usually and occasionally from other Domain Categories. Thus, the user's interest is a Domain category and may be defined as having at least five events in the browsing history. To account for an occasionally interested domain category, support can be obtained from at least five subscribers in GENDER value that also shown interest in that Domain Category. Similarly, this may be applied to an AGE_BAND list in which there were still some categories with less than five subscribers. This may be due to the fact that five is the least number for which a binomial test produces a p-value less than 0.1 (90 percent confidence). Application of this threshold reduced the list of selected categories for AGE_BAND to a size of 164 domain categories.

For the categories which were filtered due to the noise removal process, around 60 percent have less than five subscribers on the AGE_BAND list, and around 30 percent have less than five subscribers on the GENDER list.

In a similar way to previous filters, a minimum threshold can be applied on the two session based features, i.e., SESSION_COUNT and SESSION_TIME. An example session threshold can be to check whether there are at least five events reported per SESSION_ID. If so, the session can be included. This can function to remove any noise for a user's general profile of web browsing.

In a first example, an unknown category feature can be applied to the data sets. An average count of unknown categories may be included in the model and tracked using an UNKNOWN variable, which is the average count of daily events for the non-discriminatory domains (i.e., domains not present on the list). In a similar way, a new feature may be built with the average count of daily events for the non-discriminatory domain categories (UNKNOWN_CATEGORY). Therefore, the UNKNOWN variable name is changed to UNKNOWN_DOMAIN. The procedure to create this feature includes counting events of non-discriminatory domain categories for each MSISDN and dividing that count by five (number of days). The result is the average count of daily events for the non-discriminatory domain categories. Then, outliers with other variables can be removed and the UNKNOWN_CATEGORY variable may be capped using the 95 percent tile count as a maximum value, by each AGE_BAND and GENDER for each model.

In a second example, a category count feature can be applied to the data sets. The count of unique categories can be identified and modified. For example, the systems described herein can identify and exclude the subscribers with less than three domain categories present in their surf history. This can provide the advantage of helping to remove noise on these features. Since the number of distinct domain categories is used to understand misclassification, adding that number as a new feature can help the model to identify distinct patterns for users on different intervals of number of categories. This may pertain to age and gender targeting algorithms. To count the unique categories and remove noise pertaining to incorrect categorization, the systems described herein can group a dataset by MSISDN and count the number of unique DOMAIN_CATEGORY per MSISDN. The result of this count may be stored as a new feature in a variable (e.g., CATEGORY_COUNT). The variable CATEGORY_COUNT can be capped using the 95 percent tile count as maximum value.

In a third example, unique domain count feature can be applied to the data sets. The unique domain count feature may be similar to the category count feature by counting a number of unique domains per subscriber. It may be the case, that younger users visit a wider range of domains, while users from higher age bands may visit only a very few specific domains. A similar pattern may occur on gender, when male subscribers may have a higher number of unique domains. To build the DOMAIN_COUNT feature the systems described herein can group the dataset by MSISDN and count the number of unique DOMAIN per MSISDN. The result may be stored in a variable (e.g., DOMAIN_COUNT). Similar to the above example, the DOMAIN_COUNT variable may be capped using the 95 percent tile count as a maximum value, by each age band and gender.

In some implementations, the systems described herein include using associating rules mining techniques to apply algorithms using combinations of data (e.g., pairs of domains, pairs of domain categories). An efficient way to find such subsets of data may be to apply particular combinations of rules to find frequent item sets and discover interesting relationships that can be used to determine features of the data.

One example association rule is of the form: $\{x_1, x_2, \ldots, x_n\} \rightarrow \{y_1, y_2, \ldots, y_m\}$, i.e., the presence of the first set implies the presence of the second set, and it suggests that there may be a relationship. To build these features, the systems described herein can group a dataset by MSISDN, retrieve all of the IDs of the categories visited by a subscriber, and concatenate those categories into a single string. The union of all of the strings is then written to the file of transactions. The transactions are then loaded into a single dataset in basket format and any number of algorithms may be applied with a minimum support and confidence of 0.5 each. The support represents the percent of subscribers which have the first set present and the confidence is the percent of subscribers which have the second present, given that the first set is present. The systems can then remove redundant rules from the list and for each association rule of the form A→B, consider an item set formed by A∪B (union of A and B) and transform each item set into a binary feature, if a user visited all the categories contained in the set. The association rule mining can increase accuracy on GENDER determination models to 72.5 percent.

In some implementations, noise can be removed from features associated with the data retrieved from a cellular network by applying one or more threshold values. For example, model performance can be boosted by removing noise on actual features. The noise removal may function to filter only the data that follows some kind of pattern, and remove noisy data that is caused by random behavior of subscribers. In one example, noise removal can be applied by selecting domain categories and applying a minimum threshold on at least two session based features, i.e., SESSION_COUNT and SESSION_TIME. One example threshold may be selected to consider a session if there is a time difference of twenty minutes, and at least five events are reported per session. This will remove any noise for a user's general profile of web browsing.

In another example, a per day session threshold can be added to filter noise from data. For example, three features are typically present only in the AGE_BAND model, each of which may be based on the day time session (i.e., MORNING, DAY, and NIGHT). These variables can be used to identify patterns across the different age bands. Consequently, the presence of noise in these three times of the day will have a negative effect on the identification of age patterns. Noise removal can be applied by using a threshold of minimum five events recorded per day session. This may affect the values of these binary features, as some values may be taken as zero according to this filter.

Noise removal can be executed using a different perspective such as analyzing byes in and bytes out features. To avoid the effect of outliers, using a median instead of a mean function for the BYTES_IN and BYTES_OUT features may be used, as the median is not affected by the presence of extreme values. However, the distributions for the median of BYTES_IN and BYTES_OUT are less skewed, thus, the effect of outliers from these two features is removed. An example algorithm to remove noise may include grouping a dataset by MSISDN, calculating the median of BYTES_IN data and BYTES_OUT data across five days of data, performing a log transformation on non-zero values, capping 1 percent and 99 percent tiles to remove outliers from the data, by age band and gender.

A similar threshold can be placed on features based on which particular day session is analyzed (e.g., MORNING, DAY, and NIGHT). An example threshold may be to use a minimum of five events per day session. This means that if there are less than five events on a given day session, then the value will be zero for that particular user. The main change is that now subscribers with a weak presence on a day session will be removed, as they act as noise.

Example day sessions for an AGE_BAND model may split the time of the day into three intervals: MORNING (4 A.M.-9 A.M.), DAY (10 A.M.-9 P.M.), and NIGHT (10 P.M.-3 A.M.). Three binary features may be generated based on the count of events per day session, which may help to improve performance on AGE_BAND model. Building additional similar features based on the three day sessions, using other fields can be implemented as described below.

An average time spent per day session can be analyzed with respect to AGE_BAND. The original day session features described above are based on the count of events. However, it can be observed that better patterns at a granular level, can be calculated as time spent, as it may vary with respect to demographics (age and gender). Such an algorithm may include grouping by MSISDN, START_TIME DAY, DAY_SESSION, and SESSION_ID, approximating the time of each session as (max(START_TIME)–min (START_TIME)) in seconds, grouping by MSISDN and DAY_SESSION, retrieving (or calculating) average session time by DAY_SESSION, and spreading the DAY_SESSION into three variables: MORNING_TIME, DAY_TIME, NIGHT_TIME.

Another variable that may be analyzed and/or modified is a total number of unique domains visited per day session. There exists a metric feature for (DOMAIN_COUNT) which represents the number of unique domains visited per subscriber across the five days of data. It may be the case that the number of unique domains visited may vary across morning, day, and night for the different age bands and for both genders. A metric can be generated by grouping the dataset by MSISDN, DAY_SESSION, retrieving a total number of unique DOMAIN per DAY_SESSION, and spreading the DAY_SESSION into three variables: MORNING_DOMAIN, DAY_DOMAIN, NIGHT_DOMAIN.

In relation to the previous variables, another modification can include applying the same on the unique number of domain categories visited per day session. Thus, the generation process is very similar: grouping the dataset by MSISDN, DAY_SESSION, retrieving the total number of unique DOMAIN_CATEGORY per DAY_SESSION, and spreading the DAY_SESSION into three variables: MORNING_CATEGORY, DAY_CATEGORY, NIGHT_CATEGORY.

The algorithm can analyze minimum, maximum and mean number of unique domains per session. Generating three similar features e.g. minimum, maximum, and average number of unique domains visited per day session may be built by: grouping the dataset by MSISDN, START_TIME_DAY, DAY_SESSION, obtaining the number of unique domains per DAY_SESSION, grouping again by MSISDN, DAY_SESSION, calculating the MIN|MAX|MEAN of the number of unique domains, and spreading the DAY_SESSION into three variables: MORNING_DOMAIN_func, DAY_DOMAIN_func, NIGHT_DOMAIN_func, where func can be any of minimum, maximum, or mean.

In a similar fashion, the above algorithm can be used with the BYTES_IN and BYTES_OUT features. The original BYTES_IN and BYTES_OUT features helped both models to identify complex patterns. However, these were considering the whole five days of data. If the dataset is grouped by day session, the models may discover some patterns at a granular level. Example BYTES_IN features may be built by grouping by MSISDN, START_TIME_DAY, and DAY_SESSION, calculating the median of BYTES_IN field per day session, and grouping by MSISDN and DAY_SESSION. If the feature is BYTES_IN=log(mean(BYTES_IN median)+1), add 1 to avoid 0 on log argument and spread the DAY_SESSION into features: MORNING_BYTES_IN, DAY_BYTES_IN, and NIGHT_BYTES_IN.

The BYTES_OUT features may be built following a similar procedure using BYTES_OUT field, and the names of the corresponding features include MORNING_BYTES_OUT, DAY_BYTES_OUT, and NIGHT_BYTES_OUT.

In one example, the algorithms described herein may be executed in R (R Foundation for Statistical Computing, 2016), to take advantage of robust statistical libraries including, but not limited to dplyr, tidyr, caret, etc., which allow feature generation, noise removal processes, and testing of statistical hypothesis. In some implementations, the predictive models may be built in Python (Python Software Foundation, 2008).

Building a model may include executing the following process: executing a corresponding machine-learning algorithm in Python (e.g., Gradient Boosting Machine, XGBoost, exporting the model to PMML format, writing the PMML model to a file, so that it can be exported to Java, and in Java, the model can be built from the PMML and then used to make predictions with the Java PMML API. Then work is done on the Java Code for CFP integration, to generate the profile for each user, build the dataset for the model, and import the PMML file to Java, to use for predictions.

Additional options include the following definitions. Precision represents a number of correctly classified instances on one class divided by the total number of instances classified as belonging to the same one (i.e. How precise the model is on a given class). Recall represents a number of correctly classified instances on one class divided by the total number of instances on that class (i.e. Accuracy on a given class). F-Measure (F1-Score) is represented by the following formula:

$$FMeasure := \frac{2 * Precision * Recall}{Precision + Recall},$$

i.e., the harmonic mean of precision and recall.

AUROC (Area Under Receiver Operator Characteristic Curve) represents the area under the ROC curve (Receiver Operating Characteristics curve). The AUROC is calculated t differently depending on the type of target. For example, if the target is binomial, the area under the ROC curve is generated from TPR (True Positive Rate) on the x-axis and FPR (False Positive Rate) on the y-axis, where $$TPR \sim \frac{True\ Positive}{Positive} = \frac{correctly\ classified\ positives}{total\ \#\ of\ positive} \text{ and}$$

$$FPR \sim \frac{False\ Positive}{Negative} = \frac{incorrectly\ classified\ negatives}{total\ \#\ of\ negatives}.$$

If the target is multinomial, then a class balancing approach is used to create cost for misclassification in each class, and then applied a weighted mean calculation. In general, an increase in precision and recall will result in classification of minor classes from a major class. If the cost of misclassification is applied instead of simple class distribution probability in the AUROC calculation, the resulting formula is:

$$AUROC_{Total} := \frac{\sum_{i=1}^{n} AUROC_i * w_i}{\sum_{i=1}^{n} w_i},$$

where n is the number of classes (six in our case for AGE_BAND target), $AUROC_i$ is the AUROC obtained by taking the class i as the positive class, and $$w_i = \frac{total\ \#\ of\ samples}{n*(\#\ of\ samples\ on\ class\ i)},$$

i.e., the cost of misclassification for class i.

FIG. 7C is a flowchart representing a process 750 for generating a classification model to determine predictive user behavior. In particular, the process 750 can determine predictive user behavior (e.g., mobile device usage, online or instore purchasing, footfall, catchment, upcoming locations, etc.) by analyzing mobile device network data pertaining to ages and genders of users accessing mobile network data services. The process 750 can be used to learn the behavior users in terms of a category, such as age and gender, home or work location, etc. based on Internet data usage patterns. This process can include using at least one month of historical data of HTTP usage by different users belonging to different age and gender groups. A classification model can be trained to learn the pattern of HTTP usage per age band and gender. Once a model is trained, it can be further used to predict the age band and gender for other users using other mobile device network data.

At block 732, the process 750 may include obtaining data from a mobile network provider. For example, the process 750, using data center 104 can request or otherwise access data from mobile device network providers (e.g., data center 108) that store data for mobile subscribers. The data may include a plurality of utilization metrics pertaining to a plurality of mobile devices carrying out a plurality of network interactions. The data may be retrieved via mediation zones 112 and 114 and provided to consumer insight application 116 for analysis and presentation in reports. The data may pertain to HTTP requests, call placement and reception, online access of data, location browsing, location movement, pings of a mobile tower, etc. The plurality of mobile devices are generally associated with a plurality of users and identified only by behavior on one or more networks, rather than personal data.

At block 734, the process 750 may include categorizing the data into a plurality of Internet domains associated with the data. For example, the analytics and data storage layer 120 may analyze and categorize data according to particular HTTP domains in which the data may pertain. HTTP Internet domain may be categorized into standard topics like news, sports, entertainment, content server, technology, etc. There may as many as 400 categories for HTTP usage categories.

At block 736, the process 750 may include determining a plurality of patterns in the data. The plurality of patterns may be used to correlate age groups (or other category) represented in the data with at least a portion of the plurality of Internet domains. For example, a pattern may pertain to the use of TWITTER more than a predefined amount of times in a day. Such a pattern may signal classification into a particular age group.

At block 738, the process 750 may include determining an additional pattern in the data. The additional pattern may correlate each gender (or other category) represented in the data with at least a portion of the plurality of Internet domains. Such calls may be used to identify patterns in gender with respect to online activity from a mobile device.

At block 740, the process 750 may include generating a plurality of rules based on the plurality of patterns and the additional pattern. The rules may be generated based on determining that a particular age group in the data corresponds to particular browsing or location activities represented in the data. The rules may be generated based on detecting that a particular gender represented in the data is associated with a particular browsing activity represented in the data. For example, a rule may be generated that detect similar call volumes and associate such call volumes with users of a same age group or gender. Other examples may include rules dealing with call times, Internet access times, mobile device location and timing, as well as browsing behavior based rules.

The process 750 may additionally include obtaining additional data from one or more mobile network providers. For example, additional mobile network operator data centers 108 may be contacted to retrieve data for a specific area. For example, Verizon, T-Mobile, Sprint, AT&T, and/or other mobile device provider may each be contacted to retrieve mobile network data for a particular location (or point of interest). The retrieved data can be assessed using the plurality of rules described herein. For example, the process 750 may apply the plurality of rules to the additional data to classify the data according to one or more of the plurality of patterns. Upon detecting patterns in the data and classifying such data according to the patterns, the process 750 can include generating a plurality of age bands, each of which correlate to at least one of the plurality of patterns represented in the data and generating at least two gender groups, one of which correlates to the additional pattern represented in the data. Upon completion of the data analysis and pattern analysis, the process 750 can generate, for presentation in a graphical user interface, a plurality of graphical reports indicating behavior for mobile device users represented in the additional data. The behavior may be indicated in the plurality of patterns and graphed according to age band and gender, as shown in the screenshots herein. In addition, in response to receiving a request to view analysis of the additional data, the process 750 can present, in the graphical user interface, at least one of the plurality of graphical reports. A user can interact with such reports to glean information about consumer behaviors and/or to modify or assess additional consumer behaviors.

In some implementations, the process 750 includes grouping the plurality of Internet domains into a plurality of content categories representing the data and determining browsing patterns in the data according to the plurality of content categories. The grouping of domains into fewer categories than individual domains can enable easier classification. The behavior may be identified and processed according to a plurality of predefined age bands and gender groups to assess which categories pertain to which age band and which gender. The process 750 can also include generating a plurality of updated rules based on the determined browsing patterns for the individual categories.

In some implementations, the process 750 can include determining that a portion of the plurality of utilization metrics include automated mobile device network activities. For example, the process 750 can determine that particular HTTP requests, browsing or call behavior is in fact, machine based rather than user based. To remove this activity so as to not classify it in human behavioral aspects, the system 100 can filter the portion from the data before categorizing the data into the plurality of Internet domains. The filtering may be based at least in part on a plurality of mobile call rules. The rules may be used to detect whether a particular call activity is user or machine initiated/implemented. In an example, the mobile call rules may pertain to call time, call duration, gap duration consistency, devices called, and device location, etc., as described in detail above.

In some implementations, the plurality of Internet domains define a browsing profile associated with one or more of the plurality of mobile devices. In some implementations, the plurality of utilization metrics are associated with one or more voice transaction, short message service transaction, HTTP access transaction, and location transaction. In some implementations, filtering the data by selecting and removing a portion of the Internet domains from the data in response to determining that the data represents less than a predefined threshold time for visiting the Internet domains.

Home Location Prediction

Mobile network data, if analyzed properly, can increase our knowledge about mobility profiles of people in a place. Such knowledge can be used in many applications such as product advertisement and traffic management, just to name a couple of examples. A constant feature of any mobility profile is the knowledge of home and work places. Home and work place distribution of a city also helps in making urban development decisions. However, such data would typically be collected via surveys and thus be limited in size. The architecture described herein can include any number of models that may be used with mobile network data to predict the home location and the work location for particular users on a weekly, a fortnightly, and/or on a monthly basis.

In order to function, and route calls, these technologies use a mobile service provider to know the cell in which a mobile device is present. These cells are of varying size, from a few kilometers in low-density areas, to a few meters within cities. This gives service provides a record of the movement of each device.

Figure 8:
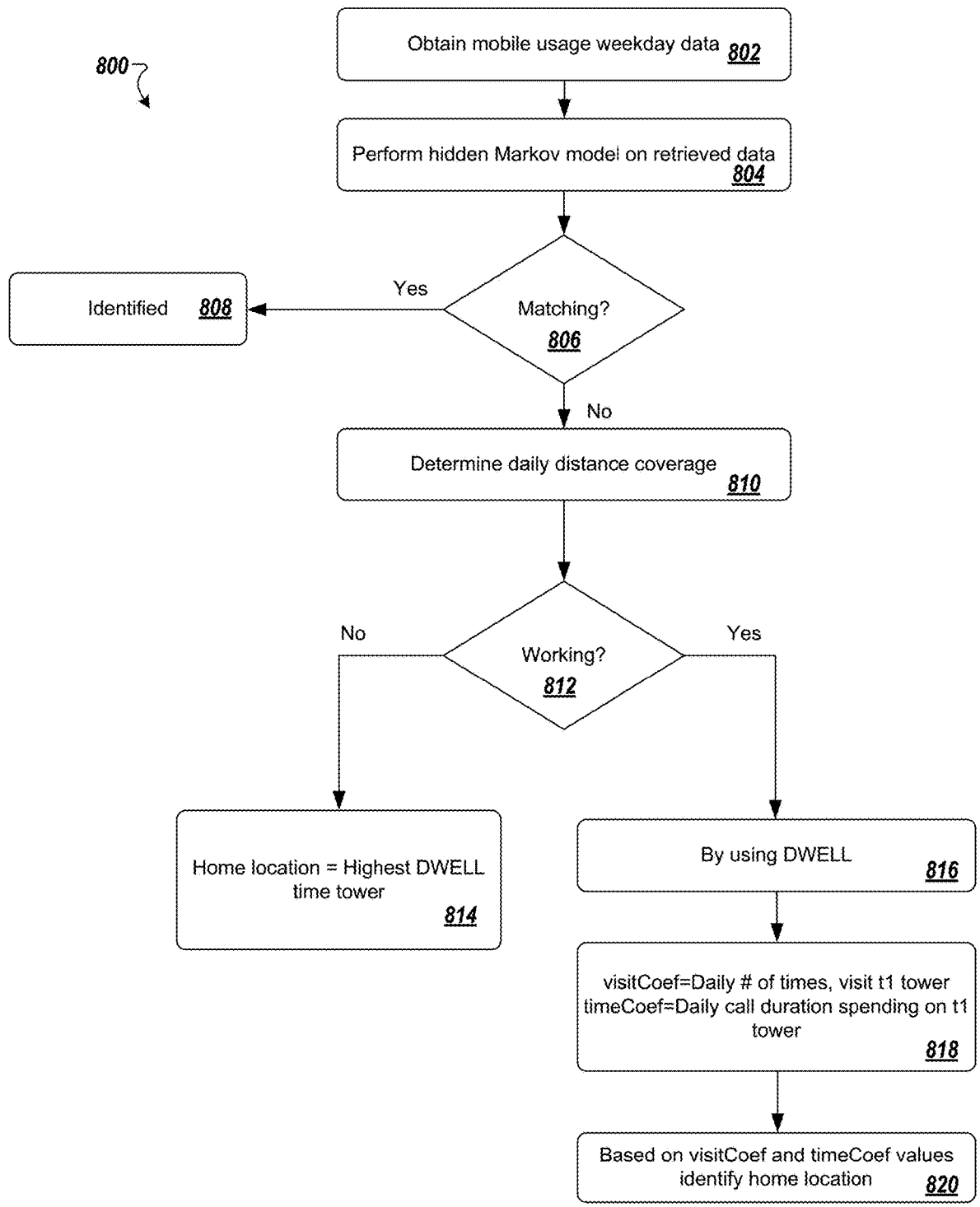
FIG. 8 is a flowchart that illustrates a process for identifying a home location of a subscriber based on the mobile usage patterns.

FIG. 8 is a flowchart of a process 800 that illustrates a method for identifying a home location of a subscriber based on the mobile usage patterns. In general, home location prediction algorithms may be carried out by the location determining engine 125, which can determine and provide consumer insight information. The process 800 may employ architecture and rules from FIGS. 1A-1D to identify and/or predict a home location of a mobile device user (e.g., a subscriber) based on the mobile usage patterns of the mobile device. An example rule that may be employed includes identifying a home location using a common and lengthy (e.g., eight to ten hours) nighttime location and dwell time may indicate a home residence.

The process 800 may include preliminary steps such as obtaining mobile network operating data from system 113, for example, and cleaning the data. The mobile network operating data may include mobile usage data for a plurality of users over a predefined time period. The time period may be for one to twelve months.

The process 800 may include identifying working and non-working users. For example, the process 800 may retrieve data that pertains to user calls and mobile device interaction for during weekdays, at block 802. The data that pertains to user calls and mobile device interaction on weekends may be discarded for another use.

At block 804, the process 800 may include identifying a plurality of users based on a location of the user. For example, the mobile services data center 104 may attempt to identify users using a Hidden Markov Model (HMM) based on a location captured by a mobile device associated with the user.

At block 806, the process 800 can determine whether a user (e.g., mobile device) can be matched to a location. If the user is matched to a location, the process 800 can identify the user at block 808. Identified users may be discarded for this particular algorithm. If the user is not matched to a particular location (and thus not readily identifiable), the process 800 can determine 810 a daily distance coverage for any or all of mobile devices associated with a non-matched (e.g., non-identifiable) user. The daily distance coverage may represent a distance from a mobile device to the cellular tower providing the cellular (e.g., mobile device) service. The daily distance coverage can be determined using the Mobile Station International Subscriber Directory Number (MSISDN) associated with each user. The MSISDN represents a number uniquely identifying a subscription in a mobile network. The MSISDN maps the telephone number to the SIM card in a mobile device.

At block 812, the process 800 can use the daily distance coverage to determine whether or not users are working users (e.g., travel to an office to work) or non-working users (e.g., users working at home or non-working users). In general, a working user may include a user whose MSISDN coverage is more than 2 kilometers distance. Such a threshold may be adjusted for differing populations of areas. The process 800 can generate a working and non-working category by using the daily distance coverage for each particular device.

If the user is determined to be a non-working user, the process 800 can set 814 a home location as the location with the highest determined dwell time. Dwell time may represent the time over which a mobile device may be accessible (e.g., able to make a call) within a cell. If the user is determined to be a working user, the process 800 can use a determined dwell time, at block 816, to calculate a number of times a tower is visited daily (represented as visitCoef) and calculated how much dwell time is spent on that tower daily (represented as timeCoef), at block 818. Based on visitCoef and timeCoef value, the process 800 can determine, at block 820, a likely home location for each mobile device (e.g., user).

Work Location Prediction

In general, work location prediction algorithms may be carried out by the location determining engine 125 to determine and provide consumer insight information.

Figure 9:
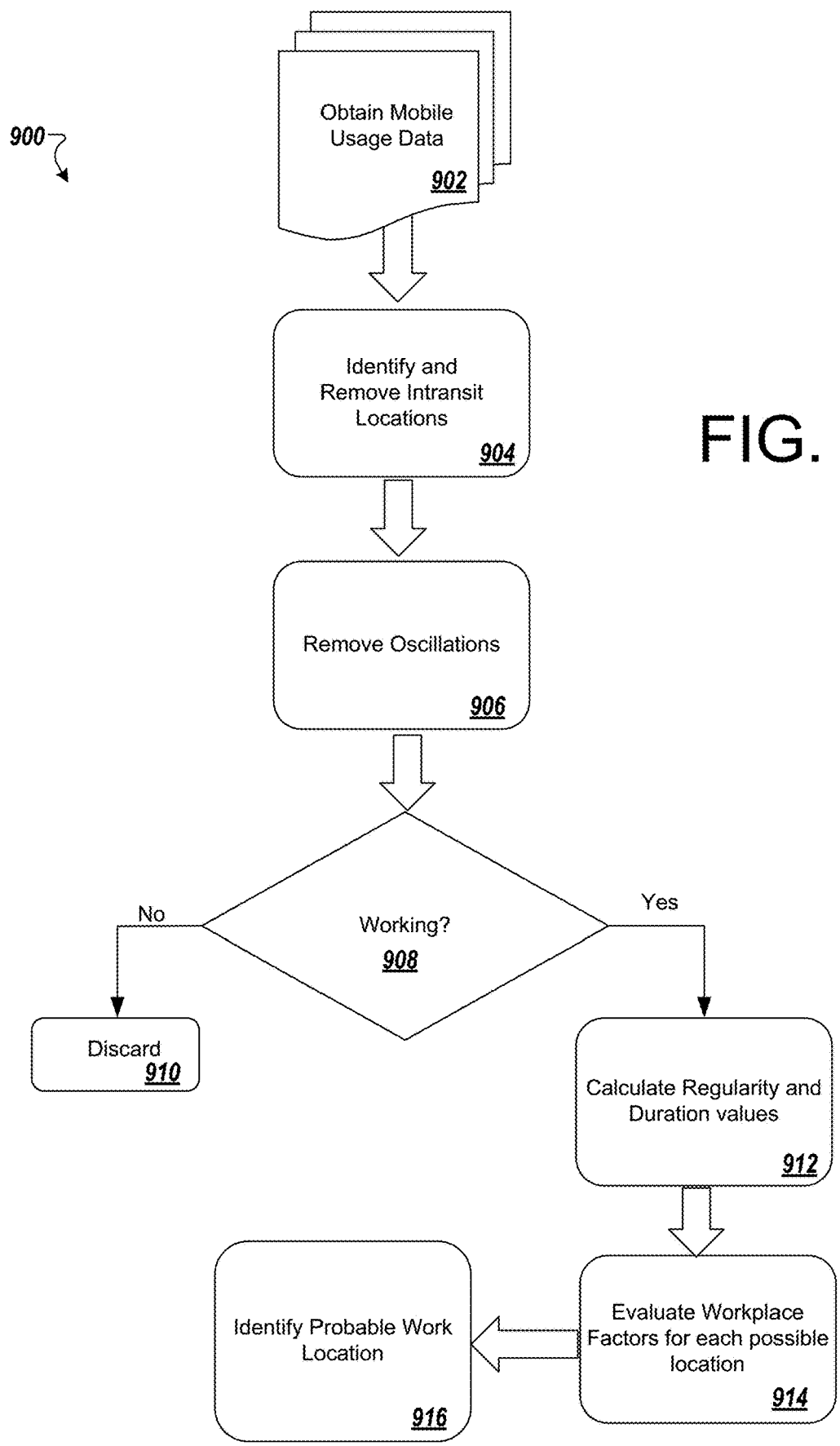
FIG. 9 is a flowchart that illustrates a process for identifying a work location of a subscriber based on the mobile usage patterns.

FIG. 9 is a flowchart that illustrates a process 900 for identifying a home location of a subscriber based on the mobile usage patterns. The process 900 can employ one or more algorithms to predict (e.g., or otherwise identify) a work location of a subscriber based on the mobile usage patterns of a mobile device associated with the subscriber. Some rule are identified to identify the work location which are based on the concept that a good portion of users do not work seven days per week. If weekends and week days are identified, then based on the call frequencies on weekdays during working hours, a work location can be identified.

The process 900 utilizes the architecture described in FIGS. 1A-1D to implement a set of data structures, scripts, UI structures, amongst others, in other to fully implement a tool to track where users work location may be and where a user may visit after visiting a particular location. In one example, the analytics and data storage layer 120 may carry out the process 900 using one or more algorithms 122. In some implementations, a number of reports can be provided with such a tool. The reports may be oriented by Areas of Interest (AOI) on a map.

The work location prediction generated by process 900 may be based on the places where the users spending their working hours mostly. In some implementations, features such as home location and transit locations can be removed from the data. Other features such as working days and non-working days in a week can be identified for working users and based on the regularity of visits to different locations, the process 900 can determine, and report in a user interface, a probable working location. In some implementations, the process 900 can determine, and report in a user interface, a top three possible working locations.

At block 902, the process 900 can include obtaining mobile usage data for a plurality of users over a predefined time period. The time period may be for one to twelve months. The process 900 may identify working and non-working types of users and then identify work location for working users. To identify work location week days and weekends are identified for each user and then most frequent location on working days is identified as work location.

At block 904, the process 900 can include removing users having less than fifty records with latitude and longitude values. This may include checking a number of records present in which latitude and longitude is available. For example, if the number of total records including all types of call are less than fifty, then process 900 can ignore the user from the next process and the work location for that user will not be determined.

In some implementations, the removing users can include considering at least two decimal places for latitude and longitude. The process 900 can then truncate the decimal places for latitude and longitude to two decimal places.

At block 906, the process 900 can include removing oscillations. For example, the analytics and data storage layer 120 can remove data record oscillations if two consecutive records have the same time stamp or extremely close time (e.g., within 5 seconds and configurable). The analytics and data storage layer 120 can then replace the location associated with a lower frequency record with the location associated with the higher frequency record. In particular, the layer 120 can use one or more algorithms 122 to determine a First level filter to classify in transit locations for each mobile device. The in transit locations may be classified based on a dwell time that is less than a predefined threshold and/or on a call frequency that is less for a particular transit location. The transit locations may also be classified based on a distance between two consecutive records divided by the time difference between the records. If the calculated value is less than the predefined threshold (e.g., 1 meter/second, 5 meters/second, etc.), then the process 900 may include tagging the second record as the in transit location.

At block 908, the process 900 can include determining whether particular users (represented in the usage data) are working or non-working users. The process may be similar to process 800 in which users are classified into working or non-working categories. In some implementations, the process 900 can determine whether users are working and non-working by analyzing locations of weekly frequency and dwell time and call frequency. For example, if the data shows few locations with weekly frequency over an average of four to six days for one or more locations, then the user represented in the data may be classified as a working user.

At block 912, the process 900 can determine a working location by analyzing (e.g., calculating) a regularity of dwell time and a duration of call frequency for each mobile device represented in the usage data. If dwell time and call frequency are high at a particular location, that can be classified as a user's work location. If the location of weekly frequency and dwell time/call frequency are determined to be low or too similar to differentiate, then the process 900 can discard the data for that specific user, at block 910.

In another example, the process 900 can evaluate workplace factors for each possible location associated with a particular mobile device, at block 914. For example, the process 900 can identify a working location from the data by identifying working and non-working days based on average days per location for each user. Next, the process 900 can calculate regularity of working day factors (e.g., a number of workdays a location is used by a user). The process 900 can calculate a regularity of non-working day factors (e.g., a number of non-workdays a location is used by a user). The process 900 can then calculate a duration of working days in which the dwell time for each location on working days is analyzed.

At block 916, the process 900 can identify a probable work location based on the above factors. For example, the layer 120 can consider locations with weekly frequency of an average of four to six days and can analyze call volume or dwell time on such locations to check that each are above a predefined threshold level. In addition, the layer 120 can calculate the work place factors for each location using the following equation. The location with the highest work place factor calculation can be identified as a probable work location.

$$workPlacefactor=((regularityWorkingDays+k)/(regularityNonWorkingDays+k))*durationWorkingDays$$

Physical Journey Using Dwell Time

Figure 10A:
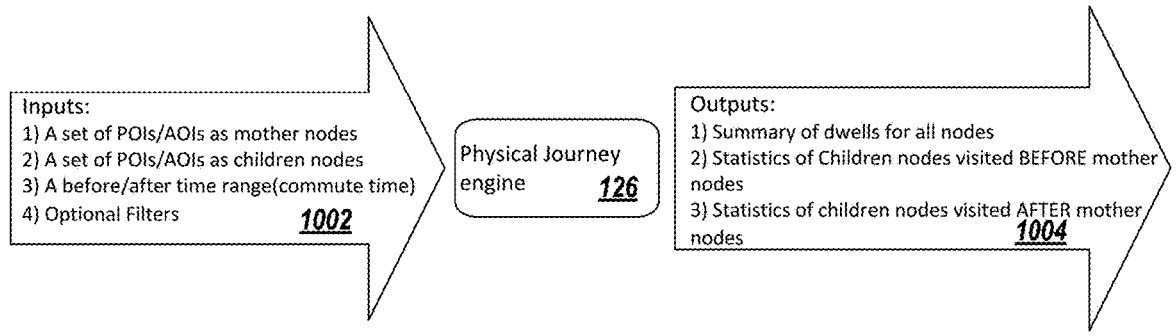
FIGS. 10A-C are block diagrams of example operations to determine physical journey and dwell time for mobile device users.
Figure 10B:
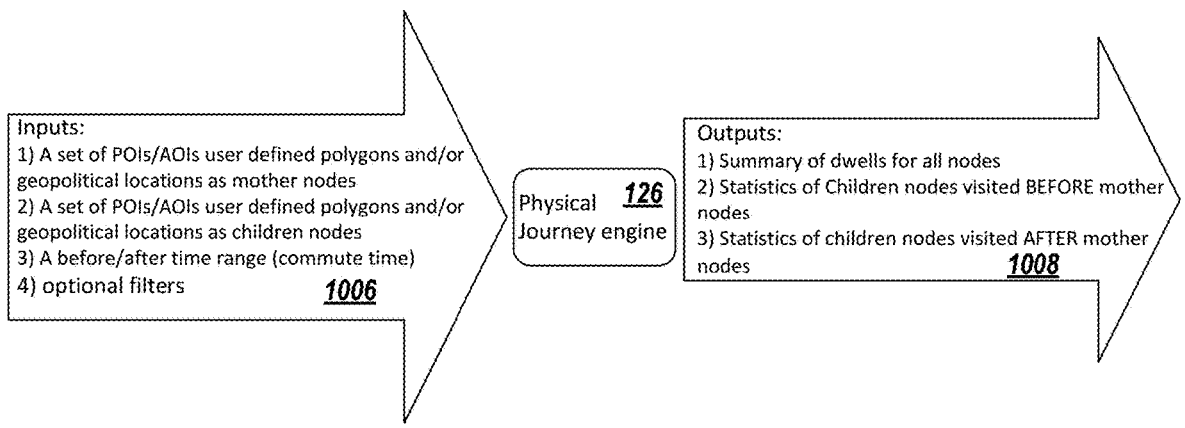
Figure 10C:
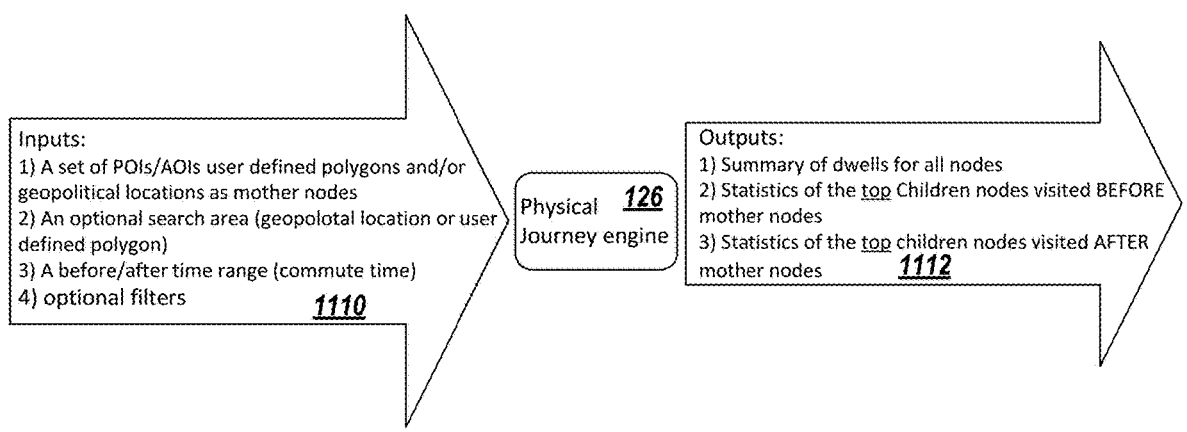

FIGS. 10A-C are block diagrams of example operations to determine physical journey and dwell time for mobile device users. The operations can be implemented using a set of data structures, scripts, UI structure, amongst others, in other to generate and provide a tool to track where users physically come from, and where they go after visiting a particular location.

In general, the physical journey algorithms are based on the places where the users have dwelled. In other words, the algorithms determine a place in which users were not merely "passing by," but where the user intentionally visited as an intended destination. This means that a users' dwell times and locations are calculated while taking into account that a variable range of errors may be present in the coordinates being analyzed. In some implementations, the physical journey algorithms used herein can pre-calculate the dwelling information and store dwell results for being used on-the-fly afterwards. These calculations will be based in preset areas that will be referred as Dwell Calculation Areas (DCAs).

The input described below may refer to data available (e.g., retrieved) from a mobile network hosting user mobile devices. The input may be based on user mobile device activity and a physical location of the user.

A single dwell calculation can include receiving a point (POI location for example), a metric error for coordinates corresponding to the point of interest, an optional time range to work within. Regardless of the different result formats, raw results for every single dwell have the following fields (columns): User Identification (MSISDN); the start date/hour of the dwell; the end date/hour of the dwell; the number of minutes elapsed in the dwell; and, optionally, other attributes of the user (age band, handset model, gender, etc.). For the calculations, the dwell calculation may use an area in the shape of a square (to increase performance) that has the inputted point as its center and the inputted precision as half of the size of the sides of these squares.

In addition to defining the sizing of the areas to pre-calculate dwells (for the first and second use cases above), the algorithm can define a shape to optimize performance. Therefore, squares can be defined to represent these areas while optimizing performance and accuracy of results. Another reason for squares being a good option for representing these areas is the possibility of settling them side by side in the shape of grids.

In some implementations, the algorithm can define an estimation of dwells for random areas using distance of the center of these areas to the Dwell Calculation Areas (DCA) nearby, a size of these areas, and an amount of intersection between these areas and the DCAs.

The algorithms implemented to determine physical journeys and dwell information for mobile device users can include accessing and analyzing the dwell information tracked by a physical journey feature (e.g., on-the-fly dwell calculations and dwell pre-calculations using Dwell Calculation Areas (DCAs).

As used herein, the term "dwell," pertains to a noun or verb that represents that a user has been located in a given location (for a minimum period of time). This minimum dwell time aims on separating this visit of being classified as "passing by" or "commuting to." Dwell may also be used as verb to represent the action of being or visiting somewhere. As used here, the term "Dwell Calculation Area (DCA)" represents a pre-determined area used to pre-calculate subscribers' dwell information.

As used herein, the term "bounce" pertains to a noun or verb that represents that a user has passed by a given region. This definition is related with the dwell definition above in a way that it is considered that a user bounces (commutes) between places where she stayed long enough to be considered dwelling.

As used herein, the term "mother node" represents the location that has been chosen as the base location for calculating information about (e.g., where the users that are there within a set of given constraints have been immediately before and/or after going to this mother node/location).

As used herein, the term "children nodes" represents a set of locations in which the people that were in the mother node have been before and/or after visiting the mother node location. It is intended to use these locations to compare user origin and/or destination after visiting a particular location.

As used herein, the term before/after" represents the functionality that calculates the places (e.g., children nodes) where subscribers have been before and/or after visiting another location (e.g., mother node).

The following set of features are based on the concept of tracking the physical places in which a mobile device network's subscribers have been at, and also the places where they passed by. This set of features may provide an advantage of assisting companies to have a better understanding of location and call patterns in the real world.

A first physical journey algorithm may be carried out by a physical journey engine (e.g., engine 126) to provide metrics for a closed ended physical journey with dwells calculated on-the-fly. As shown in FIG. 10A, the physical journey algorithm may include providing or obtaining as input 1002, a set of points or areas of interest as mother nodes. The inputs 1002 may also include a set of points of interest or areas as children nodes. The algorithm may not have dependencies with the Dwell Calculation Areas (DCAs) because the dwells for each of these areas can be calculated on the fly. The input mother and children nodes can be points of interest (POIs) and/or small areas of interest (AOIs). These small AOIs are allowed to have a maximum area of nine square kilometers. Larger areas may be avoided because a dwell calculation on such large areas may potentially generate false positive dwells of people passing through these areas, which is considered a bounce, not a dwell.

The input 1002 may additionally include a before/after time range to ensure a time window (in minutes) that will define the maximum amount of time that a person should have been in a children node before dwelling in a mother node as well as, analogously, the maximum amount of time that a person should have been in a children node after dwelling in a mother node. This input can be interpreted as a commute time. The input 1002 may also indicate use of filters that can define a time range for restraining the calculations, as well as defining a profile for constraining the user set to be analyzed (such as users of a specific gender, handset, age band, etc.). The outputs 1004 of the algorithm may be generated as a summary of dwells for all nodes, statistics of children nodes visited before mother nodes, and/or statistics of children nodes visited after mother nodes.

As shown in FIG. 10B, a second physical journey algorithm may utilize the physical journey engine 126 to provide metrics for a closed ended physical journey with pre-calculated dwells. The inputs 1006 may include a set of POIs/AOIs user defined polygons and/or geopolitical locations as mother nodes, a set of POIs/AOIs user defined polygons and/or geopolitical locations as children nodes, a before/after time range (e.g., commute time), and/or optional filters.

The outputs 1008 may include a summary of dwells for all nodes, statistics, of children nodes visited before mother nodes, and statistics of children nodes visited after mother nodes.

The second use case is similar to the algorithm above, except that the second use case can receive, as children and/or mother nodes, user defined polygons and/or geopolitical locations (such as zip codes, cities, DMAs, etc.). The false positives that did not allowed big areas (bigger than nine square kilometers) in the first use case are eliminated in this use case because it uses Dwell Calculation Areas (DCAs). This fact makes the dwells being calculated in small areas that, together, generate the input areas. In other words, this means that it will be tested if a user has dwelled in individual small areas in order to conclude with confidence that that user has dwelled in the bigger area that contains the above-mentioned small area.

As shown in FIG. 10C, a second physical journey algorithm may utilize the physical journey engine 126 to provide metrics for an open ended physical journey with pre-calculated dwells. The inputs 1110 include a set of POIs/AOIs user defined polygons and/or geopolitical locations as mother nodes, an optional search area (geopolitical location or user defined polygon), a before/after time range (commute time), and/or optional filters. The outputs 1112 include a summary of dwells for all nodes, statistics of the top children nodes visited before mother nodes, and/or statistics of the top children nodes visited after mother nodes.

In some implementations, the third use case may not use children node as one of its inputs, making the search for the dwelling locations before and after the mother node open to all the locations within the optionally specified search area or, if not defined, within a twenty kilometer radius of the mother nodes. Not restricting the search of before and after locations with children nodes allows this feature to discover (potentially unknown) locations that users have dwelled before and/or after dwelling in the mother node(s). The optional filters may include, besides the filters already mentioned in the first and second use cases described in FIGS. 10A and 10B, the number of top children nodes to be returned in the output. If this number is not input, it may return a top ten before and a top ten after children nodes.

As it can be seen in the description above, the output for all of them is similar. Here is an example of the expected outputs for a test case (ran for the use case 1): Given a POI, the system will expand it into a square with the POI's location in the center of the POI. The size of this square will be defined according to the precision of the coordinates in this POI's region.

Given a user defined polygon, the middle tier will use an algorithm to break this polygon into a set of rectangles that will represent it. This set of rectangles will be the input that will represent the user defined polygon in question.

The postal codes, cities, DMAs, states and countries that are related to the data in the system will be in the database with, amongst other information, their shapes. These shapes are polygons that will be processed into sets of rectangles that will represent the geopolitical locations, respectively. These rectangles will be the input of the physical journey.

Rectangles or polygons may be used. It is noticeable that all polygons that are related to the inputs are converted into rectangles before being used by the core engine of the Physical Journey features. Computational time may be longer for processing polygons. The mathematical formula invoked by an intersect function tends to be more expensive than calculating intersections between rectangles.

It is possible to restrict the maximum driving distance from/to the chosen POIs/areas by using Nokia HERE API features. Their API allows choosing a POI and then drawing a polygon that approximately represents the driving distance from (or to) that point within a determined number of minutes. This feature can be used by the Physical Journey before/after range feature to restrict how far (in terms of distance).

The subscribers' home locations can be used as a category of itself in the third use case (FIG. 10C—open ended physical journey). This information can be calculated using the data generated with the Dwell Calculation Areas relying on an algorithm that can, for example, identify the locations where a given subscriber has dwelled the most from nine PM to nine AM in working days (Monday-Friday). Analogously, the work locations of the subscribers can also be calculated with the data generated by the Dwell Calculation Areas, as described in detail above.

FIGS. 11A-11C are example output results of implementing an algorithm for predicting a physical journey of a user. The outputs correlate to an example using the first use case described above. FIG. 11A includes an output that is a summary of dwells for all nodes. Output 1100 correlates to inputs in FIG. 10A. FIG. 11B includes statistics 1102 of the children nodes visited before mother nodes. Statistics 1102 correlate to inputs in FIG. 10A. FIG. 11C includes statistics 1104 of the children nodes visited after mother nodes. Statistics 1104 correlate to inputs in FIG. 10A.

Bayesian Location Planning

Another algorithm that can be used to determine and generate consumer insight information may include a Bayesian location planning algorithm Such an algorithm can be implemented by the location planning engine 128.

The algorithm may include implementing steps to refactor a location planning insight. The implementation described below may provide reporting in the form of a heat map and/or a table. The heat map may be location based and derived from actual map locations in addition to user location information. An example heat map is shown in FIG. 22.

The table may be divided by postal code and each row may represent a particular postal code. An example table is shown in FIG. 13A.

As used herein, the term "biased information" may pertain to information presented up until a current time in a location planning engine 128. The term "non-biased" information may take into account a size of a selected public population within a total population of a particular area.

As used herein, the term "mediation zone" represents a service that provides, among other things, an interface between the UI and the database/repository. As used herein, the term "location planning index" represents an index based in a harmonic mean that aims on estimating the likelihood of particular locations for the chosen filters.

FIG. 12A depicts an example data sample of a table report 1200 for location planning generated by the location planning engine 128. The table 1200 in is generated using a location (e.g., a city) and a set of filters. The Bayesian location planning algorithm can generate at least seven information fields for each of the postal codes associated with the given location (e.g., the city). These fields may include a post code metric that is the key value for the row (CELL_POST_CODE) 1202, a trend metric (TREND) 1204, a total subscribers in postcode metric (TOTAL_SUBSCRIBERS_IN _POSTCODE) 1206, a number of subscribers within the given filters in the postcode metric (SUBSCRIBERS) 1206, and a percentage of filtered subscribers 1208 within its postcode metric (P_SUBSCRIBERS_IN_POSTCODE) 1210. Note that in table 1200, values are not biased towards locations with more populations. The field may also include a percentage of subscribers within the filtered subscribers of all selected post codes metric (P_SUBSCRIBERS_IN_ALL_POSTCODE) 1212, a percentage of the filtered subscribers that have activities in a given zip code in more than one day of the chosen time range metric (RATE_OF_RETURN) 1214, and a location planning index (LOC_PLAN_INDEX).

Referring to FIG. 12B, a number of metrics can be plotted on a heat map. The heat map generated by the location planning algorithm, may include a dropdown list in the bottom left corner of the heat map to allow the users to select one the following data to be displayed in the heat map: (1) a point (coordinate represented by LATITUDE 1218, a LONGITUDE 1220, which are both combined for each row of the result), a number of distinct subscribers within the filters (SUBSCRIBERS) 1222, a number of total subscribers in the point (TOTAL_SUBSCRIBERS) 1224, a percentage that SUBSCRIBERS represent in TOTAL_SUBSCRIBERS of that point (P_SUBSCRIBERS_IN_POINT) 1226 (Note that this is where non-biased values may exist), a percentage that SUBSCRIBERS represent in the sum of the subscribers within the filters of all shown points (P_SUBSCRIBERS_IN_ALL_POINTS) 1228, and a location planning index for the point (LOC_PLAN_INDEX) 1230. (Note that the values may be partially biased towards locations with more populations). The data in FIG. 12B may represent data that may be used to generate a heat map (FIG. 22).

The location planning index is an index based in a harmonic mean that aims at estimating a set of promising locations for the chosen filters. There are two attributes involved in the calculation, and the choice for a harmonic mean is to avoid that locations with one high value attribute and one low value attribute overwhelms other locations with "more balanced" attributes. The harmonic mean cannot be made arbitrarily large by adding more big values to the argument set. Therefore, to obtain a large location planning index for a given location, this location should have a balance of big population and big non-biased percentage (see more below). This way high rankings are given to small or big zip codes that deserve attention. The two factors that impact on the location planning index of each location are population density and prevalence of subscribers within filters. The population density of the location includes a percentage of subscribers (within the chosen filters) in a given location over the total of subscribers (within the filters) in all the locations of the results. This is biased towards the most populated locations and the sum of these percentages is 100. The prevalence of subscribers within the filters includes a percentage of subscribers within the chosen filters over the total subscribers of the same given location. This percentage is not biased towards the most populated locations, but locations with a very small population can have a very high percentage here if its few subscribers are within the chosen filters. The sum of these percentages is not necessarily 100.

The harmonic means cannot be made big by arbitrarily adding big terms into the formula. This means that it would be better if both terms are not too far from each other in terms of values, so one would not be able to overwhelm the other. The second term will tend to be many times bigger than the first. In order to make both terms have values that will result in 100 if summed for all the locations, the second term has been modified as shown below:

The modified term two for location X may be calculated: 100*(term 2 of location X)/(sum of term 2 of all locations). It is worth to remember that the general formula for a Harmonic Mean with 2 terms is: harmonic mean=$2/((1/x1)+(1/x2))$, where x1 and x2 are the two terms. The location planning index can be written as: $2/((1/x1)+(1/x2))$, where x1 and x2 are the population density of the location and the modified prevalence of subscribers within the filters, respectively. It is also worth to remember that the table report has postal codes as locations, whereas the heat map has geographic coordinates as locations.

In some implementations, the algorithms described herein can interface with one or more databases to store and retrieve table reports and heat map reports. Particular inputs and outputs may be presented to the one or more databases to retrieve (or have generated) reports. For example, the inputs for suggesting a location list may include a single parameter that of the tabletype "SCI"."sci.db.analytics.tabletypes::TT_DYN_FILTERS" that contains filters that define a chosen time range (START_DATE and END_DATE), and a chosen city to make the reports about (CELL_CITY). All the other filters are recommendable, though optional.

The outputs for suggesting a location list may include a flag output for the Mediation Zone (1 AS INDEX, "Data" AS NAME). The main result, which has the following columns: CELL_POST_CODE, TREND, TO-TAL_SUBSCRIBERS_IN_POSTCODE, SUB_SCRIBERS, P_SUBSCRIBERS_IN_POSTCODE, P_SUBSCRIBERS_IN_ALL_POSTCODE, RATE_OF_RETURN, LOC_PLAN_INDEX.

The inputs for suggesting a location may include a single parameter that of the tabletype "SCI"."sci.db.analytics.tabletypes::TT_DYN_FILTERS" that should contain filters that define a chosen time range (START_DATE and END_DATE), a chosen city to make the reports about (CELL_CITY) and the definition of the user's viewport (VP_TOP_LEFT_LNG, VP_TOP_LEFT_LAT, VP_BOTTOM_RIGHT_LAT, VP_BOTTOM_RIGHT_LNG). All the other filters are optional. The outputs for suggesting a location may include a flag output for the Mediation Zone (1

AS INDEX, "Subscriber" AS NAME). The main result, which has the following columns: LAT-ITUDE, LONGI-TUDE, SUBSCRIBERS, TO-TAL_SUBSCRIBERS, P_SUBSCRIBERS_IN_POINT, P_SUBSCRIBERS_IN_ALL_POINTS, LOC_PLAN_INDEX HTTP Noise Filtration An HTTP noise filtration algorithm can be used to filter, normalize or associate particular HTTP data in mobile usage data. The noise filtration algorithm can be carried out by the noise filtration engine 129. The algorithm can carry out analysis of a user agent string available in HTTP data of mobile network logs. This algorithm allows a user to identify the important features in the user agent string that can be stored and what can be discarded. Another aspect of analysis of the user agent string is to identify if any part(s) of it can be utilized to detect the apps getting used.

A first process can employ spring data to apply various levels of filters to remove the noise from the HTTP data. The first process can remove records if the DOMAIN is NULL or "\N," remove records if DOMAIN is ipV4 address, and/or remove records if DOMAIN does not contain even a single subdomain. e.g. "veyhvsarawrr" is invalid domain name. The first process can also remove noise from the URL/URI path. For example, the process can remove noise from the HTTP data including removal of patterns in the URN DETAIL field like JavaScript, style sheets etc. which may be deemed as un-helpful in future analysis. Such removal of noise may include using a number of filters. Example filters may include, but are not limited to filter:*.js;7, filter:*.css*;7, filter:*.gif*;7, filter:*.ico*;7, filter:*.ttr*;7, filter:*.json;7, etc.

The first process can also determine and remove CAT-EGORY based noise. Once the CATEGORY is determined via an API and associated with the DOMAIN, additional filters at a category level can be applied. This step aims at filtering out certain categories which add up a volume into the HTTP records but that do not contribute into the browsing pattern of the user. The following categories may be filtered upon: Antivirus Software, Business—Other, Business Software, C/C++, Computer Peripherals, Content Server, Error, File Repositories, Information Security, Java, JavaScript, Login Screens, Marketing Services, Miscellaneous—Other, Mobile Phones, No Content Found, Online Ads—Other, Redirect, Spam URLs, Technology—Other, uncategorized, Unreachable, and Web Hosting.

A second process may include a final aggregation output on sample users. The aggregated HTTP records for some users are analyzed and assessed to generate a digital journey for each. The top DOMAINs in the output were analyzed to understand their validity. URLs belonging to this domain were explored to see if they can be rendered by a user voluntarily or are simply data that is a part of a valid page load—e.g., banner ads, images on a shopping website etc. Domain noise may be defined as the records that are present in the digital journey of a user but which do not necessarily contribute to the crisp paths taken by the user voluntarily.

A list of domain filters can be applied. For example, a blacklist for domains based on various patterns available in the DOMAIN string can be applied. Although there could be a chance of losing some important data here, the calls may be taken based on the percentage of invalid domains/URLs etc. for each of the patterns listed below after assessing more than 5000 domains and associated URLs.

The following is a list of filters that can be applied on the DOMAIN column. An asterisk "*" denotes "anything" that can follow or precede the pattern string. The filters may include static, cdn.*, analytics, adverts, ads., ads_, img.*, image*, twimg, track, trk, api, img*, tagstat, pics.*, picture, vpixel., and metrics.*

The noise filtration algorithm can also employ domain normalization is the process by which Domain URLs are standardized in a consistent manner. The goal of the normalization process is to transform a Domain name into a normalized domain name so it is possible to determine if two syntactically different domains may be equivalent.

Domain Normalization is widely employed by search engines, web crawlers and web browsers to access and identify the identical domains or URLs. It will be used with the same purpose in the Digital Journey too. In the data, if the URI_PATH data is available, it is easy to identify and filter the noise in the clickstream. But it may be difficult to identify the noise if only URI_HOST information is available. The Domain Name or URI_HOST possess a very limited information in the form of the domains and sub-domains only. Hence before identifying the noise, certain domain names which looks normal but are present in the different form are normalized in to its main or top domain level so that the useful footprint is not lost in the noise filtration process.

Identifying a user's digital journey is to capture the click patterns of the user. Hence domain normalization helps to retain that click pattern in a normalized way so that the digital journey is not lost. The steps to achieve domain include (1) Normalizations that preserve semantics and (2) Normalizations that change semantics.

The normalizations that preserve semantics by converting the host to lower case. The scheme and host components of the Domains are case-insensitive. Most normalizers will convert them to lowercase. Example: HTTP://www.Facebook.com/→http://www. facebook.com. The normalization can also remove a default port. The default port (port 80 for the "http" scheme) may be removed from (or added to) a domain name. Example: http://www.facebook.com 80/→http://www.facebook.com.

Normalizations that change semantics can remove or add "www" as the first domain label. Some websites operate identically in two Internet domains: one whose least significant label is "www" and another whose name is the result of omitting the least significant label from the name of the first, the latter being known as a naked domain. For example, http://example.com/and http://www.example.com/may access the same website.

Many websites redirect the user from the www to the non-www address or vice versa. A normalizer may determine if one of these URLs redirects to the other and normalize all domain names appropriately. Example: http://www.facebook.com/→http://facebook.com/. Removing "m" as the first domain label: It hardly matters if the user is accessing the mobile version of the domain or the desktop browser version. Hence the domain name can be normalized to its main domain name. Example: http://m.example.com/→http://example.com/

Removing domain filters which are blacklisted: The domain filters those are identified as above are normalized to its main domain name. It will serve as a better option to retain those domains or the footprints of the digital journey than removing them as a blacklist. Example: http://images.example.com/or http://api.facebook.com→http://facebook.com Replacing IP with domain name. (not feasible or a costly process) Check if the IP address maps to a domain name. Example: http://208.77.188.166/→http://www.facebook.com/.

Domain normalization can be achieved using the above steps. But at times, certain domains in which a sub-domain is present but normalization is not necessary. For example: http://maps.google.com. In this case, it is not necessary to normalize the domain name to its top level form because the original form is itself important. Based on this fact, there may be both a blacklist and a whitelist for a first level or sub domain name. In a whitelist, it is unnecessary to normalize the domains which contain maps, mail, or reservations as the first level or sub domain name. In a blacklist, it is typical to normalize the domains which contain the m.* or www.* as the first level or sub domain name.

A third process can be carried out in the HTTP noise algorithm to filter additional HTTP data. For example, an Appname filter may be applied. Appname filters represent a logical name assigned to the domains based on its business or purpose or parent organization. For example, the domain edge.mqtt.facebook.com is identified by the appname facebook-msgr or messenger. This way the domain name is known to be some driver or API but is associated with the messenger app of Facebook. Such appnames can also denote whether the set of domains belong to any particular single top level domain or any web hosting company. Hence the appnames which are tagged by a webhosting company may have potential domains too. Therefore the appnames has to be thoroughly verified on the internet before it is declared as noise.

The third process can include updating existing filter categories. For example, the domain filters removed the noise substantially from the HTTP data based on the URI, categories and domains and opened more prospects to search for the remaining and hidden noise (e.g., above in the first and second processes). The third process may ensure that the noise is further more reduced and a clean clickstream is surfaced. The domain filters in the third process may add a few more lowest sub-domain based filter keywords based on the frequency, occurrence, etc.

Identifying the filters in the third process may include identifying appname noise, identifying the domain noise based on the lowest sub-domain, and reanalyzing the appname noise to validate. Identifying the appname noise may include checking whether the appname includes distinct domains. If the appname has very few distinct domains under it for e.g. up to 10 distinct domains then appname is real. If the appname has many distinct domains under it then it is possible that it is a content server or a hosting site which holds a heavy number of good and involuntary clicks both. An appname which is a hosting site could possess many potential domains. Hence it is not full proof to rely completely on the appname to declare some domain as noise.

Identifying the domain noise based on the lowest sub-domain may include separating the lowest level sub domains and calculated its freq. Sorted in descending manner of the frequency, the noisy or potential involuntary sub-domains were marked as noise.

There are a large number of sub-domains which occur only once, twice or thrice in around 317K records. Such sub-domains are difficult to identify as noise or safe. The Appname noise and validate if any appname declared as noise earlier may still have any potential domains and its noise tag revoked. For example, determining how many sub-domains which are not tagged noise yet gets covered in the declared appname noise.

After the third process is carried out and the filters have ensured to remove maximum noise from the set of HTTP events, the cleaner clickstream is obtained. But this clickstream may contain redundant occurrences of involuntary but potential domain hits. For example, if event 1 and event 2 belong to same domain and have occurred on the same timestamp, the event can be rolled up to a single occurrence. If event 6 to 11 have multiple events with a gap of a second or two that occurred on the same timestamp, with same domains or different sub-domains but same domains, such events can also be grouped based on the normalized domains and can be rolled-up to a single event represented by its normalized form.

After aggregation, in order to retain the period information of the redundant events, its minimum and maximum timestamp can be preserved either in terms of separate columns or the duration in seconds. The clickstream rollup can provide advantages including, but not limited to displaying a cleaner view of a clickstream, aggregating a long list of similar domain hits into one event in the interest of the purpose of identifying an occurrence of an event in the clickstream, reducing the data size by fifty percent, and provide help in identifying background hits. FIG. 13 is an example clickstream 1300 generated when implementing the HTTP noise filtration algorithm described herein.

Additional domain normalization can be performed. The additional normalization can be performed in domain normalization for all of the top 5000 domains from 3 days of internet data usage in this round. The coverage of these top 5000+ considered domains is more than 90 percent based on the frequency values. The selected domain names may be analyzed manually for normalization. The following aspects can be checked based on manual assessment of domain in the normalization process: (1) domain name should exist (e.g., execute/visit the given domain names on web and check if it is loading the expected page or not), (2) limited parts in domain names (e.g., manually check if there are too many sub-domain names existing and then keep the logical set with respect to user activity, (3) whitelist: Keep all the sub-domain name parts which exists in whitelist created, (4) blacklist: Remove the sub-domain names which are listed in blacklist of sub domain names, and (5) category: It is ensured that by removing some part of domain names, the category of the new normalized domain should remain the same.

An overview of the HTTP noise removal processes is shown here. Process 1—Http event filtration, Zvelo API, Session Identification: Generic Level filtering should remove the unwanted data, remove records if DOMAIN is NULL or "\N", remove records if DOMAIN is ipV4 address, remove records if DOMAIN does not contain even a single subdomain. E.g. "veyhvsarawrr" is invalid domain name, remove the http events using URN_Detail level filters, connect to Zvelo API and identify the categories against each domains. (URI_HOST), remove the http events based on the Category Filters, once all of the above steps are executed, remove the URN_Detail column after filtration, and identify sessions for more detail clickstream analysis.

Process 2—Http event filtration: Remove the http events based on the Domain or URI_HOST filters and apply the round 2 Category filters and remove the noisy http events.

Process 3—Http event filtration and Final Aggregation: Filter part includes filtering the remaining records and verify against the Appname noise which forms a new process 3 filter list, after process 3 filters, what remains is clean click stream, and perform clickstream aggregation by In a session, if the normalized domains form consecutive events of a same domain irrespective of the gap in timestamp 14 mins) then the entire clickstream can be aggregated to one event, represented by its most appropriate normal form.

In some implementations, the HTTP noise removal algorithm can be used to identify associative patterns. The associate patterns can help domain normalization. Normalizing a domain is a complex process with no particular rule. The condition for normalization changes with every domain. Even though a manual mapping is created between the raw domain and its normalized form, it is not possible to cover all the domains and newly arriving domains in the database. Thus, the HTTP noise removal algorithm can use associations to decide the parent domain and normalization strategy for its associated domains. For example, before an association I.instagram.com is normalized to instragram.com. Instagram.facebook.com is normalized to facebook.com. Here, Instagram.facebook.com belongs to Instagram.com and both are associated. After Association, the association rule will identify that the two domains always appear together, and hence the chances that they are related are high. It may suggest that instragram.facebook.com does not belong to Facebook and the user never went to facebook.com. I.instagram.com is normalized to instragram.com instagram.facebook.com is normalized to instagram.com.

Mapping Human Behavior

A mapping human behavior algorithm can be used to dynamically map human behavior using virtual cells from cell-tower events. The behavior mapping engine 127 can employ the algorithms described below.

In general, the algorithm considers aggregated data versus raw data. A tradeoff is generally made between precision (raw data) and performance (aggregation data). The following steps aim to use both while relying on a (set of) criteria to choose between them depending on the request parameters. An aggregation layer would generally perform steps first for applying and choosing criteria (e.g., counting how much data is involved using a threshold), and then the procedures would be able to choose which data to use. This means that if the amount of data involved does not reach the threshold, the procedures would use raw data (based on latitude/longitude), thus yielding higher precision results. On the other hand, if it is higher than the threshold, the aggregation data would be used (based on virtual cells), thus providing higher performance. Although counting/summing records on the aggregation data is a fast and reliable criteria, other criteria may be added later to optimize the choice between raw vs aggregation data, such as taking into account the functionalities' complexity. In addition fuzzy logic can be added based on the confidence on the coordinates' precision, accounting the neighbors virtual cells when using aggregation data, and also making an adjustable radius depending on POI size when using raw data.

Heat map performance issues may exist as more and more unique coordinates are used because the amount of data returned from the database 120 to the mediation zones 112/114 and the user interface may not be feasibly used. To address this issue, the aggregation data can be used when higher performance is needed, or extra pairs of coordinates can be added with less decimal digits on the usage data. To choose the POIs and/or AOIs, the UI can allow the user to draw polygons for choosing these areas. These polygons should be limited to rectangles, so performance would not be affected in the database side, and the user would still have flexibility to choose almost any kind of shape (for POI, streets, plazas, squares, etc.). Whichever shapes are chosen, point(s) and/or rectangle(s), the same logic can be applied to choose between aggregated data and raw data, and still be able to add fuzziness depending on the confidence on the activities' coordinates in these areas.

To implement virtual cells and aggregation data, the mapping human behavior algorithm can include refactoring heat maps and integrate virtual cells. Refactoring heat maps can include (1) creating extra columns in the USAGE_DETAIL table for storing latitude/longitude with different precisions (by MZ 112 or database 120): creating two new pairs of latitude/longitude coordinates with up to three and two decimal digits, respectively should yield a lower number of unique locations when querying values grouped by latitude and longitude (2) Separating heat maps procedures that return different types of values at once (by UI, MZ and DB): e.g., heat maps can be included that query four types of user activities at once (e.g., voice, message, data, and all)—due to heat map data being potentially extensive, the fact that each of these are displayed separately, and the fact that almost always not all of them are used, it is proposed that the heat maps data types are requested on demand. This will enable the heat maps to have its requests responded faster and to have a higher precision overall (3) restricting the generation of values to a UI viewport seen on the map (by UI, MZ, and DB): two points would determine the viewport currently seen by the user (the left-top corner of the map, and the right-bottom corner). These points are to be sent by the UI amongst the other request parameters and they will be used to narrow down the data set (4) Wait for the user to stabilize map before the UI makes requests for it (by UI): A delay may be linked to the map before the UI makes requests for the current viewport, thus decreasing the backend load and avoiding useless requests (5) Enabling heat maps to have their precision dynamically chosen (by DB): Different types of precision should be used in the heat maps (low, medium, high). The precision to be used should be determined by a counting criteria (of unique locations) that relies on two thresholds: one to determine the choice between low and medium precision, and another to guide the choice between medium and high precision. Higher precisions should always be preferable (if they are within the thresholds, of course). If high precision is chosen, the values should be grouped by the standard latitude/longitude values (where up to 4 decimal digits are expected), medium precision should use the 3 decimal digits latitude/longitude, and high precision would use the 2 decimal digits latitude/longitude. This change would enable the heat maps to work with the numerous unique locations that should come with the use of the subscribers' actual locations.

In another example, the algorithm can make virtual cells integrated with the existing functionalities by (1) Rounding (not truncating) all latitude/longitude values to have a maximum of 4 decimal digits (by MZ): This would give us a minimum of 11 meter precision in the equator line, which should be enough since the average minimum precision would be about 8 meter (2) Changing CELLIDs types from INTEGER/int (32 bits) to BIGINT/long (64 bits) in MZ and DB: In order to have unique CELLIDs for virtual cells in any point of the world, the CELLID is to be related to the latitude/longitude values of its CENTER. This is done by concatenating the processed latitude/longitude values (in a way that is described in the next item) into a 12 digits integer (unsigned). Such size of integer cannot be stored within 32 bits, but it can be done in 64 bits. Tables that have CELLID row: USAGE_DETAIL, CELL_LOCATION, TT_POI_TOWER, TT_LIST_CELLID_LAC (and possibly others) (3) Apply virtual cells into activities (by MZ): For all data of activities that have its locations as the actual subscribers' locations, and not the base stations', the LAC should be set to −1 for indicating that its "base station" is actually a virtual cell, and the CELLID should be set to the above mentioned 12 digits integer as follows i. LAT_STR= ((LATITUDE rounded to have up to 3 decimal digits)+90) *1000, ii. LNG_STR=((LONGITUDE rounded to have up to 3 decimal digits)+180)*1000, iii. if LAT_STR or LNG_STR have less than 6 characters, add zeroes before them until they reach 6 characters, iv. CELLID=concatenate LAT_ STR and LNG_STR.

Adding 90 and 180 degrees to LATITUDE and LONGITUDE respectively will ensure that the transformed numbers will be always positive; Multiplying by 1000 will ensure that these numbers (which should be rounded to have up to 3 decimal digits for these calculations) will be able to be casted into integers without loss of information; Adding zeros until they reach 6 characters will ensure that all the CELLIDS have 12 characters and are uniquely identifiable by its correspondent LATITUDE/LONGITUDE.

The following source code for a procedure of ApplyVirtualCellsOnUsages can identify the main brands in terms of BVI (the Brand Value Index). It inputs the segment to be analyzed (inBrandCategory), the city and a date range. It outputs 6 fields about the top 10 brands identified in that segment: INDEX (BVI), TREND (the w/4w standard trend calculation), VALUE1 (the # of clicks), VALUE1_RATIO (the DECIMAL percentage of clicks within the top 10 brands being output), VALUE2 (the # of different subscribers), VALUE2_RATIO (the DECIMAL percentage of subscribers within the top 10 brands being output)

```
PROCEDURE "SCI"."sci.db.analytics.procedures.beforeafter::GetBrandByDomainTrend" (
  IN inBrandCategory VARCHAR(100),
  IN inCity VARCHAR(60),
  IN inDateStart DATETIME,
  IN inDateEnd DATETIME,
  OUT TrendList "SCI"."sci.db.analytics.tabletypes::TT_TREND_EXTENDED"
)
LANGUAGE SQLSCRIPT AS
BEGIN
 DECLARE v_total_clicks      BIGINT;
 DECLARE v_total_subscribers BIGINT;
 DECLARE v_Avg_Click_Total   BIGINT;
 DECLARE v_Avg_Subscribor_Total BIGINT;
   --select top 30 brands by subscribers (top 10 brands by BVI, and assume that these 10 brands will be within the
top 30 by subscribers). Narrow down the calculations for 30 brands to optimize performance
   DomainList = SELECT BRAND_NAME, COUNT(*) AS CLICKS, COUNT(DISTINCT MSISDN) AS
SUBSCRIBERS
          FROM "_SYS_BIC"."sci.db.analytics.views/AN_BRAND_CATEGORY"
          WHERE START_TIME BETWEEN :inDateStart AND :inDateEnd
            AND CELL_CITY = :inCity
            --AND TYPE = 'd' -- only show data
            AND BRAND_CATEGORY = :inBrandCategory
            AND BRAND_NAME is NOT NULL and BRAND_NAME != "
          GROUP BY BRAND_NAME
          ORDER BY 3 DESC
          LIMIT 10;
   --select totals for calculating percentages and avoid divisions by 0
   select sum(CLICKS) into v_total_clicks from :DomainList;
   select sum(SUBSCRIBERS) into v_total_subscribers from :DomainList;
   if NOT(:v_total_clicks>0) Then
      v_total_clicks := 1;
   end if;
   if NOT(:v_total_subscribers>0) Then
      v_total_subscribers := 1;
   end if;
   --select the top 10 by BVI within the 30 by subscribers
   topDomainTotals = SELECT BRAND_NAME, CLICKS,
          (CASE WHEN SUBSCRIBERS<50 THEN 50 ELSE SUBSCRIBERS END) AS SUBSCRIBERS,
          ((100*CLICKS/v_total_clicks)+(100*SUBSCRIBERS/v_total_subscribers))/2 as BVI
          FROM :DomainList
          ORDER BY 4 DESC
          LIMIT 10;
   --recalculate BVIs with the top 10 totals, instead of the top 30's
   --select totals for calculating percentages and avoid divisions by 0
   select sum(CLICKS) into v_total_clicks from :topDomainTotals;
   select sum(SUBSCRIBERS) into v_total_subscribers from :topDomainTotals;
   IF NOT(:v_total_clicks>0) Then
      v_total_clicks := 1;
   END IF;
   IF NOT(:v_total_subscribers>0) Then
      v_total_subscribers := 1;
   END IF;
   --recalculate BVIs and percentages for the top 10 brands
   topDomainList = SELECT BRAND_NAME, CLICKS, SUBSCRIBERS,
          100*CLICKS/:v_total_clicks AS CLICKS_PERCENTAGE,
          100*SUBSCRIBERS/:v_total_subscribers AS SUBSCRIBERS_PERCENTAGE,
          ((100*CLICKS/v_total_clicks)+(100*SUBSCRIBERS/v_total_subscribers))/2 as BVI
          FROM :topDomainTotals;
   --main results
   TrendList =
      SELECT BRAND_NAME AS NAME, ROUND(BVI,4) AS INDEX, NULL AS TREND, CLICKS AS VALUE1,
   ROUND(CLICKS_PERCENTAGE,2)   AS    VALUE1_RATIO,   SUBSCRIBERS    AS    VALUE2,
   ROUND(SUBSCRIBERS_PERCENTAGE,2) AS VALUE2_RATIO
```

```
FROM :topDomainList
ORDER BY BVI DESC;
END;
```

Creating virtual cells as base stations can be performed by adding rows in the CELL_LOCATION table in the database. The CELLID values should be the above mentioned integer (that is related to the coordinates of the center of the virtual cell). Also, the LAC value should be −1 in order to indicate that it is a virtual cell and so not being mistaken by an actual base station. Finally, the GEOM_STR and GEOM rows should describe the shape of the square like (a trapezoid to be more precise) that describes the virtual cell.

FIG. 14 is an example representation of a virtual cell 1400. The virtual cell 1400 includes up to 3 decimal digits for latitude/longitude as its center 1402. Virtual cells may be generated for the areas where there are activities with LAC=−1 (which indicate that they have latitude/longitude related to the actual subscribers) to ensure that these virtual cells are not being recreated.

The virtual cell can be used to create cities on a heat map to be searched (by MZ or DB). For example, virtual cells may be inserted into the a POSTCODES table with all the relevant values that will enable the inserted data cities to be searched in the app's search bar.

The mapping human behavior algorithm can also prepare engines for data source selection. The data source to be used in a procedure (either aggregated data or raw data) should be selected conditionally depending on a criteria (or even a set of criteria in the future). Initially, the criteria should be the counted activities within the given filters and others parameters passed in the requests. This would utilize a logic and a threshold that can be redefined. The aggregated data layer would be used for applying this criteria, since its data can be counted in a much faster way.

The above mentioned initial criteria would include always returning the aggregation data as the data source for selections that have a whole city as its scope (in other words, when no POIs or polygons are selected). In case there are POIs, base stations (which include virtual cells) and/or polygons in the selection, the choice of the data source would be (for now) based only on the counting criteria. If the count is bigger than the threshold, aggregation data would be used, otherwise raw data would be used.

In some implementations, the mapping human behavior algorithm can unify map controllers into one. Since big changes are to be made in the maps throughout the app's insights, all of its controllers should be made unified into one that, depending on parameters, would generate different types of maps.

In general, the user interfaces that provide data generated by the algorithms described herein provide both insights that have a whole city as a scope and insights that that have POIs as a scope. However, POI oriented insights are actually base station oriented insights. In other words, they take into account the base stations that cover the selected POIs, and not the POIs themselves. In the mapping human behavior algorithm, it is assumed that the data pertains to actual subscribers' positions, and not the base stations. Also, it is intended to make the small scope (POI oriented) insights to actually be oriented by the POI (and eventual polygons) locations.

Figure 15:
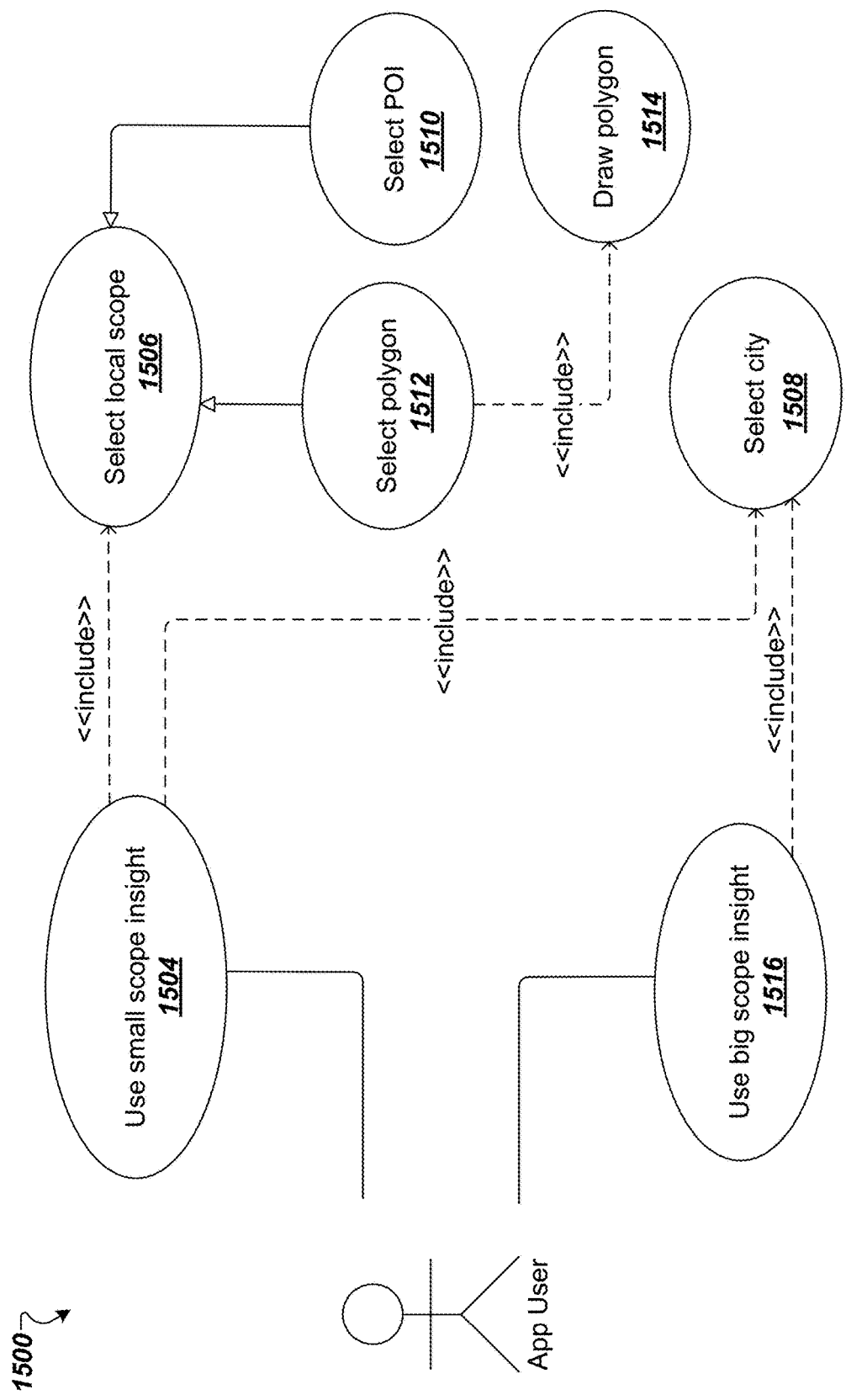
FIG. 15 is an example diagram depicting scope insight.

FIG. 15 is an example diagram 1500 depicting scope insight. In one example, the current small scope insights are: Cohort, Mobile Handset, Catchment and Footfall. The big scope insights are: Clickstream, Digital Journey, mBVI and Custom Insight. Custom Insight is a case that allows the user to select more than one city for the same insight, as well as the selection of small scopes (polygons). The scope insight can enable polygon drawing and/or restructure frontend selection options to provide users flexibility in the user interfaces of apps. For example, enabling polygon drawing and selection on the map of all small scope insights can be implemented) in the Custom Insight map. However, an additional constraint should be applied for maximizing database performance (e.g., restrict these polygons to rectangles.) By doing so, it would be possible for the databases to work around the expensiveness of using its "intersection method" and it would simplify the addition of fuzziness depending on the involved coordinates' precisions. In addition, it should enable the selection of more than one rectangle along with eventual POIs. Each of the rectangles can be represented by two points (as the viewport is shown herein). The insight may be configured to display the fuzziness that a particular database to account for areas around the selected areas/points.

As shown in FIG. 15, an app user can use a small scope insight 1504. The small scope insight can include selection of a local scope 1506 and/or selection of a city 1508. Selecting a local scope can include selecting a particular point of interest 1510 and/or selecting a polygon (e.g., a shape) 1512 for the local scope/point of interest. In some implementations, the user can draw the polygon 1514 to indicate the local scope. Insights with respect to the local scope, the polygon and the point of interest can be depicted in the UI for the user to view.

In another implementation, the user can use a big scope insight 1516 which typically includes selecting a city 1508. Insights with respect to the big scope and the city can be depicted in the UI for the user to view.

Figure 16:
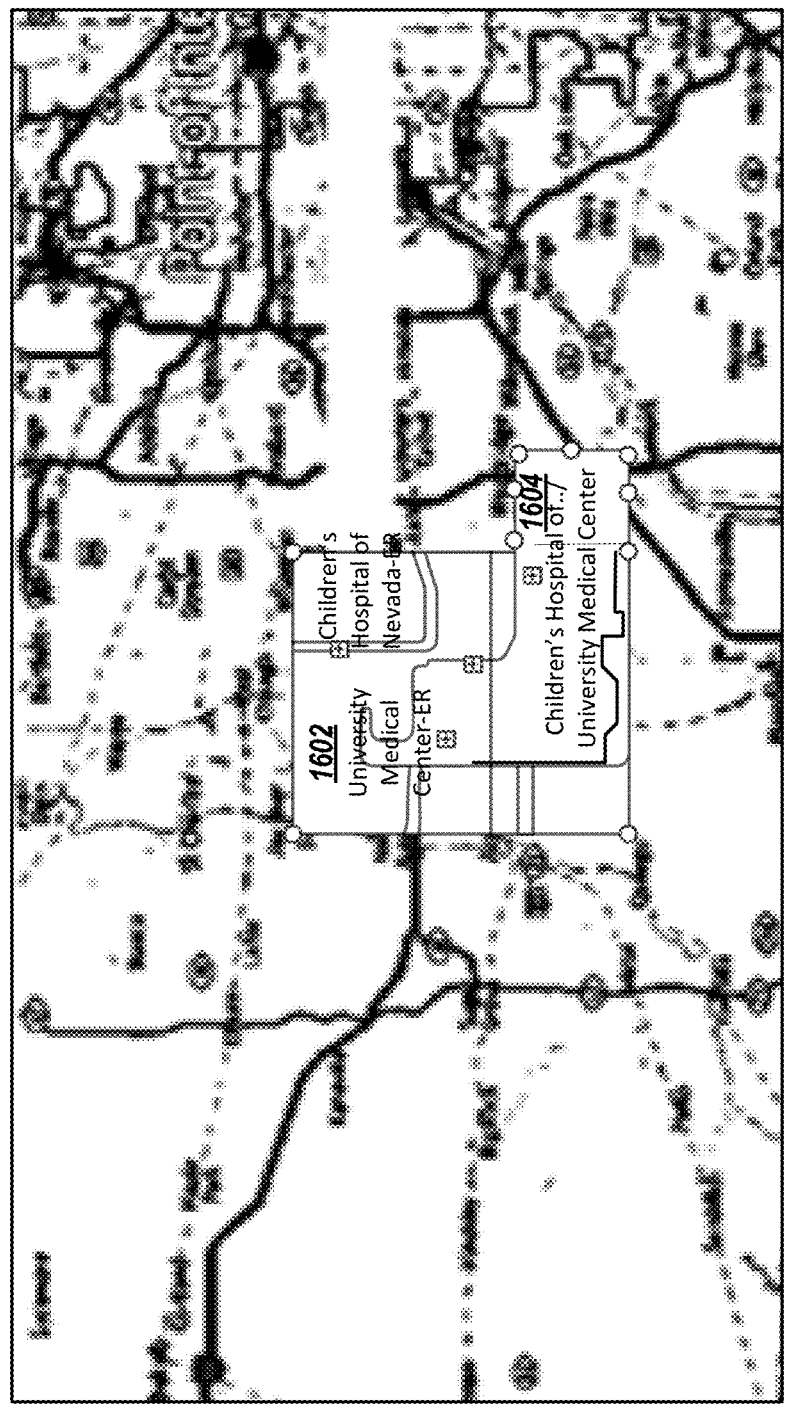
FIG. 16 is a block diagram of a selection of buildings within a user interface for retrieving consumer insight information.

FIG. 16 is a block diagram of a map 1600 showing user selection of points of interest. In particular, the user has used two rectangle shapes to select areas 1602 and 1604. Here, two buildings are selected with two rectangles. The systems described herein can send selected POIs' coordinates to orient POI functionalities as base station oriented functionalities. For example, in order to work with the activities surrounding the POI location, instead of sending the LAC/CELLID values for identifying the base stations that cover them, the geographical coordinates can be sent in the requests. Redoing backend procedures can be done in the database. Two types of procedures may exist (a) the ones that implement insights with small scope (e.g., POIs and polygons selection) and the ones that implement insights with big scope (e.g., whole cities).

The systems described herein can generate an auxiliary table to store standards. For example, to increase flexibility on the working parameters, a table can be created to standardize these parameters. This enables changes in the working of several procedures to be performed by modifying values in this table. Initial parameters to be stored in this table may include two or more thresholds for choosing the precision to be used in the heat maps, dwell time floor and ceiling thresholds, data source selection thresholds, standard fuzziness (e.g., expected error on the activity locations), etc.

The system described herein can enable translation of meters into approximate latitude and longitude values. For example, given a point on the Earth, the number that represents x meters horizontally (longitude) and vertically (latitude) may vary greatly. This functionality enables consistency on the fuzziness calculation.

The systems described herein can redo procedures that implement big scope insights. For example, the systems can change the data source from raw data to aggregation data. The systems can also redo procedures that implement small scope insights by using POIs and polygons.

Figure 17:
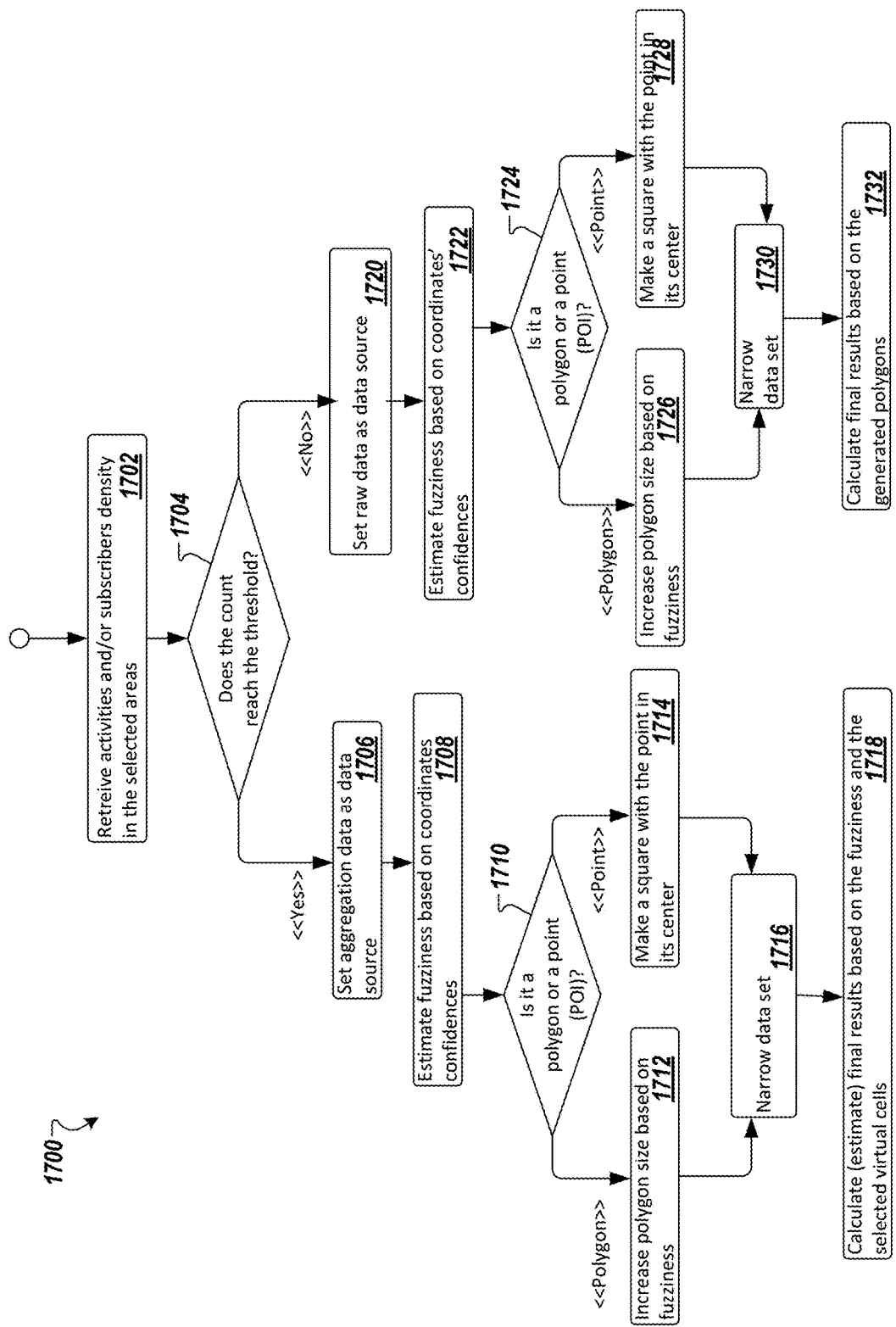
FIG. 17 is an example flowchart that illustrates a process for identifying small scope functionalities.

FIG. 17 is an example flowchart 1700 that illustrates a process for identifying small scope functionalities. At block 1702, the process 1700 may include retrieving activities and/or subscriber density in a selected area. For example, the behavior mapping engine 127 may determine which area has been user selected and can retrieve activities (e.g., mobile activity) and/or subscriber density for the area.

At block 1704, the behavior mapping engine 127 can determine if the subscriber count is at or above a predetermined threshold. The predetermined threshold may be used to determine particular precision to be used when mapping data insights. If the count is at or above the predetermined threshold, the behavior mapping engine 127 can set aggregation data as the data source to be used, at block 1706. The process 1700 can then include estimating fuzziness based on particular determined coordinate confidence, at block 1708.

At block 1710, the process 1700 can determine whether the selection by the user is a polygon or a point of interest. If the selection is determined to be a polygon selection, then the process 1700 can increase the polygon size based on the estimated fuzziness, at block 1712. If the selection is determined to be a point of interest, then the process 1700 can draw a square on a map in the UI presented to the user. The point of interest can be centered, at block 1714.

When either block 1712 or block 1714 are performed, the process 1700 can then include narrowing the data set to either the polygon selection or the point of interest, at block 1716. Next, the process 1700 can calculate (e.g., estimate) final results for display to the user. The final results may be based on the fuzziness and on the selected virtual cells (e.g., corresponding to the polygon or POI), at block 1718.

If instead, the count is not at or above the predefined threshold, in block 1704, the process 1700 can include setting raw data as the data source, at block 1720. The process 1700 can then estimate fuzziness based on coordinate confidences at block 1722, and then determine whether the selection is a polygon or a point of interest, at block 1724.

If the selection is determined to be a polygon selection, then the process 1700 can increase the polygon size based on the estimated fuzziness, at block 1726. If the selection is determined to be a point of interest, then the process 1700 can draw a square on a map in the UI presented to the user. The point of interest can be centered, at block 1728.

When either block 1726 or block 1728 are performed, the process 1700 can then include narrowing the data set to either the polygon selection or the point of interest, at block 1730. Next, the process 1700 can calculate (e.g., estimate) final results for display to the user. The final results may be based on the generated polygons, at block 1732.

Narrowing down the data set would be done to increase performance on the calculation of the final results. When using aggregated data, the behavior mapping engine 127 can retrieve data from the intersected virtual cells and also the adjacent ones. When using raw data, the behavior mapping engine 127 can select a subset of data by selecting a bigger area around the polygons (e.g., a square with 4 kilometers on each side with the polygon in its center). This can be performed for each of the polygons. In some implementations, all the results will be calculated on polygons. As seen in the flow chart, even simple points (POIs) may be transformed into polygons before calculating the final results. This is a result of adding fuzziness to account the confidence (or lack of) on the coordinates.

Figure 18:
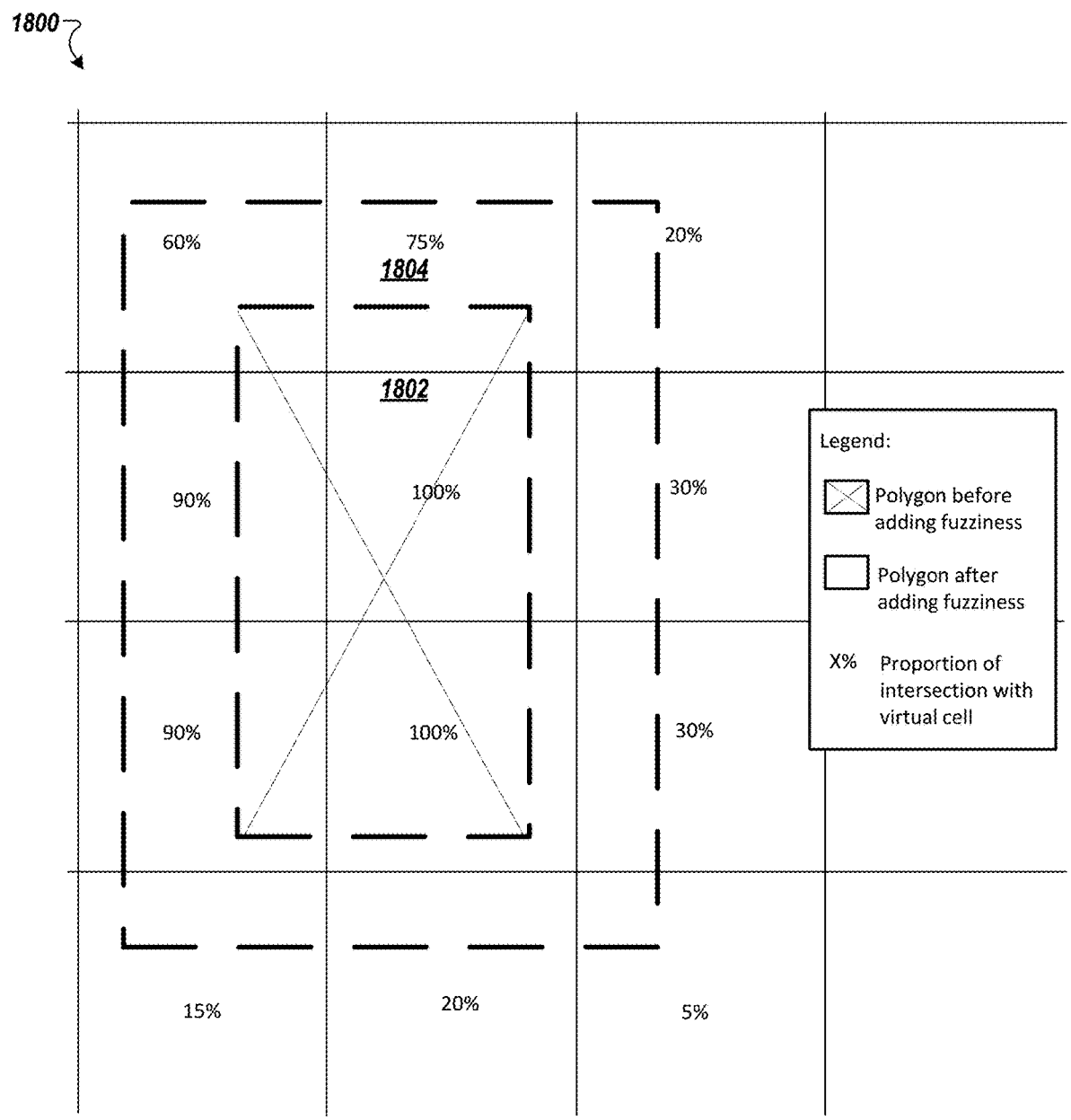
FIG. 18 is an example showing aggregated data with intersected areas.

FIG. 18 is an example showing aggregated data with intersected areas. Calculating the final results when using raw data may include using the actual latitude and longitude values for the selected POI or polygon. However, when using aggregated data (virtual cells) the calculation can be performed by summing the intersected virtual cells' values proportionally to its intersected area. For example, polygon 1802 represents the user selected polygon before adding fuzziness (e.g., fuzzy logic). Polygon 1804 represents the polygon 1802 after adding fuzziness. Each percentage shown in FIG. 18 implicates a proportion that the polygon interests with a particular virtual cell.

In general, the fuzziness is added based on the confidence on the coordinates of the areas involved. Each point can be transformed into a square with side lengths based on the calculated fuzziness. Each polygon can be increased based on the fuzziness.

Social Demographic by Movement

A social demographic algorithm can be implemented by the behavior mapping engine 127. This algorithm can implement a number of data structures that provide a foundation for many functionalities related to users dwells, such as physical journey, footfall, etc.

The feature originally envisioned that these reports would be oriented by Points of Interest (POI), but, due to limitations in the data that will be ran in this features, this paradigm had to be changed to be oriented by larger areas that will be referred to in this document as Areas of Interest (AOI).

For some SCI features, the algorithm determines when users were not merely "passing by," but where they intentionally have been to as their final destination (e.g., calculating dwell). For example, a Dwell Calculation Area (DCA) can be calculated using the algorithms described herein.

Given a region, the social demographic algorithm can estimate who are the people who have dwelled in that area. This is done by using two over-laying grids of Dwell Calculation Areas (DCAs). The better an input Area of Interest (AOI) approximates a DCA in that area, the more accurate the results will be. However, if a given AOI's is not contained within only one DCA, an estimation/approximation can be performed with the interesting DCA data.

The estimation of dwells for random areas will be defined by distance of the center of these areas to the Dwell Calculation Areas (DCA) nearby, size of these areas, and an amount of intersection between these areas and the DCAs.

Figure 19A:
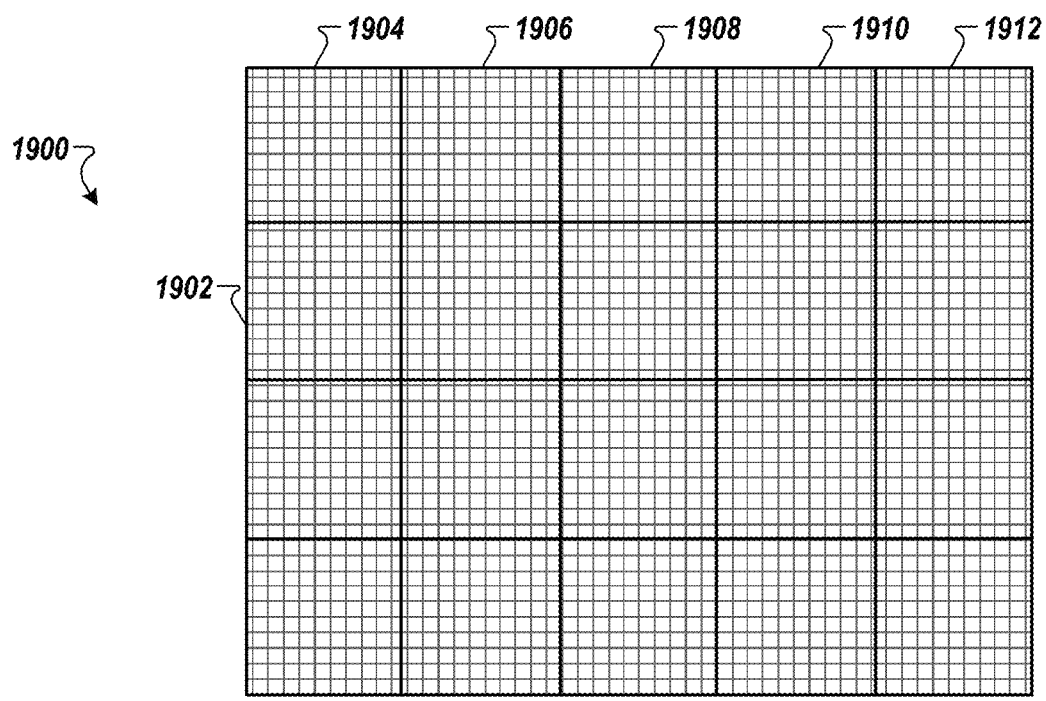
FIGS. 19A-19D are examples representing dwell calculation areas.
Figure 19B:
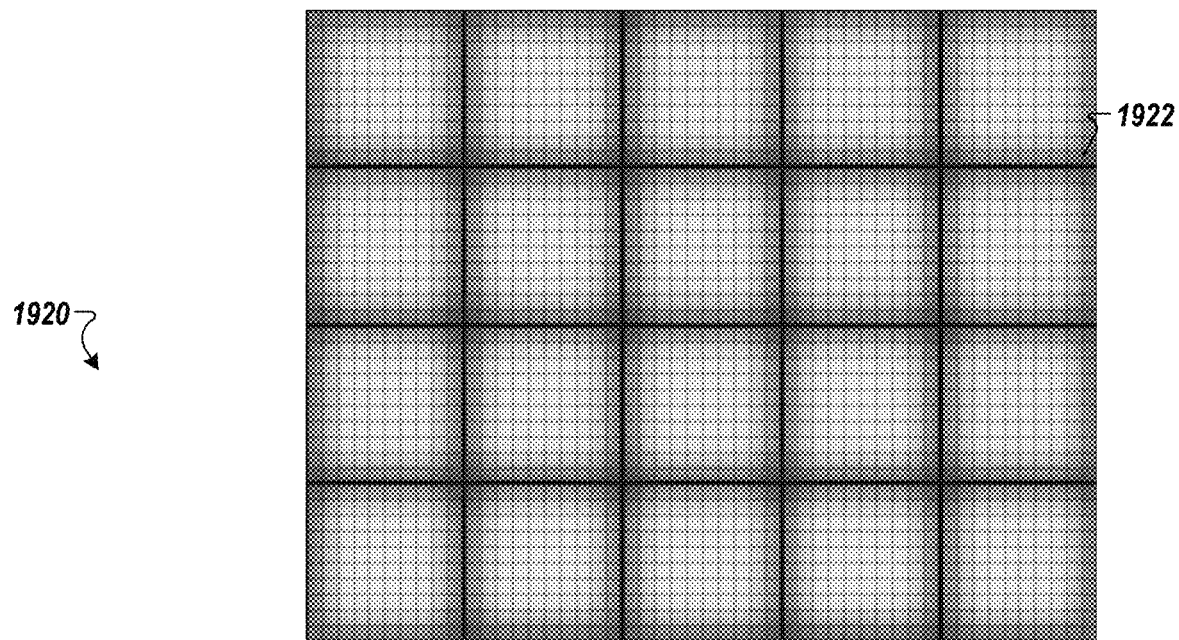

With that in mind, only one grid is not a very good option because it causes too many vulnerability areas (in the edges of the DCAs), as seen in the figures below:

FIG. 19A represents example large squares 1902-1912 representing a first layer 1900 of dwell calculation areas. FIG. 19B represents vulnerability areas of the dwell calculation with a single layer 1920 shown as the perimeter glow (e.g., glow 1922) around each square. The results for random areas that have intersection with many DCAs (closer to the edges) may be worse than the results of random areas that are entirely contained in a DCA. Weak spots in the calculations for areas far from all DCAs' center points may be observed. Moreover, the approach for solving this problem is to introduce another layer of equally sized DCAs that overlay the already defined ones with areas which center points are located in the intersections of the previously proposed layer of DCAs. In order to minimize the vulnerability areas described above, the above mentioned second layer of Dwell Calculation Areas will have the same dimensions as the first layer, but their center are located in the intersections of the previously proposed layer of DCAs, as seen in the figures below.

Figure 19C:
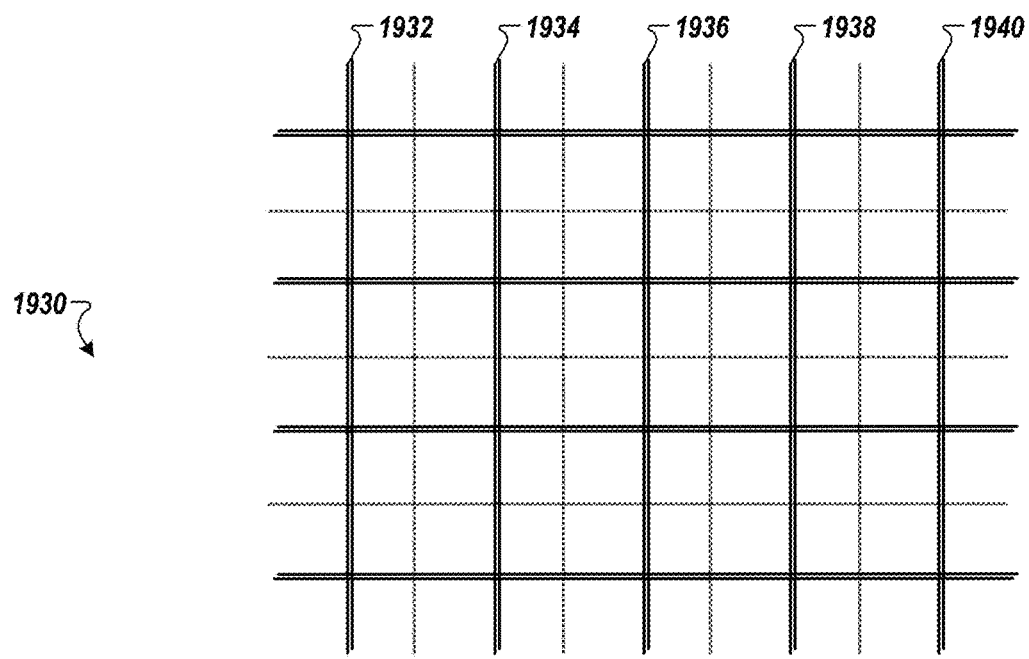
Figure 19D:
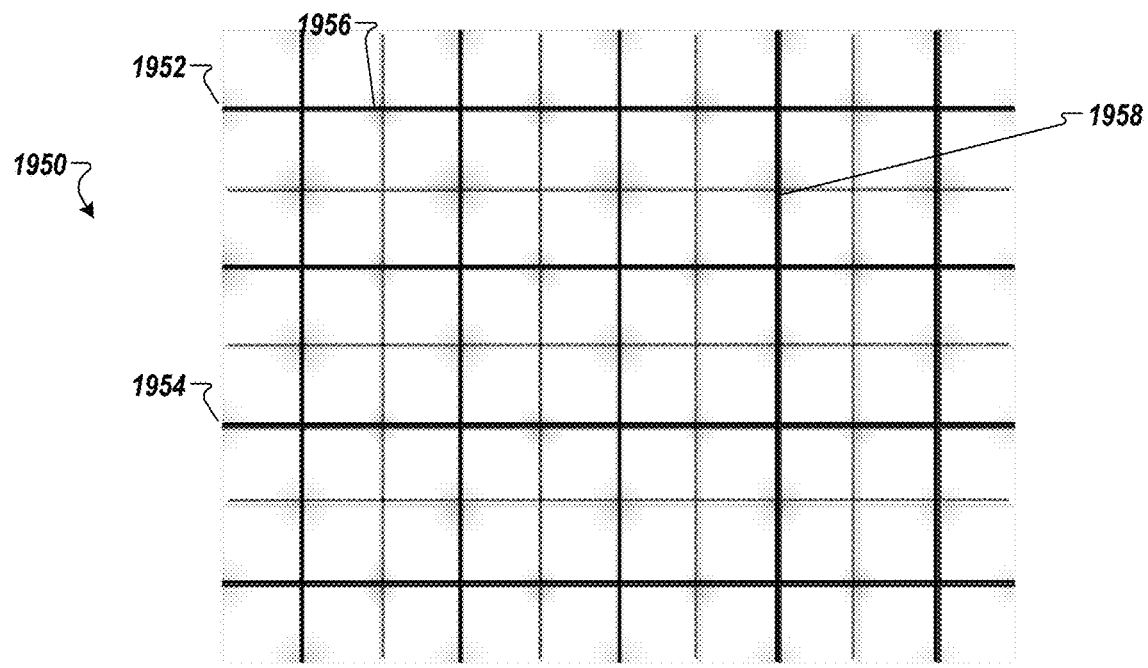

FIG. 19C represents a second layer 1930 of Dwell Calculation Areas (e.g., columns of squares 1932, 1934, 1936, 1938, and 1940) over the first layer 1900. FIG. 19D represents a layer 1950 of vulnerability areas of the dwell calculation with two layers being shown at the corners (e.g., corners 1952 and 1954) and centers (e.g., centers 1956 and 1958) of both layers of squares.

As it can be seen in FIGS. 19A-19D, the vulnerability areas were reduced from areas that are around entire segments (edges of the DCAs) to areas around points that are not close to the center of any DCAs. This approach is able to approximate areas of interest of DCAs with much more precision. It is expected that this approach would yield very good results with the vast majority of the custom areas to calculate dwells with good performance and acceptable precision. It could be the foundation of not only the already envisioned physical journey features, but it also would enable quick calculations of the subscribers' work and home locations with very good performance, among many other possible uses that involve dwells.

Figures 20, 21:
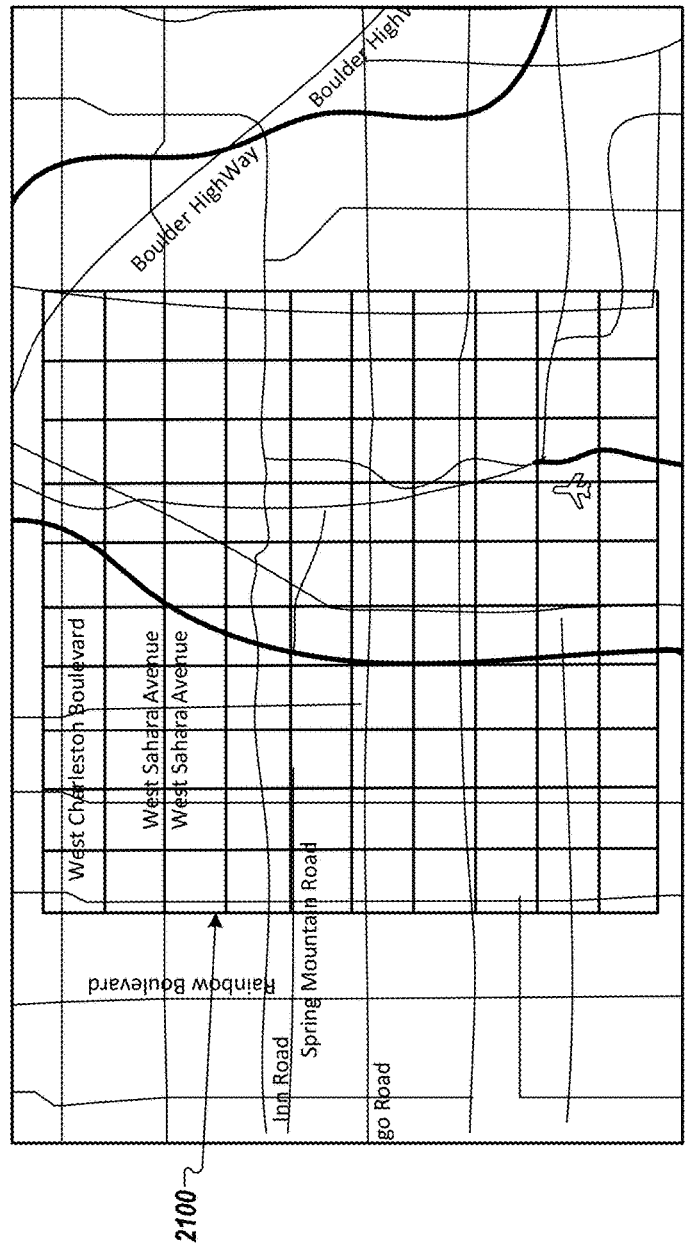
FIG. 20 is a data sample of dwell calculation areas.
FIG. 21 is an example of a generated layer of dwell calculation areas.

FIG. 20 is a data sample 2000 of dwell calculation areas. The data 2000 includes a latitude, longitude and squares of latitude and longitude coordinates. Before generating the dwell data, the systems described herein can generate the DCA grids. It is possible to generate different pairs of layers of DCAs because it is possible to exist different sources of data (with different precisions) in the same areas. Therefore, the DCA grids are able to be adapted to these different needs. However, it should exist only one pair of grids for each size of DCA (which means only one pair of overlaying DCA grid for each data source). The DCAs will be stored in the table DWELL_CALCULATION_AREA, described in the data sample below in FIG. 20.

The LAYER values 2002 are typically 1 or 2, as the design intends on the DCAs being generated in pairs of overlaying grids. Also, it can be seen that the square side (in meters) is stored. The square measurement can be used in the estimation of results, because it is a way of identifying if more than one pair of DCA grids were generated in the same area. This constraint can enable the systems to avoid that the same dwell is present in different DCAs and not counted more than once.

The size chosen for the DCAs may be defined based on the precision of the data for the dwell calculation to be based on in that area. In other words, the size that should be set for the DCAs should be same as the overall coordinate precision of the activities data existent for that area. An example DCA 2100 is shown in FIG. 21. If the DCAs are smaller than that, there will be less dwells by DCA overall, which could be a conservative alternative for saving disk space.

After generating the DCAs, a procedure can be activated to calculate the dwells for each of these. Each calculated dwell will be stored in the DWELL DETAIL table 2200, and a sample of its data can be seen below shown in FIG. 22. As it can be observed, it is not stored any extra information about the subscribers besides their ID. But, in order to have quicker analytics operations, this extra information can be used by joining the above mentioned table with our fact table (USAGE_DETAIL) in an information view.

The design of the dwell calculations using overlaying grids of DCAs is intended to capture accurate approximations of dwell information due to the fact of not being feasible calculate dwell information on-the-fly, nor to all the possible POIs. Such calculations will be done using wrappers to encapsulate the complexity of the dwell calculations to the other functionalities that will use them. The main idea for these wrappers is to take a set of rectangles that represent the area in which is desired to have dwells information for, check how much of this area intersects with a set of DCAs, and balance each of these DCAs' information in a way that avoids having final numbers that are twice as it should be (because some of these DCAs overlay each other).

The data may have an approximate handset location for each activity. It is known that the dwell feature should also be made available for the type of data in which the set activities' locations are the base stations' that serve the handsets, and not the handsets' themselves. It is possible to adapt the designed dwell features for this logic in many ways, but the options are still to be studied and validated with a heavy set of tests, given that this logic has much more constraints and challenges to be solved or mitigated.

The dwell calculations may take a wide range of time to be completed depending on the amount of data to be processed, the size of the DMAs, the precision of the coordinates assigned to the data, among other factors. However, the overall data processing time is not quick enough to be done on-the-fly (as described before), hence the existence of this proposal, and not slow enough so it may use a dedicated server. It may also be acceptable that the data is processed as it comes in, or, if there is a constant flow of data coming in, it could be done during late night hours, when less users will be using the system.

An example test case environment was defined as a square shaped area with 10 kilometers each side and with the area with the biggest activity density of Las Vegas in its center. This location has been considered to be the worst case because it is widely known that Las Vegas is a very touristic city, and its area with the biggest density is expected to have much more dwells (and dwell rate) than other areas where people are expected to generate fewer dwells and more bounces (be "passing by"). The data it was used have a 300 meters or less of precision for at least 80 percent of the activities, so it has been created a pair of grids of DMAs with that size. It has also been created a second pair of grids of DMAs with bigger size to see how much space a more liberal approach generates: DCAs with 1000 meters. The overall results for both pairs of grids of DCAs can be seen in table 2300 of FIG. 23.

FIG. 23 enables the system to calculate a "compression rate" for the dwell calculations. Summing both layers for each test case may be a conservative approach (DCAs sizes=300 m×300 m) that yields a quantity of dwells that is around 5.5 percent of the number of activities in that same area; while the more liberal approach (DCAs sizes=1000 m×1000 m) yields a quantity of dwells that is about 8.1 percent of the number of activities in that test's respective area.

These results show that even with the more liberal approach that yields more rows, it still is very a reasonable number of rows considering the advantages that this feature brings. Besides that, it is worth reminding that these test cases are intended to be a "worst case" scenario, so it is expected that the percentage of dwells over the number of activities should be even smaller overall.

Figure 24:
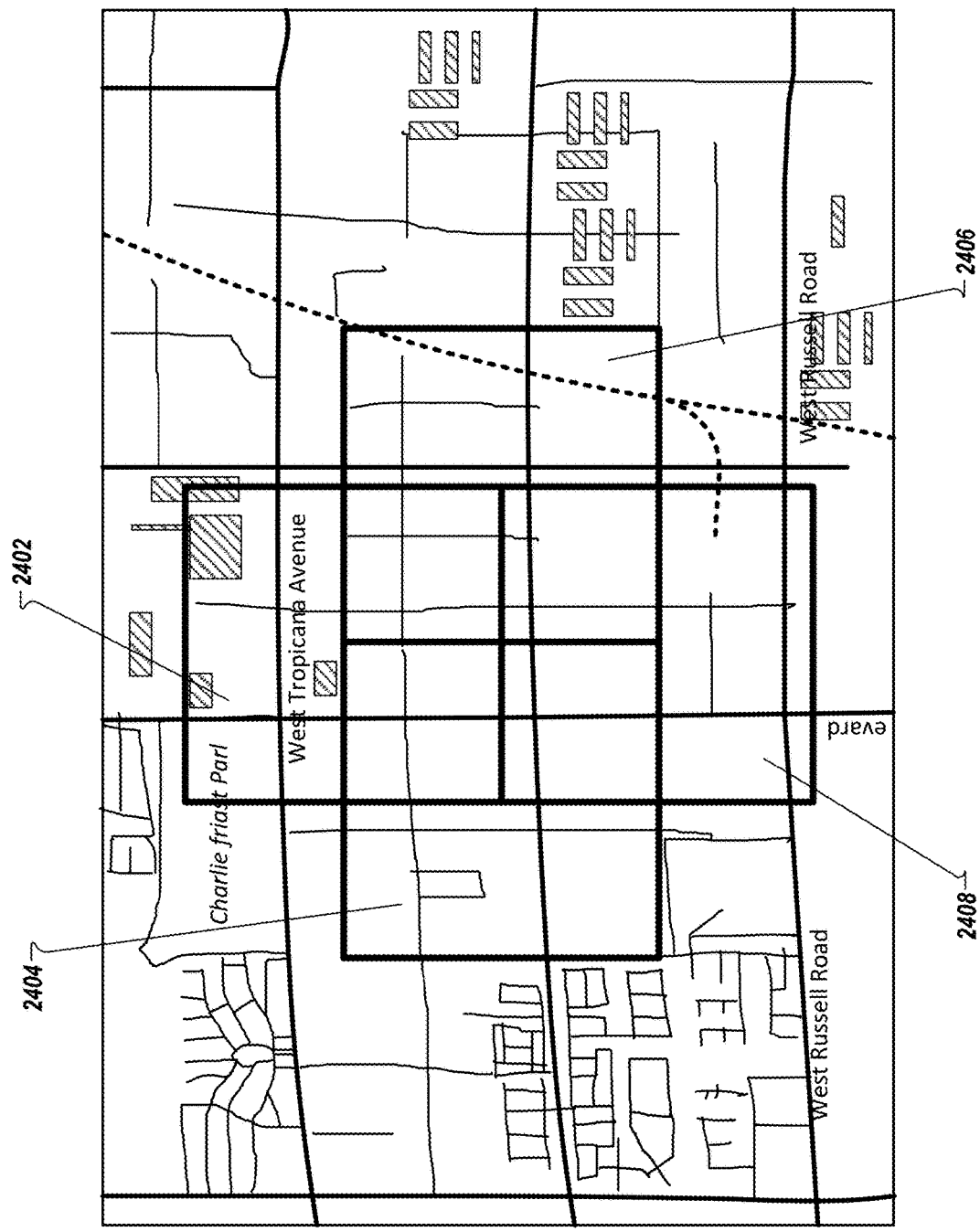
FIG. 24 is an example of a sample of vulnerability points.

In regard of accuracy, it has been considered that the worst cases would take place in the vulnerability points (see FIGS. 19B and 19D). These points are the points with the biggest distance to the center of its closest DCAs, such points are considered to have the most precise information because the dwell calculation that occurred for each DCA had the center point of the DCA as its basis. Reports about AOIs that have approximately the same size of the DCAs and that have these vulnerability points as a center is desirable. The approximations that will be done for these reports will be based on the four surrounding DCAs (2 in first DCA layer and 2 in its overlaying DCA layer), as shown in FIG. 24.

In order to assess the approximation returned for these AOIs that have vulnerability points in their centers, 200 random test cases were ran in the Las Vegas area with 10 kilometers×10 kilometers dimensions. One hundred test cases were done in the pair of grids with the DCAs that have 300 meter sides, and the other 100 in the pair of grids that have 1000 meter sides. The location of these 200 test cases were picked randomly within the 10 kilometers×10 kilometers Las Vegas test area. The average latitude and longitude combination for the test cases pinpoint a place close to the center of the above-mentioned area, thus indicating that the chosen locations are random indeed. The percentage of the number of dwells yielded by a dwell calculation done on-the-fly for the test case itself in comparison to the test case approximation (done with its surrounding DCAs).

The percentage of the number of dwellers (distinct subscribers that dwelled) yielded by a dwell calculation done on-the-fly for the test case itself in comparison to the test case approximation (done with its surrounding DCAs).

The percentage of the average dwell time yielded by a dwell calculation done on-the-fly for the test case itself in comparison to the test case approximation (done with its surrounding DCAs).

The percentage of the average standard deviation of the dwell times yielded by a dwell calculation done on-the-fly for the test case itself in comparison to the test case approximation (done with its surrounding DCAs). The percentage of the dwellers that were in both, the test case and the approximation data, over the number of dwellers that were only in the test case. Keeping in mind that the test cases were expected to be worst cases scenarios, it can be seen that the approximations yield very good results. The absolute values of dwells and distinct dwellers do not differ very much between the 300 m and 1000 m test cases. Thus, indicating that dwell calculations have similar behaviors for different area sizes within the same data sample. The percentage of both dwells and distinct dwellers are less than 100 percent. Indicating that the dwell calculations done on-the-fly usually yield less dwells and dwellers in comparison to the approximations with the surrounding DCAs. The number of average dwell time and average standard deviation time are very close to 100 percent, which makes sense, because similar dwell behaviors are expected in areas that are close to each other.

The number of subscribers that are in both, the approximations as well as in the dwell calculations, over the subscribers that are only in the dwell calculation is around 10 percent higher in the 1000 meter test cases. This is expected because as an area increases around a given point (from 300 meter sides to 1000 meter, for example), the number of distinct subscribers is expected to increase in a smaller rate due to subscribers not being accounted more than once. And that is why the difference between 300 meter and 1000 meter test cases is not as big as their difference in terms of size. Anyway, it is a fact that 1000 meter test cases will yield more distinct dwellers than 300 meter ones.

Mobile Brand Value Index

FIG. 25A-25H depict example equations usable in a brand value index algorithm to predict consumer behavior. Mobile brand value index (mBVI) represents an index created to measure a company's standing in their respective market. This index is generated from many parameters that measure efficacy of business within a particular company. The mBVI algorithm can be based on a number of clicks and a number of subscribers with the equations in FIG. 25A. A BVI table can be generated to include a BVI calculation, a BVI trend calculation, a percent clicks calculation, a number of clicks metric, a number of subscribers metric, a dwell time on website metric, an average number of clicks to purchase intent, and a number of mobile phone purchases.

The BVI calculation may be calculated using the equations 2502 and 2504 shown in FIG. 25A-25B. The BVI trend calculation represents a percent change in BVI. The BVIs for the same previous four time periods (i.e. weeks, months, days, hours, etc.) are averaged. This average is then used to calculate the percent change for the a BVI report. The average number of clicks to purchase intent represents time when data tracking loses visibility of a URN, this likely means the user is in a secure part of the website. This is indicative of the user entering credit card information. The average clicks to purchase measures a company's efficacy in selling products on their web page.

The mBVI algorithm can also determine the average dwell time on a particular domain by analyzing digital data (e.g., two clicks or more) or physical data (e.g., more than ten minutes, but less than four hours). FIG. 25C depicts example equations 2506 for this calculation detail. The algorithm can also determine the average number of clicks per click session on a brand's domain. The number is likely single or double digits. FIG. 25D depicts example equations 2508 for this calculation detail. The algorithm can also determine a number of consumers in a store. FIG. 25E depicts an example equation 2510 for this calculation detail. The algorithm can also determine a number of consumers in a store that also were on a correlated domain in the last month. FIG. 25F depicts an example equation 2512 for this calculation detail. The algorithm can also determine a digital and a physical click valuation. FIG. 25G depicts example equations for this calculation detail. The algorithm can also determine a rate of return for every 100 users. FIG. 25H depicts example equations 2516 for this calculation detail.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the instant disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for generating a classification model to determine predictive user behavior, the method comprising:
   obtaining data from a mobile network provider, the data including a plurality of utilization metrics pertaining to a plurality of mobile devices carrying out a plurality of network interactions, the plurality of mobile devices being associated with a plurality of users;
   categorizing the data into a plurality of Internet domains comprising Internet Protocol (IP) resources associated with the data, wherein the data is categorized according to particular categories of the IP resources in which the data pertains, and wherein the IP resources include at least one of a web-site or a web-based service;
   determining a plurality of patterns in the data, the plurality of patterns being used to correlate a first category represented in the data with at least a portion of the plurality of Internet domains;
   determining an additional pattern in the data, the additional pattern correlating a second category represented in the data with at least a portion of the plurality of Internet domains;
   generating a plurality of rules based on the plurality of patterns and the additional pattern;
   obtaining additional data from one or more mobile network providers; and
   applying the plurality of rules to the additional data to classify the additional data according to one or more of the plurality of patterns.

2. The method of claim 1, further comprising:
   generating a plurality of age bands, each of which correlate to at least one of the plurality of patterns represented in the additional data;
   generating at least two gender groups, one of which correlates to the additional pattern represented in the additional data;
   recognizing, for presentation in a graphical user interface, a plurality of graphical reports indicating behavior for mobile device users represented in the additional data, the behavior indicated in the plurality of patterns and graphed according to age band and gender; and
   in response to receiving a request to view analysis of the additional data, presenting, in the graphical user interface, at least one of the plurality of graphical reports.

3. The method of claim 1, further comprising:
   grouping the plurality of Internet domains into a plurality of content topics representing the data;
   determining browsing patterns in the data according to the plurality of content topics, the behavior being identified and processed according to a plurality of predefined age bands and gender groups; and
   generating a plurality of updated rules based on the determined browsing patterns.

4. The method of claim 1, further comprising:
   determining that a portion of the plurality of utilization metrics include automated mobile device network activities; and
   before categorizing the data into the plurality of Internet domains, filtering the portion from the data, the filtering being based at least in part on a plurality of mobile call rules.

5. The method of claim 4, wherein the mobile call rules pertain to call time, call duration, gap duration consistency, devices called, and device location.

6. The method of claim 1, wherein the plurality of Internet domains define a browsing profile associated with one or more of the plurality of mobile devices.

7. The method of claim 1, wherein the plurality of utilization metrics are associated with one or more voice transaction, short message service transaction, HTTP access transaction, and location transaction.

8. The method of claim 1, further comprising filtering the data by selecting and removing a portion of the Internet domains from the data in response to determining that the data represents less than a predefined threshold time for visiting the Internet domains.

9. A computer program product for generating a classification model to determine predictive user behavior, the computer program product being tangibly embodied on a non-transitory computer-readable storage medium and comprising instructions that, when executed by at least one computing device, are configured to cause the at least one computing device to:
- obtain data from a mobile network provider, the data including a plurality of utilization metrics pertaining to a plurality of mobile devices carrying out a plurality of network interactions, the plurality of mobile devices being associated with a plurality of users;
- categorize the data into a plurality of Internet domains associated with the data, wherein the Internet domains comprise a web-site or a web-based service, and wherein the data is categorized according to particular categories of the Internet domains in which the data pertains;
- determine a plurality of patterns in the data, the plurality of patterns being used to correlate a first category represented in the data with at least a portion of the plurality of Internet domains;
- determine an additional pattern in the data, the additional pattern correlating a second category represented in the data with at least a portion of the plurality of Internet domains;
- generate a plurality of rules based on the plurality of patterns and the additional pattern;
- obtain additional data from one or more mobile network providers; and
- apply the plurality of rules to the additional data to classify the additional data according to one or more of the plurality of patterns.

10. The computer program product of claim 9, wherein the instructions are further configured to cause the at least one computing device to:
- generate a plurality of age bands, each of which correlate to at least one of the plurality of patterns represented in the additional data;
- generate at least two gender groups, one of which correlates to the additional pattern represented in the additional data;
- recognize, for presentation in a graphical user interface, a plurality of graphical reports indicating behavior for mobile device users represented in the additional data, the behavior indicated in the plurality of patterns and graphed according to age band and gender; and
- in response to receiving a request to view analysis of the additional data, present, in the graphical user interface, at least one of the plurality of graphical reports.

11. The computer program product of claim 9, wherein the instructions are further configured to cause the at least one computing device to:
- group the plurality of Internet domains into a plurality of content topics representing the data;
- determine browsing patterns in the data according to the plurality of content topics, the behavior being identified and processed according to a plurality of predefined age bands and gender groups; and
- generate a plurality of updated rules based on the determined browsing patterns.

12. The computer program product of claim 9, wherein the instructions are further configured to cause the at least one computing device to:
- determine that a portion of the plurality of utilization metrics include automated mobile device network activities; and
- before categorizing the data into the plurality of Internet domains, filter the portion from the data, the filtering being based at least in part on a plurality of mobile call rules.

13. The computer program product of claim 9, wherein the plurality of Internet domains define a browsing profile associated with one or more of the plurality of mobile devices.

14. The computer program product of claim 9, wherein the plurality of utilization metrics are associated with one or more voice transaction, short message service transaction, HTTP access transaction, and location transaction.

15. The computer program product of claim 9, wherein the instructions are further configured to cause the at least one computing device to filter the data by selecting and removing a portion of the Internet domains from the data in response to determining that the data represents less than a predefined threshold time for visiting the Internet domains.

16. A system comprising:
- one or more backend services hosting a user interface infrastructure to display reports representing predictive user behavior; and
- at least one memory accessible by the one or more backend services, the at least one memory including instructions on a computing device; and
- at least one processor on the computing device, wherein the processor is operably coupled to the at least one memory and is arranged and configured to execute the instructions that, when executed, cause the processor to implement,
  - obtaining data from a mobile network provider, the data including a plurality of utilization metrics pertaining to a plurality of mobile devices carrying out a plurality of network interactions, the plurality of mobile devices being associated with a plurality of users;
  - categorizing the data into a plurality of Internet domains associated with the data, wherein the Internet domains comprise a web-site or a web-based service, and wherein the data is categorized according to particular categories of the Internet domains in which the data pertains;
  - determining a plurality of patterns in the data, the plurality of patterns being used to correlate age groups represented in the data with at least a portion of the plurality of Internet domains;
  - determining an additional pattern in the data, the additional pattern correlating each gender represented in the data with at least a portion of the plurality of Internet domains;
  - generating a plurality of rules based on the plurality of patterns and the additional pattern;
  - obtaining additional data from one or more mobile network providers;
  - applying the plurality of rules to the additional data to classify the additional data according to one or more of the plurality of patterns;
  - generating, for presentation in the user interface, a plurality of graphical reports indicating predictive user behavior indicated in the plurality of patterns and graphed according to age band and gender; and
  - in response to receiving a request to view analysis of the data, presenting, in the user interface, at least one of the plurality of graphical reports.

17. The system of claim 16, wherein the processor further implements:
- grouping the plurality of Internet domains into a plurality of content categories representing the data;
- determining browsing patterns in the data according to the plurality of content categories, the behavior being identified and processed according to a plurality of predefined age bands and gender groups; and generating a plurality of updated rules based on the determined browsing patterns.

18. The system of claim 16, wherein the plurality of Internet domains define a browsing profile associated with one or more of the plurality of mobile devices.

19. The system of claim 16, wherein the plurality of utilization metrics are associated with one or more voice transaction, short message service transaction, HTTP access transaction, and location transaction.

20. The system of claim 16, wherein the processor further implements filtering the data by selecting and removing a portion of the Internet domains from the data in response to determining that the data represents less than a predefined threshold time for visiting the Internet domains.

* * * * *